(12) United States Patent
Fujita et al.

(10) Patent No.: US 10,507,690 B2
(45) Date of Patent: Dec. 17, 2019

(54) BICYCLE HUB ASSEMBLY

(71) Applicant: SHIMANO INC., Sakai (JP)

(72) Inventors: Hiroshi Fujita, Sakai (JP); Kazuki Koshiyama, Sakai (JP); Takashi Nakanishi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/381,065

(22) Filed: Apr. 11, 2019

(65) Prior Publication Data

US 2019/0232717 A1 Aug. 1, 2019

Related U.S. Application Data

(63) Continuation of application No. 15/673,346, filed on Aug. 9, 2017, now Pat. No. 10,377,174.

(51) Int. Cl.
*B60B 27/04* (2006.01)
*B60B 27/00* (2006.01)
(Continued)

(52) U.S. Cl.
CPC .............. *B60B 27/04* (2013.01); *B60B 1/042* (2013.01); *B60B 27/0021* (2013.01);
(Continued)

(58) Field of Classification Search
CPC ... B60B 27/04; B60B 27/047; B60B 27/0021; B60B 1/042; B60B 27/0026; B62M 9/10; B62M 9/105; B62L 5/00
(Continued)

(56) References Cited

U.S. PATENT DOCUMENTS 2,382,740 A 8/1945 Noffsinger et al.
3,732,626 A 5/1973 Miller, Jr.
(Continued)

FOREIGN PATENT DOCUMENTS

CN 108725684 11/2018
DE 202016000725 U1 4/2016
(Continued)

OTHER PUBLICATIONS

Notice of Allowance with Form PTO-892 Notice of Reference Cited issued by the U.S. Patent and Trademark Office for the U.S. Appl. No. 15/673,346, dated Feb. 21, 2019.
(Continued)

*Primary Examiner* — S. Joseph Morano
*Assistant Examiner* — Jean W Charleston
(74) *Attorney, Agent, or Firm* — Mori & Ward, LLP

(57) ABSTRACT

A bicycle hub assembly comprises a hub axle, a hub body, and a sprocket support body. The hub body includes a first spoke-mounting portion, a second spoke-mounting portion, and a first axial length. The first axial length is defined between a first axially outermost part of the first spoke-mounting portion and a second axially outermost part of the second spoke-mounting portion in an axial direction and is equal to or larger than 55 mm. The sprocket support body includes a plurality of external spline teeth. The plurality of external spline teeth includes a plurality of external-spline driving surfaces. The plurality of external-spline driving surfaces each includes a radial length defined from a radially outermost edge to a radially innermost edge. A total of the radial lengths of the plurality of external-spline driving surfaces is equal to or larger than 7 mm.

17 Claims, 48 Drawing Sheets

(51) Int. Cl.
*B60B 1/04* (2006.01)
*B62M 9/10* (2006.01)
*B62L 5/00* (2006.01)

(52) U.S. Cl.
CPC .............. *B60B 27/047* (2013.01); *B62L 5/00* (2013.01); *B62M 9/10* (2013.01); *B62M 9/105* (2013.01); *B60B 27/0026* (2013.01)

(58) Field of Classification Search
USPC ...................................................... 301/110.5
See application file for complete search history.

(56) References Cited

U.S. PATENT DOCUMENTS

| | | | |
|---|---|---|---|
| 4,175,404 A | 11/1979 | Schopf | |
| 4,261,452 A | 4/1981 | Barrows | |
| 4,473,317 A | 9/1984 | Bolang | |
| 4,869,710 A * | 9/1989 | Iwasaki | B62M 9/10 474/160 |
| 5,448,944 A | 9/1995 | Line et al. | |
| 5,480,357 A | 1/1996 | Liang | |
| 5,503,494 A | 4/1996 | Kamata et al. | |
| 5,664,655 A | 9/1997 | Oh | |
| 5,697,850 A | 12/1997 | Yaegashi et al. | |
| 5,704,859 A | 1/1998 | Feng et al. | |
| 5,716,159 A | 2/1998 | Tomikawa | |
| 5,738,603 A | 4/1998 | Schmidt et al. | |
| 5,771,737 A | 6/1998 | Yaegashi | |
| 5,851,152 A | 12/1998 | Ilzhofer et al. | |
| 5,954,604 A | 9/1999 | Nakamura | |
| 5,964,332 A | 10/1999 | King | |
| 6,116,700 A | 9/2000 | Herrera | |
| 6,322,158 B1 | 11/2001 | Herrera | |
| 6,340,338 B1 | 1/2002 | Kamada | |
| 6,382,381 B1 | 5/2002 | Okajima et al. | |
| 6,428,437 B1 | 8/2002 | Schlanger | |
| 6,488,603 B2 | 12/2002 | Lim et al. | |
| 6,497,314 B2 | 12/2002 | Kanehisa | |
| 6,587,741 B1 | 7/2003 | Chetta et al. | |
| 6,644,452 B2 | 11/2003 | Lew et al. | |
| 6,644,652 B1 * | 11/2003 | Walsh | G03G 15/234 271/176 |
| 6,659,895 B2 | 12/2003 | Fukuda | |
| 6,669,306 B1 | 12/2003 | Hara et al. | |
| 6,866,604 B2 | 3/2005 | Kamada et al. | |
| 6,923,741 B2 | 8/2005 | Wei | |
| 6,958,026 B2 | 10/2005 | Wang et al. | |
| 7,044,876 B2 | 5/2006 | Kamada et al. | |
| 7,360,470 B2 | 4/2008 | Bonner | |
| 7,475,758 B2 | 1/2009 | Dimsey et al. | |
| 7,484,608 B2 | 2/2009 | Lew et al. | |
| 7,846,047 B2 | 12/2010 | Nakano et al. | |
| 8,057,338 B2 | 11/2011 | Kamada | |
| 8,197,371 B2 | 6/2012 | D'Alusio | |
| 8,226,511 B2 | 7/2012 | Kamada | |
| 8,375,827 B2 | 2/2013 | Kuroiwa et al. | |
| 8,757,341 B2 | 6/2014 | Klieber | |
| 8,820,852 B2 * | 9/2014 | Van Hoek | F16H 7/20 301/110.5 |
| 9,199,509 B2 | 12/2015 | Koshiyama | |
| 9,334,910 B2 | 5/2016 | Watarai | |
| 9,669,656 B2 | 6/2017 | Lim et al. | |
| 9,855,794 B1 * | 1/2018 | Nakajima | B60B 27/023 |
| 2001/0039224 A1 | 11/2001 | Lim et al. | |
| 2001/0045140 A1 | 11/2001 | Kamminga et al. | |
| 2002/0072446 A1 | 6/2002 | Kanehisa et al. | |
| 2002/0086753 A1 | 7/2002 | Yahata | |
| 2003/0040371 A1 | 2/2003 | Glowacki et al. | |
| 2004/0142782 A1 | 7/2004 | Kamada et al. | |
| 2005/0139444 A1 | 6/2005 | Kanehisa et al. | |
| 2006/0014599 A1 | 1/2006 | Meggiolan | |
| 2006/0128511 A1 | 6/2006 | Kanehisa et al. | |
| 2008/0004143 A1 | 1/2008 | Kanehisa et al. | |
| 2009/0181779 A1 | 7/2009 | Wagner et al. | |
| 2009/0215543 A1 | 8/2009 | Brissette | |
| 2009/0252549 A1 | 10/2009 | Takeuchi et al. | |
| 2009/0317177 A1 | 12/2009 | Nakagawa et al. | |
| 2010/0170762 A1 | 7/2010 | Schlanger | |
| 2010/0239363 A1 | 9/2010 | Cerasi | |
| 2010/0260544 A1 * | 10/2010 | Chiang | B60B 27/023 403/359.1 |
| 2010/0303537 A1 | 12/2010 | Brown et al. | |
| 2011/0020078 A1 | 1/2011 | Katsuki | |
| 2011/0120232 A1 | 5/2011 | Lassanske | |
| 2012/0028723 A1 | 2/2012 | Ando et al. | |
| 2013/0192419 A1 | 8/2013 | Mizuno et al. | |
| 2013/0324354 A1 | 12/2013 | Phebus et al. | |
| 2014/0193195 A1 | 7/2014 | Merz | |
| 2014/0265539 A1 * | 9/2014 | Thompson | B60B 27/023 301/110.5 |
| 2015/0024884 A1 | 1/2015 | Braedt et al. | |
| 2015/0125269 A1 | 5/2015 | Bois et al. | |
| 2015/0202919 A1 | 7/2015 | Koshiyama | |
| 2015/0210353 A1 | 7/2015 | Tokuyama et al. | |
| 2015/0314641 A1 | 11/2015 | Koshiyama | |
| 2016/0083045 A1 | 3/2016 | Lin | |
| 2016/0096589 A1 | 4/2016 | Sato | |
| 2016/0176477 A1 | 6/2016 | Bernardele | |
| 2016/0223033 A1 | 8/2016 | Fujita et al. | |
| 2016/0280326 A1 | 9/2016 | Braedt et al. | |
| 2016/0297465 A1 | 10/2016 | Miyawaki et al. | |
| 2016/0347410 A1 | 12/2016 | Watarai et al. | |
| 2017/0036690 A1 | 2/2017 | Jager et al. | |
| 2017/0096029 A1 | 4/2017 | Fujita et al. | |
| 2017/0355226 A1 | 12/2017 | Cheng et al. | |
| 2017/0356502 A1 | 12/2017 | Cheng et al. | |
| 2018/0304965 A1 | 10/2018 | Fukumori | |

FOREIGN PATENT DOCUMENTS

| | | |
|---|---|---|
| EP | 2526011 B1 | 3/2014 |
| JP | 57-153092 U | 3/1982 |
| JP | 63-195991 U | 12/1988 |
| JP | 1-87993 U | 6/1989 |
| JP | 07-32803 | 2/1995 |
| JP | 10-181668 | 7/1998 |
| JP | 2000-314438 | 11/2000 |
| JP | 2002-104262 | 4/2002 |
| JP | 2002-193178 | 7/2002 |
| JP | 2002-205681 | 7/2002 |
| JP | 2004-090914 | 3/2004 |
| JP | 2004-143739 | 5/2004 |
| JP | 2005-186763 | 7/2005 |
| JP | 2006-168720 | 6/2006 |
| JP | 2008-175277 | 7/2008 |
| JP | 2011-500436 | 1/2011 |
| JP | 2016-117479 | 6/2016 |
| TW | M362767 U1 | 8/2009 |
| TW | 201529362 | 8/2015 |
| WO | WO 2017/011189 | 1/2017 |

OTHER PUBLICATIONS

Office Action issued by the United States Patent and Trademark Office for the co-pending U.S. Appl. No. 15/608,924, dated May 15, 2019.
Office Action issued by the United States Patent and Trademark Office for the co-pending U.S. Appl. No. 15/608,924, dated Sep. 26, 2019.
B1 Machine element design, tribology, JSME mechanical engineers' handbook, Apr. 15, 1996, The Japan Society of Mechanical Engineers.
Norton, Robert L. 2013, Machine Design An Integrated Approach 5$^{th}$ Edition, Pearson.
Jones, Franklin et al., 1998, Machinerys Handbook, New York, NY Industrial Press, Inc.
Robert L. Norton, Machine Design, An Integrated Approach, Third Edition, Prentice Hall, 2006, pp. 532, 533, 643-645 (Year: 2006).
Office Action issued by the United States Patent and Trademark Office for the co-pending U.S. Appl. No. 15/686,177, dated Aug. 21, 2019.

(56) References Cited

OTHER PUBLICATIONS

Office Action issued by the United States Patent and Trademark Office for the co-pending U.S. Appl. No. 15/686,179, dated Aug. 21, 2019.
Office Action issued by the United States Patent and Trademark Office for the co-pending U.S. Appl. No. 16/145,116, dated Jul. 16, 2019.
Office Action issued by the United States Patent and Trademark Office for the co-pending U.S. Appl. No. 15/608,915, dated Jul. 16, 2019.
Third-Party Submissions under 37 CFR 1.290 Concise Description of Relevance submitted in U.S. Appl. No. 15/608,915, notified to Applicant on Jul. 3, 2019.
Third-Party Submissions under 37 CFR 1.290 Concise Description of Relevance submitted in U.S. Appl. No. 15/608,915, notified to Applicant on Jul. 18, 2019.
Third-Party Submissions under 37 CFR 1.290 Concise Description of Relevance submitted in U.S. Appl. No. 15/686,177, notified to Applicant on Jul. 23, 2019.

* cited by examiner

BICYCLE HUB ASSEMBLY

CROSS-REFERENCE TO RELATED APPLICATIONS

The present application is a continuation application of the U.S. patent application Ser. No. 15/673,346 filed Aug. 9, 2017. The contents of this application are incorporated herein by reference in their entirety.

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a bicycle hub assembly comprises a hub axle, a hub body, and a sprocket support body. The hub body is rotatably mounted on the hub axle about a rotational center axis of the bicycle hub assembly. The hub body includes a first spoke-mounting portion, a second spoke-mounting portion, and a first axial length. The first spoke-mounting portion has a first axially outermost part. The second spoke-mounting portion has a second axially outermost part. The first axial length is defined between the first axially outermost part of the first spoke-mounting portion and the second axially outermost part of the second spoke-mounting portion in an axial direction with respect to the rotational center axis. The first axial length is equal to or larger than 55 mm. The sprocket support body is rotatably mounted on the hub axle about the rotational center axis. The sprocket support body includes a plurality of external spline teeth configured to engage with a bicycle rear sprocket assembly. The plurality of external spline teeth includes a plurality of external-spline driving surfaces to receive a driving rotational force from the bicycle rear sprocket assembly during pedaling. The plurality of external-spline driving surfaces each includes a radially outermost edge, a radially innermost edge, and a radial length defined from the radially outermost edge to the radially innermost edge. A total of the radial lengths of the plurality of external-spline driving surfaces is equal to or larger than 7 mm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
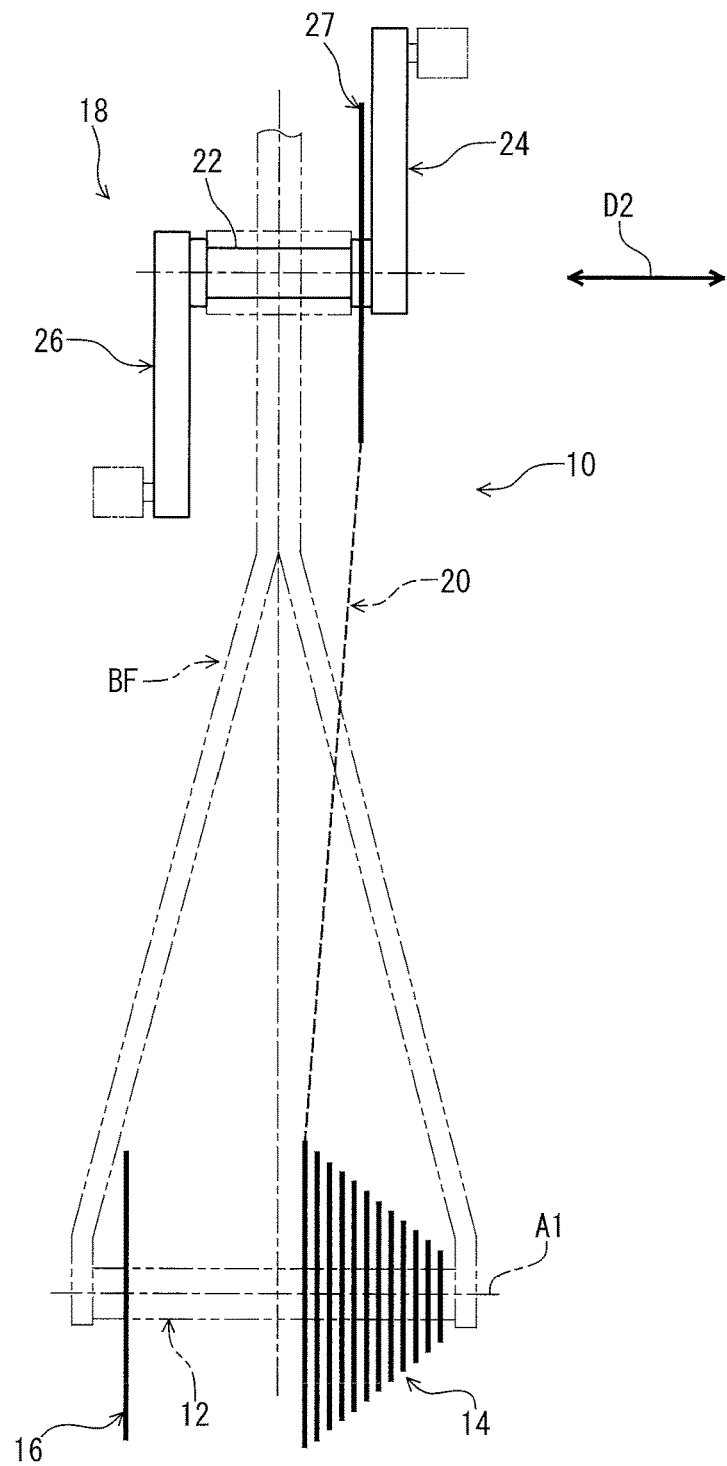
FIG. 1 is a schematic diagram of a bicycle drive train in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 10 in accordance with a first embodiment comprises a bicycle hub assembly 12 and a bicycle rear sprocket assembly 14. The bicycle hub assembly 12 is secured to a bicycle frame BF. The bicycle rear sprocket assembly 14 is mounted on the bicycle hub assembly 12. A bicycle brake rotor 16 is mounted on the bicycle hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle rear sprocket assembly 14 to transmit a pedaling force from the front sprocket 27 to the bicycle rear sprocket assembly 14. The crank assembly 18 includes the front sprocket 27 as a single sprocket in the illustrated embodiment. However, the crank assembly 18 can include a plurality of front sprockets. The bicycle rear sprocket assembly 14 is a rear sprocket assembly. However, structures of the bicycle rear sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle hub assembly 12, or the bicycle rear sprocket assembly 14, should be interpreted relative to the bicycle equipped with the bicycle drive train 10, the bicycle hub assembly 12, or the bicycle rear sprocket assembly 14 as used in an upright riding position on a horizontal surface.

Figure 2:
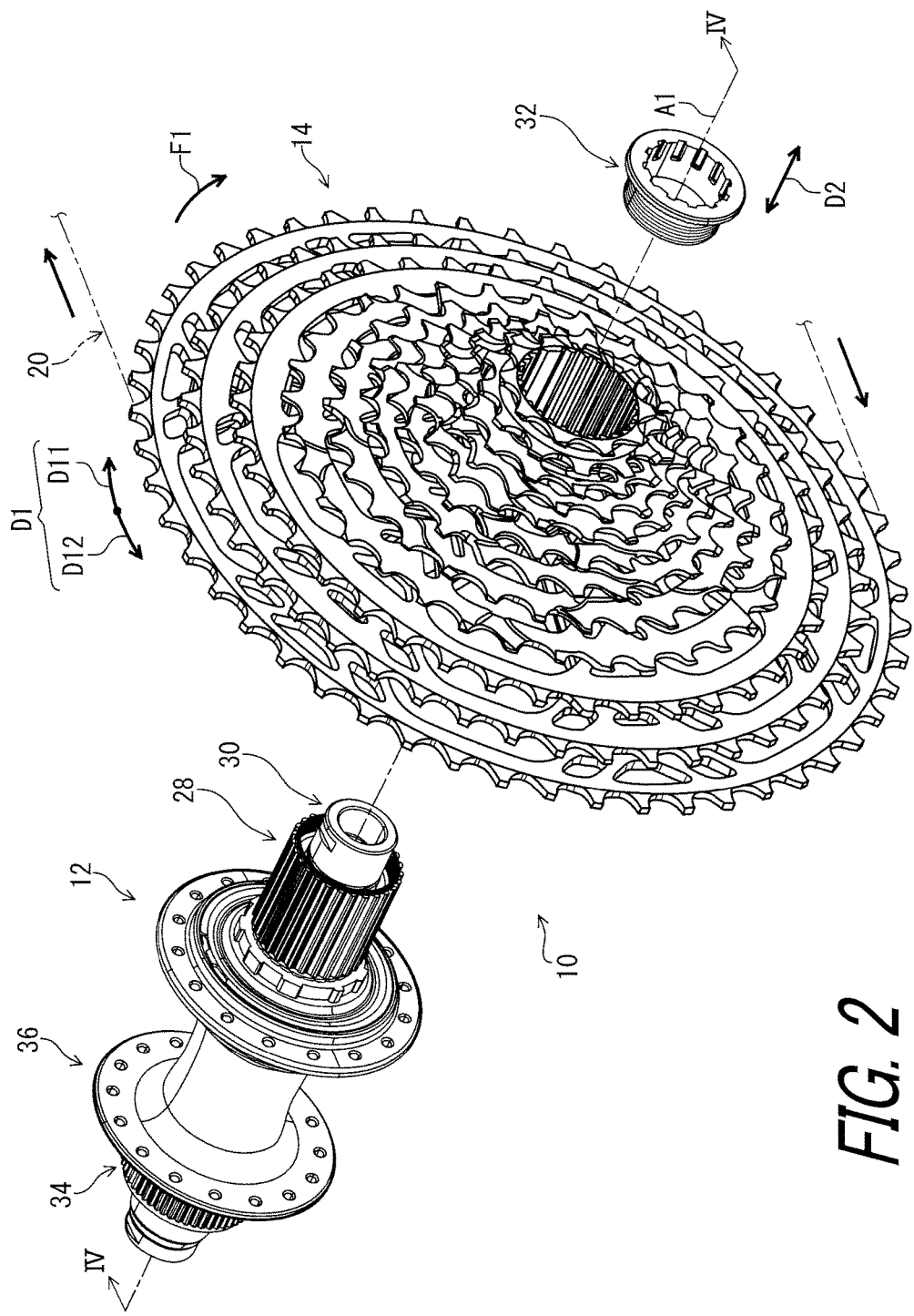
FIG. 2 is an exploded perspective view of the bicycle drive train illustrated in FIG. 1.
Figure 3:
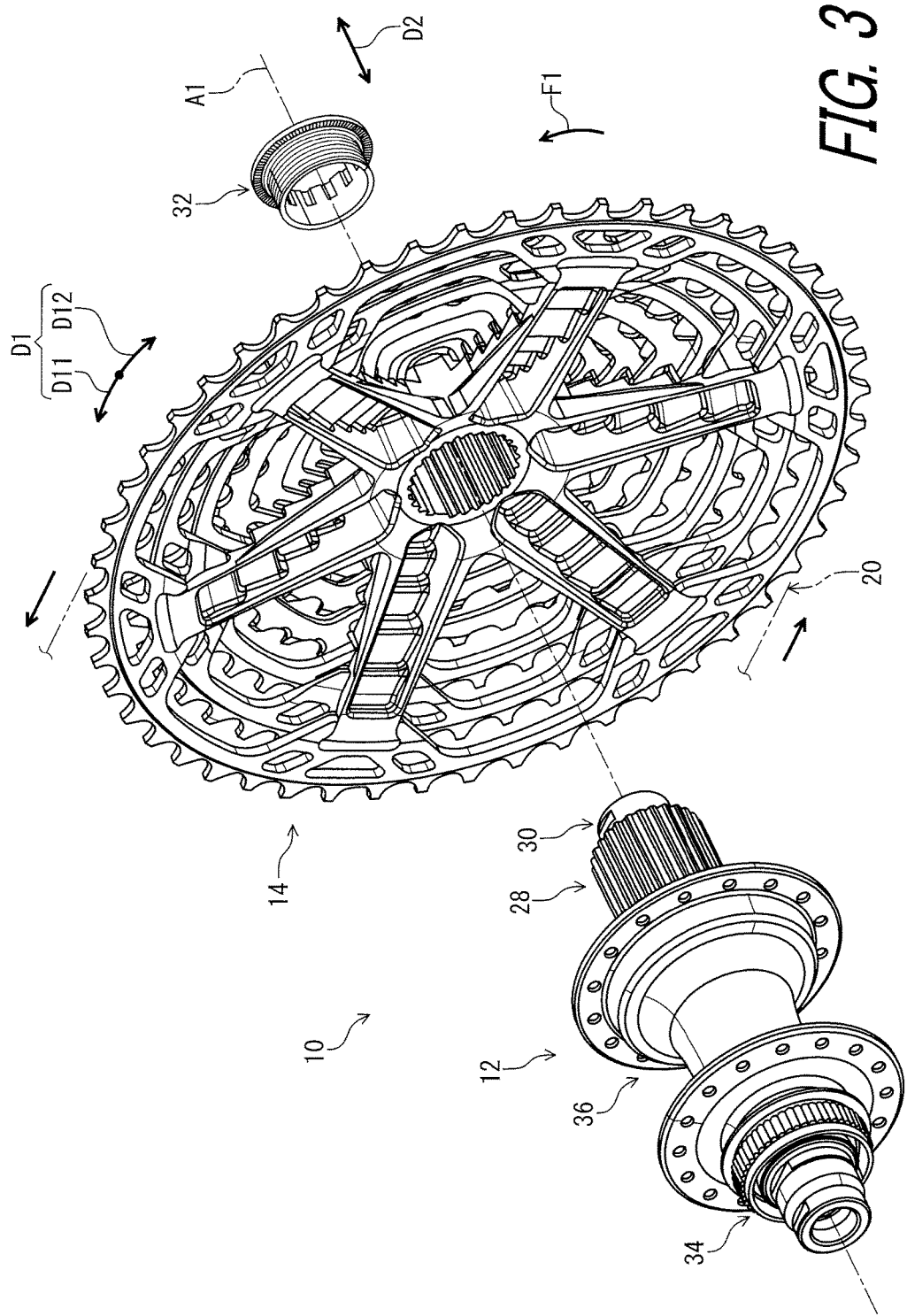
FIG. 3 is another perspective view of the bicycle drive train illustrated in FIG. 2.

As seen in FIGS. 2 and 3, the bicycle hub assembly 12 and the bicycle rear sprocket assembly 14 have a rotational center axis A1. The bicycle rear sprocket assembly 14 is rotatably supported by the bicycle hub assembly 12 relative to the bicycle frame BF (FIG. 1) about the rotational center axis A1. The bicycle rear sprocket assembly 14 is configured to be engaged with the bicycle chain 20 to transmit a driving rotational force F1 between the bicycle chain 20 and the bicycle rear sprocket assembly 14 during pedaling. The bicycle rear sprocket assembly 14 is rotated about the rotational center axis A1 in a driving rotational direction D11 during pedaling. The driving rotational direction D11 is defined along a circumferential direction D1 of the bicycle hub assembly 12 or the bicycle rear sprocket assembly 14. A reverse rotational direction D12 is an opposite direction of the driving rotational direction D11 and is defined along the circumferential direction D1.

As seen in FIG. 2, the bicycle hub assembly 12 comprises a sprocket support body 28. The bicycle rear sprocket assembly 14 is mounted on the sprocket support body 28 to transmit the driving rotational force F1 between the sprocket support body 28 and the bicycle rear sprocket assembly 14. The bicycle hub assembly 12 comprises a hub axle 30. The sprocket support body 28 is rotatably mounted on the hub axle 30 about the rotational center axis A1. The bicycle hub assembly 12 comprises a lock ring 32. The lock ring 32 is secured to the sprocket support body 28 to hold the bicycle rear sprocket assembly 14 relative to the sprocket support body 28 in an axial direction D2 parallel to the rotational center axis A1.

Figure 4:
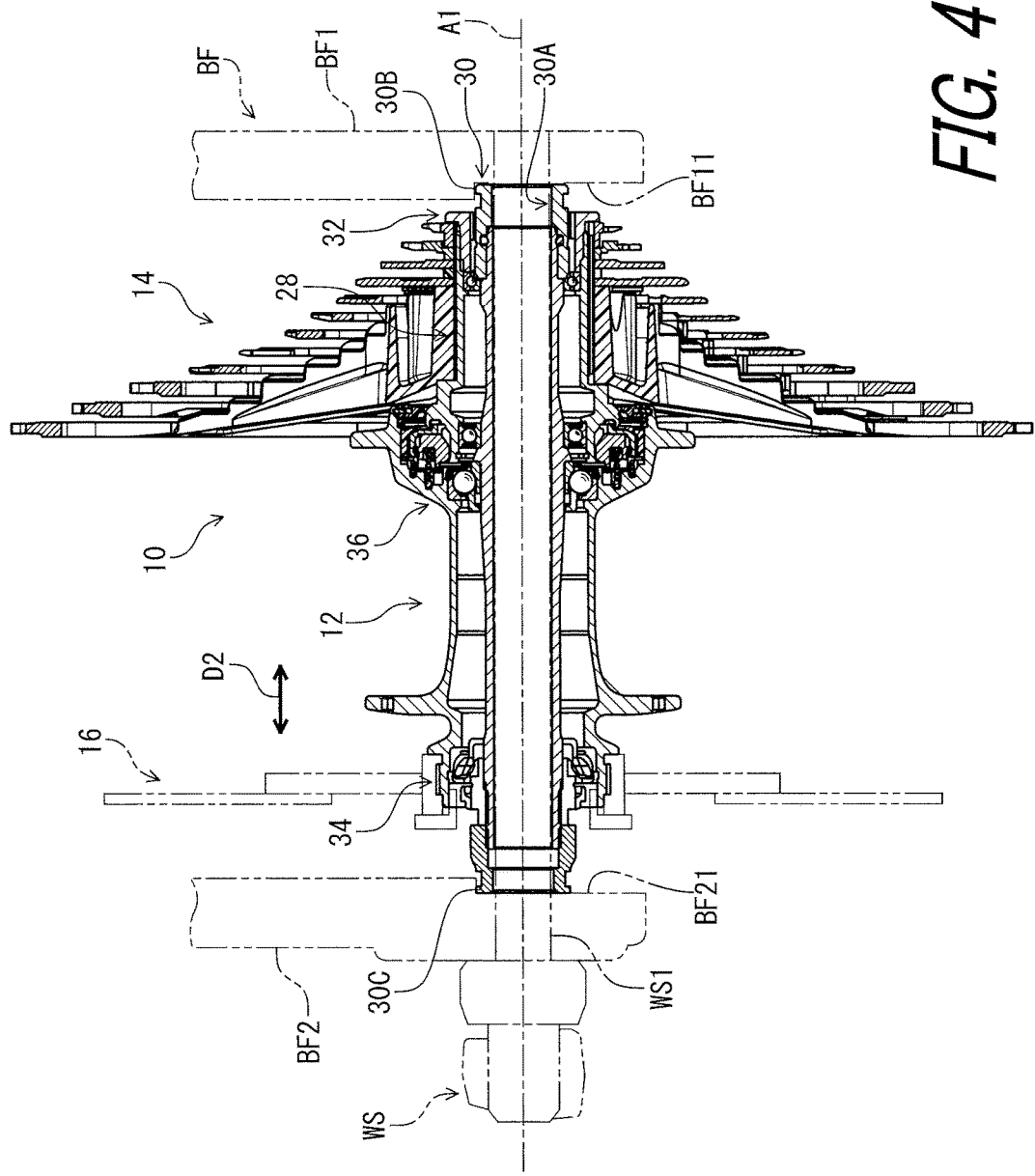
FIG. 4 is a cross-sectional view of the bicycle drive train taken along line IV-IV of FIG. 2.

As seen in FIG. 4, the bicycle hub assembly 12 is secured to the bicycle frame BF with a wheel securing structure WS. The hub axle 30 has a through hole 30A. A securing rod WS1 of the wheel securing structure WS extends through the through hole 30A of the hub axle 30. The hub axle 30 includes a first axle end 30B and a second axle end 30C. The hub axle 30 extends between the first axle end 30B and the second axle end 30C along the rotational center axis A1. The first axle end 30B is provided in a first recess BF11 of a first frame BF1 of the bicycle frame BF. The second axle end 30C is provided in a second recess BF21 of a second frame BF2 of the bicycle frame BF. The hub axle 30 is held between the first frame BF1 and the second frame BF2 with the wheel securing structure WS. The wheel securing structure WS includes a structure which has been known in the bicycle filed. Thus, it will not be described in detail here for the sake of brevity.

Figure 5:
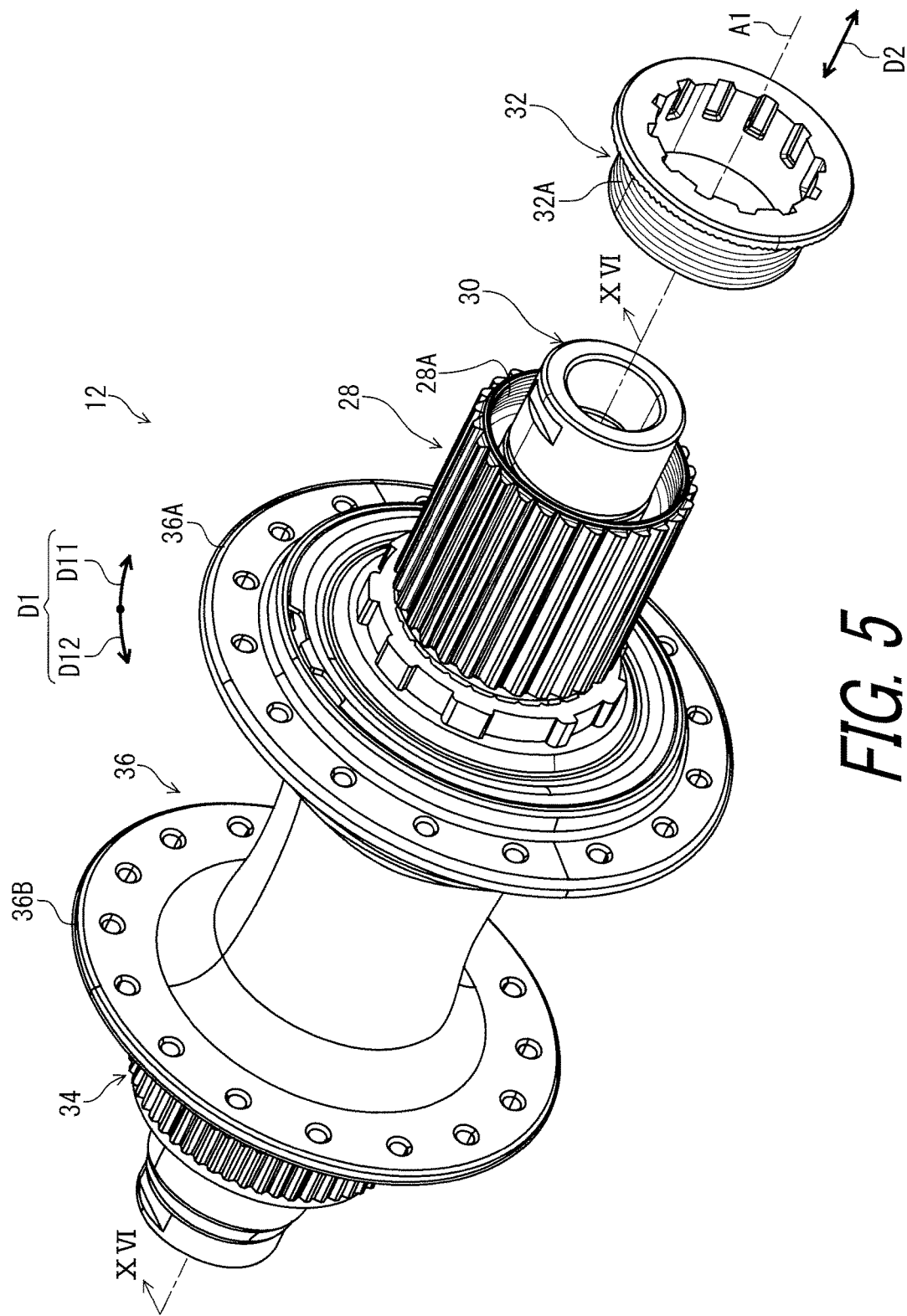
FIG. 5 is an exploded perspective view of a bicycle hub assembly of the bicycle drive train illustrated in FIG. 2.

As seen in FIGS. 4 and 5, the bicycle hub assembly 12 further comprises a brake-rotor support body 34. The brake-rotor support body 34 is rotatably mounted on the hub axle 30 about the rotational center axis A1. The brake-rotor support body 34 is coupled to the bicycle brake rotor 16 (FIG. 1) to transmit a braking rotational force from the bicycle brake rotor 16 to the brake-rotor support body 34.

As seen in FIG. 5, the bicycle hub assembly 12 comprises a hub body 36. The hub body 36 is rotatably mounted on the hub axle 30 about the rotational center axis A1 of the bicycle hub assembly 12. In this embodiment, the sprocket support body 28 is a separate member from the hub body 36. The brake-rotor support body 34 is integrally provided with the hub body 36 as a one-piece unitary member. However, the sprocket support body 28 can be integrally provided with the hub body 36. The brake-rotor support body 34 can be a separate member from the hub body 36.

The lock ring 32 includes an externally threaded part 32A. The sprocket support body 28 includes an internally threaded part 28A. The externally threaded part 32A is threadedly engaged with the internally threaded part 28A in a state where the lock ring 32 is secured to the sprocket support body 28.

Figure 6:
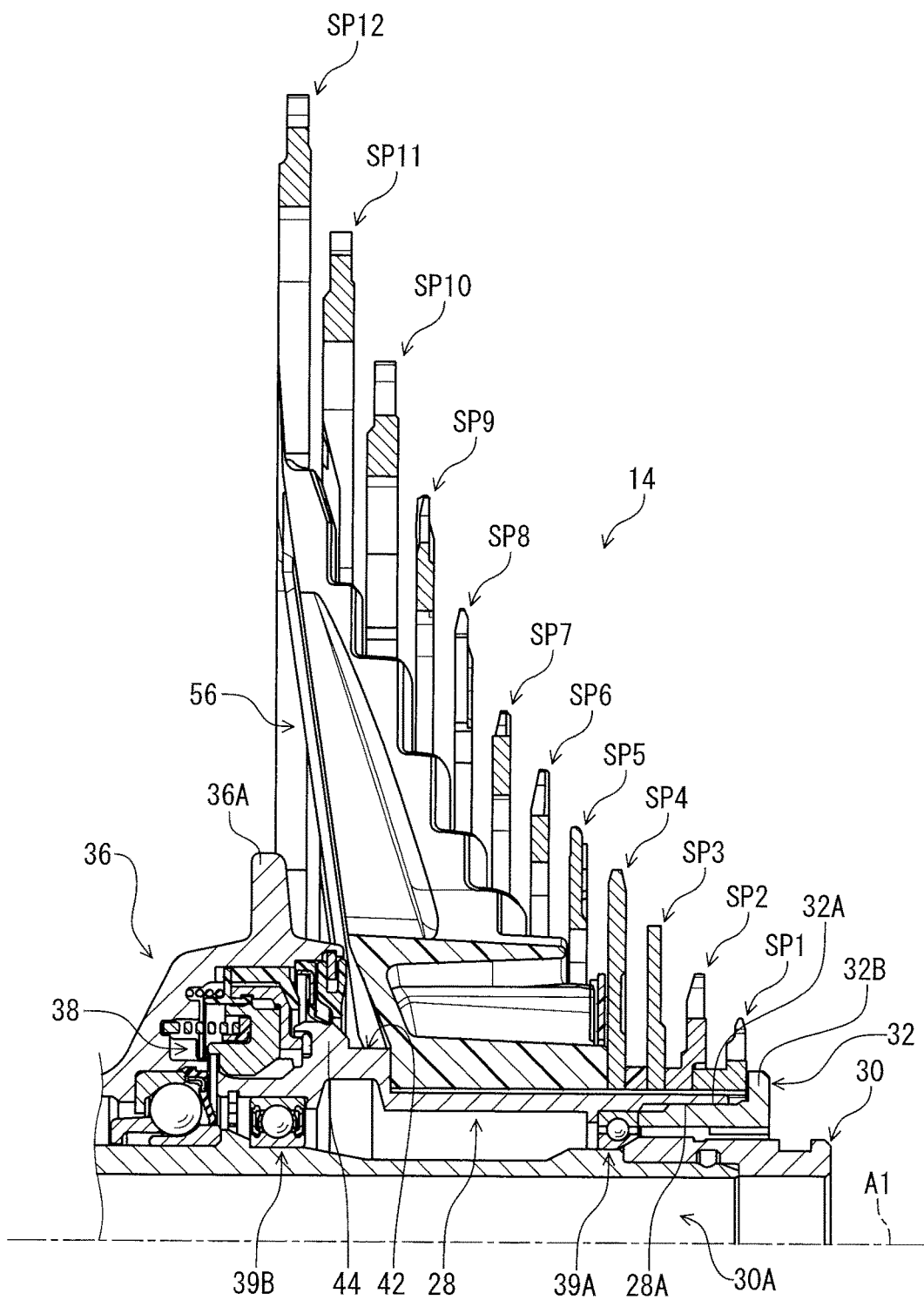
FIG. 6 is an enlarged cross-sectional view of the bicycle drive train illustrated in FIG. 4.

As seen in FIG. 6, the bicycle hub assembly 12 comprises a freewheel structure 38. The sprocket support body 28 is operatively coupled to the hub body 36 with the freewheel structure 38. The freewheel structure 38 is configured to couple the sprocket support body 28 to the hub body 36 to rotate the sprocket support body 28 along with the hub body 36 in the driving rotational direction D11 (FIG. 5) during pedaling. The freewheel structure 38 is configured to allow the sprocket support body 28 to rotate relative to the hub body 36 in the reverse rotational direction D12 (FIG. 5) during coasting. Accordingly, the freewheel structure 38 may be paraphrased into a one-way clutch structure 38. The freewheel structure 38 will be described in detail later.

The bicycle hub assembly 12 includes a first bearing 39A and a second bearing 39B. The first bearing 39A and the second bearing 39B are provided between the sprocket support body 28 and the hub axle 30 to rotatably support the sprocket support body 28 relative to the hub axle 30 about the rotational center axis A1.

In this embodiment, each of the sprocket support body 28, the brake-rotor support body 34, and the hub body 36 is made of a metallic material such as aluminum, iron, or titanium. However, at least one of the sprocket support body 28, the brake-rotor support body 34, and the hub body 36 can be made of a non-metallic material.

Figure 7:
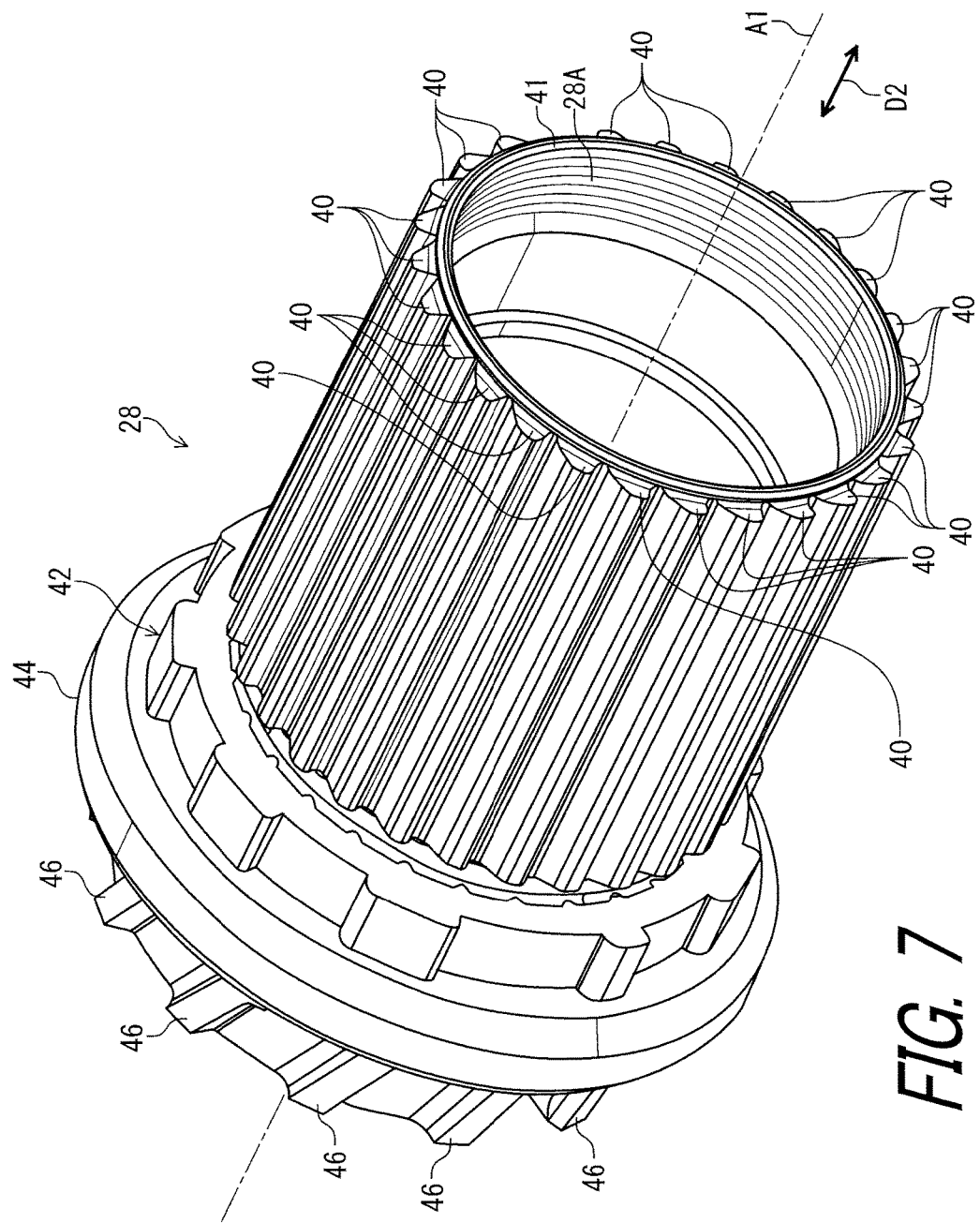
FIG. 7 is a perspective view of a sprocket support body of the bicycle hub assembly of the bicycle drive train illustrated in FIG. 2.
Figure 8:
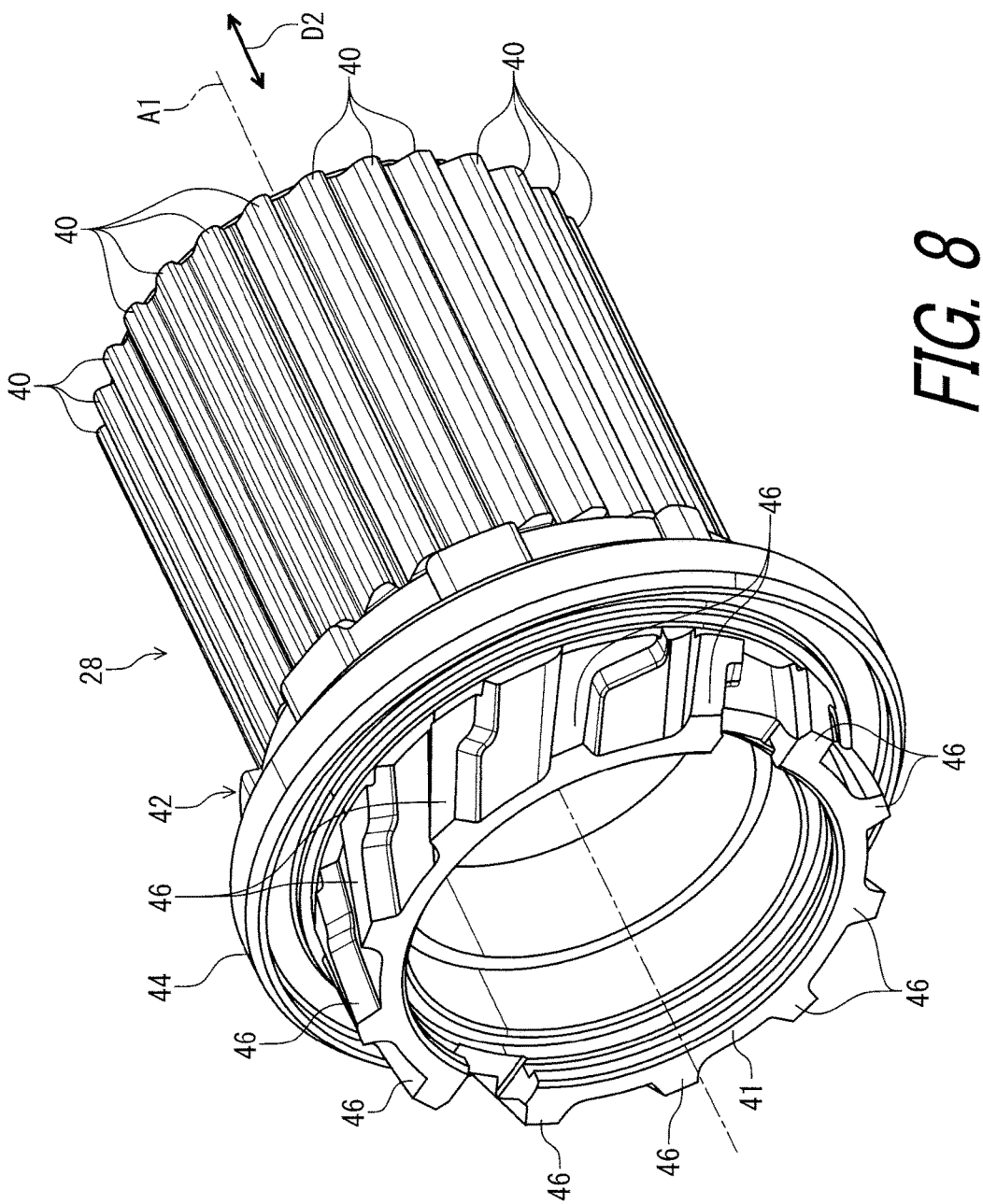
FIG. 8 is another perspective view of the sprocket support body of the bicycle hub assembly of the bicycle drive train illustrated in FIG. 2.

As seen in FIGS. 7 and 8, the sprocket support body 28 includes at least one external spline tooth 40 configured to engage with the bicycle rear sprocket assembly 14 (FIG. 6). The sprocket support body 28 includes a plurality of external spline teeth 40 configured to engage with the bicycle rear sprocket assembly 14 (FIG. 6). Namely, the at least one external spline tooth 40 includes a plurality of external spline teeth 40. The sprocket support body 28 includes at least nine external spline teeth 40 configured to engage with the bicycle rear sprocket assembly 14 (FIG. 6). The sprocket support body 28 includes at least ten external spline teeth 40 configured to engage with the bicycle rear sprocket assembly 14 (FIG. 6).

The sprocket support body 28 includes a base support 41 having a tubular shape. The base support 41 extends along the rotational center axis A1. The external spline tooth 40 extends radially outwardly from the base support 41. The sprocket support body 28 includes a larger-diameter part 42, a flange 44, and a plurality of helical external spline teeth 46.

The larger-diameter part 42 and the flange 44 extend radially outwardly from the base support 41. The larger-diameter part 42 is provided between the plurality of external spline teeth 40 and the flange 44 in the axial direction D2. The larger-diameter part 42 and the flange 44 are provided between the plurality of external spline teeth 40 and the plurality of helical external spline teeth 46 in the axial direction D2. As seen in FIG. 6, the bicycle rear sprocket assembly 14 is held between the larger-diameter part 42 and a lock flange 32B of the lock ring 32 in the axial direction D2. The larger-diameter part 42 may have an interior cavity so that a drive structure such as a one-way clutch structure can be contained within the interior cavity. The larger-diameter part 42 can be omitted from the bicycle hub assembly 12 according to need.

Figure 9:
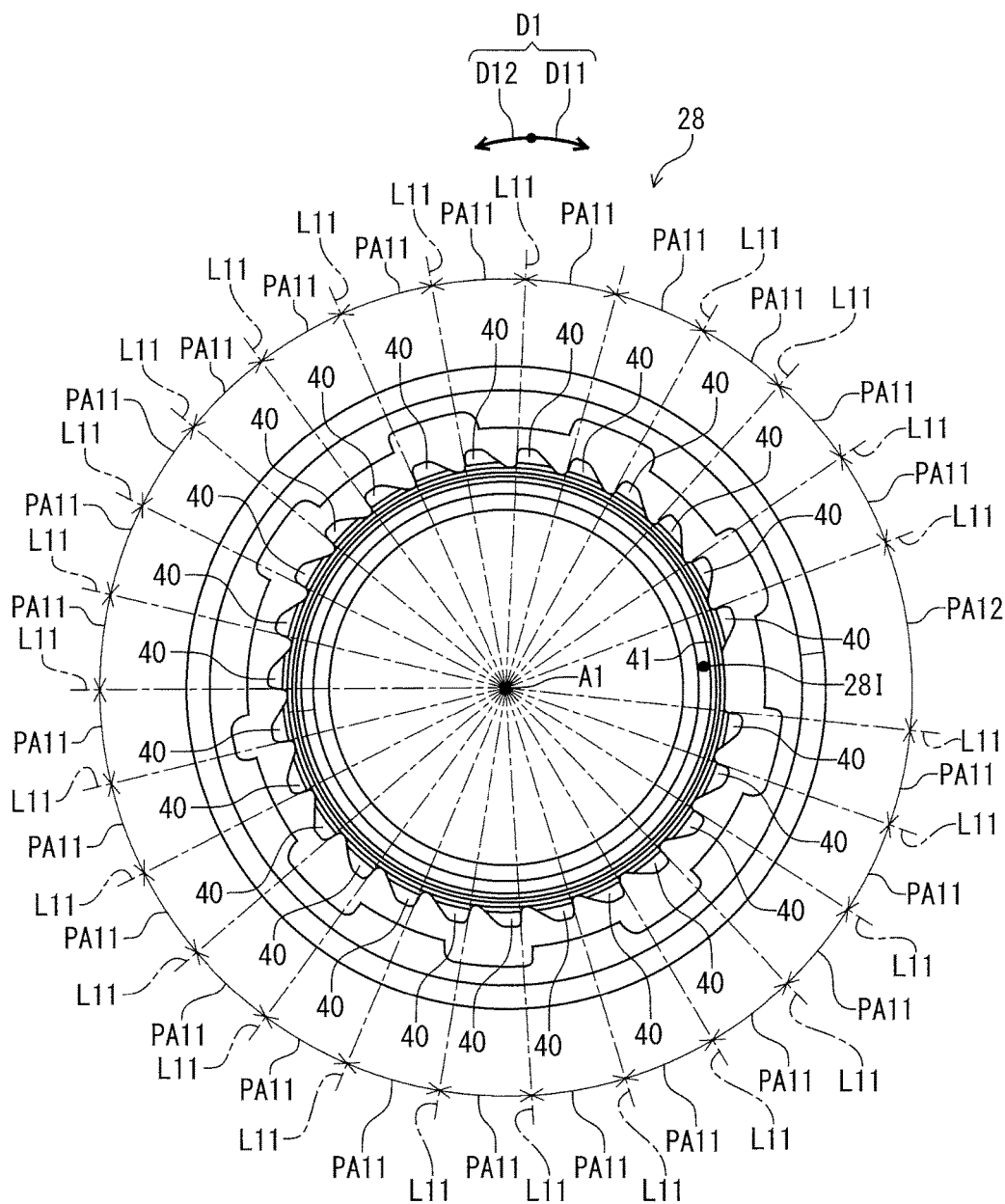
FIG. 9 is a side elevational view of the sprocket support body illustrated in FIG. 7.

As seen in FIG. 9, a total number of the at least ten external spline teeth 40 is equal to or larger than 20. The total number of the at least ten external spline teeth 40 is equal to or larger than 25. In this embodiment, the total number of the at least ten external spline teeth 40 is 26. However, a total number of the external spline teeth 40 is not limited to this embodiment and the above ranges.

The at least ten external spline teeth 40 have a first external pitch angle PA11 and a second external pitch angle PA12. At least two external spline teeth of the at least ten external spline teeth 40 are circumferentially arranged at the first external pitch angle PA11 with respect to the rotational center axis A1 of the bicycle hub assembly 12. In other words, at least two of the plurality of external spline teeth 40 are circumferentially arranged at the first external pitch angle PA11 with respect to the rotational center axis A1 of the bicycle hub assembly 12. At least two external spline teeth of the at least ten external spline teeth 40 are circumferentially arranged at the second external pitch angle PA12 with respect to the rotational center axis A1 of the bicycle hub assembly 12. In other words, at least two of the plurality of external spline teeth 40 are circumferentially arranged at the second external pitch angle PA12 with respect to the rotational center axis A1 of the bicycle hub assembly 12. In this embodiment, the second external pitch angle PA12 is different from the first external pitch angle PA11. However, the second external pitch angle PA12 can be substantially equal to the first external pitch angle PA11.

In this embodiment, the external spline teeth 40 are arranged at the first external pitch angle PA11 in the circumferential direction D1. Two external spline teeth of the external spline teeth 40 are arranged at the second external pitch angle PA12 in the circumferential direction D1. However, at least two external spline teeth of the external spline teeth 40 can be arranged at another external pitch angle in the circumferential direction D1.

The first external pitch angle PA11 ranges from 10 degrees to 20 degrees. The first external pitch angle PA11 ranges from 12 degrees to 15 degrees. The first external pitch angle PA11 ranges from 13 degrees to 14 degrees. In this embodiment, the first external pitch angle PA11 is 13.3 degrees. However, the first external pitch angle PA11 is not limited to this embodiment and the above ranges.

The second external pitch angle PA12 ranges from 5 degrees to 30 degrees. In this embodiment, the second external pitch angle PA12 is 26 degrees. However, the second external pitch angle PA12 is not limited to this embodiment and the above range.

Figure 10:
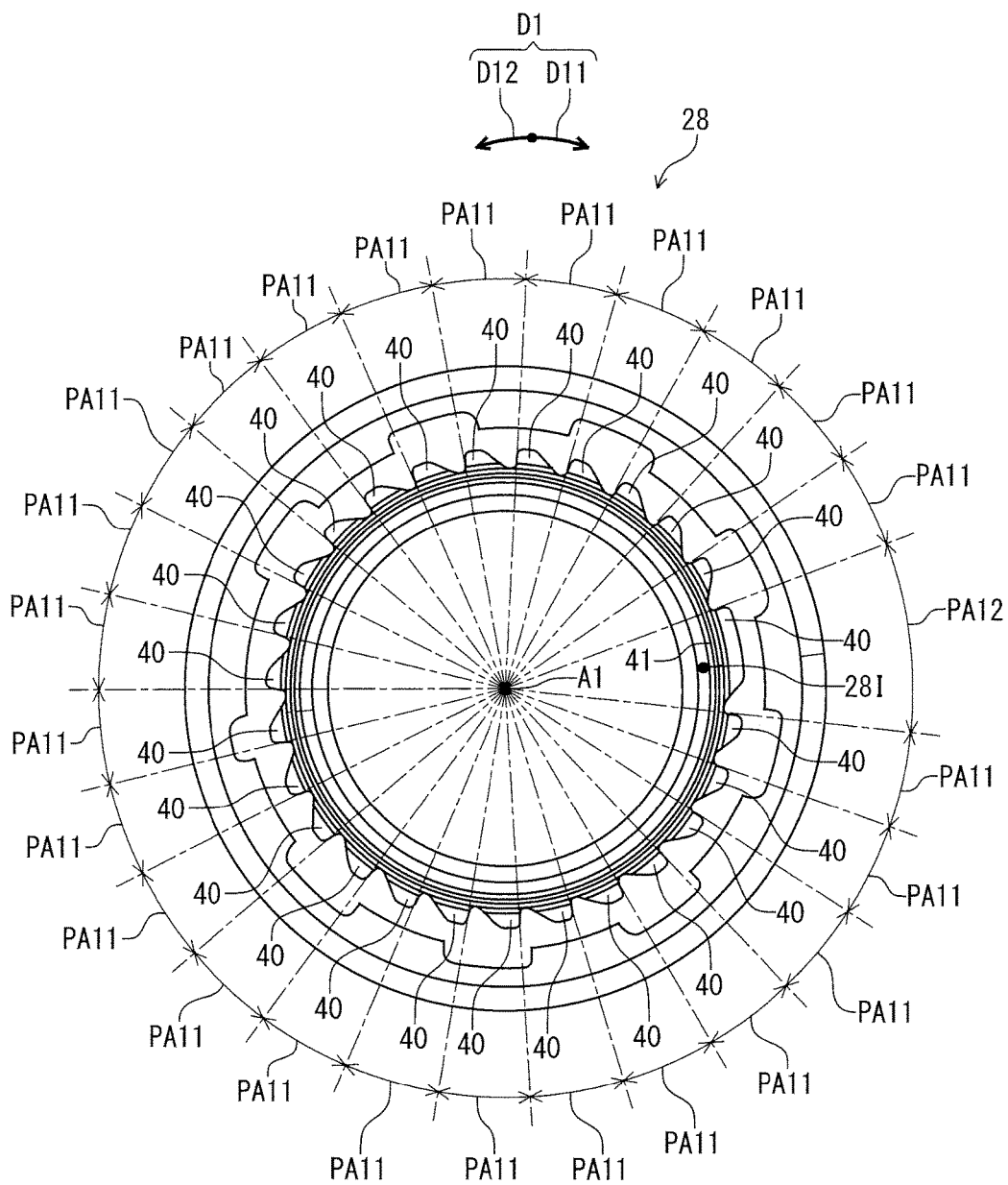
FIG. 10 is a side elevational view of a sprocket support body of the bicycle hub assembly in accordance with a modification.

The external spline teeth 40 have substantially the same shape as each other. The external spline teeth 40 have substantially the same spline size as each other. The external spline teeth 40 have substantially the same profile as each other when viewed along the rotational center axis A1. As seen in FIG. 10, however, at least one of the at least ten external spline teeth 40 can have a first spline shape different from a second spline shape of another of the at least ten external spline teeth 40. At least one of the at least ten external spline teeth 40 can have a first spline size different from a second spline size of another of the at least ten external spline teeth 40. At least one of the at least ten external spline teeth 40 can have a profile different from a profile of another of the at least ten external spline teeth 40 when viewed along the rotational center axis A1. In FIG. 10, one of the external spline teeth 40 has a spline shape different from a spline shape of the other teeth of the external spline teeth 40. One of the external spline teeth 40 has a spline size different from a spline size of the other teeth of the external spline teeth 40. One of the external spline teeth 40 has a profile different from a profile of the other teeth of the external spline teeth 40 when viewed along the rotational center axis A1.

Figure 11:
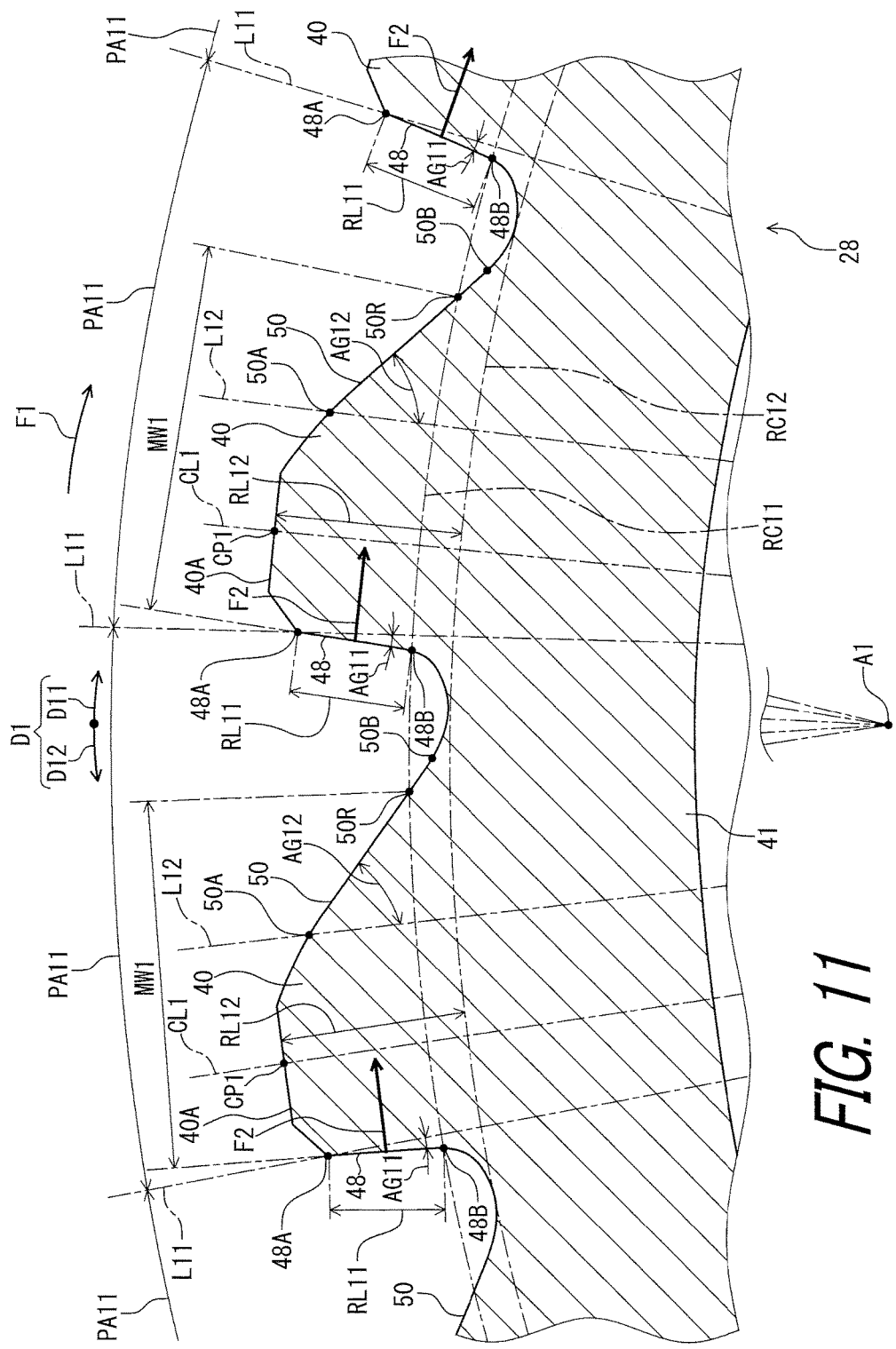
FIG. 11 is an enlarged cross-sectional view of the sprocket support body illustrated in FIG. 7.

As seen in FIG. 11, each of the at least ten external spline teeth 40 has an external-spline driving surface 48 and an external-spline non-driving surface 50. The plurality of external spline teeth 40 includes a plurality of external-spline driving surfaces 48 to receive the driving rotational force F1 from the bicycle rear sprocket assembly 14 (FIG. 6) during pedaling. The plurality of external spline teeth 40 includes a plurality of external-spline non-driving surfaces 50. The external-spline driving surface 48 is contactable with the bicycle rear sprocket assembly 14 to receive the driving rotational force F1 from the bicycle rear sprocket assembly 14 (FIG. 6) during pedaling. The external-spline driving surface 48 faces in the reverse rotational direction D12. The external-spline driving surface 48 faces an internal-spline driving surface 66 of the bicycle rear sprocket assembly 14 in a state where the bicycle rear sprocket assembly 14 is mounted to the bicycle hub assembly 12. The external-spline non-driving surface 50 is provided on a reverse side of the external-spline driving surface 48 in the circumferential direction D1. The external-spline non-driving surface 50 faces in the driving rotational direction D11 not to receive the driving rotational force F1 from the bicycle rear sprocket assembly 14 during pedaling. The external-spline non-driving surface 50 faces an internal-spline non-driving surface 68 of the bicycle rear sprocket assembly 14 in a state where the bicycle rear sprocket assembly 14 is mounted to the bicycle hub assembly 12.

The at least ten external spline teeth 40 respectively have circumferential maximum widths MW1. The external spline teeth 40 respectively have circumferential maximum widths MW1. The circumferential maximum width MW1 is defined as a maximum width to receive a thrust force F2 applied to the external spline tooth 40. The circumferential maximum width MW1 is defined as a straight distance based on the external-spline driving surface 48.

The plurality of external-spline driving surfaces 48 each includes a radially outermost edge 48A and a radially innermost edge 48B. The external-spline driving surface 48 extends from the radially outermost edge 48A to the radially innermost edge 48B. A first reference circle RC11 is defined on the radially innermost edge 48B and is centered at the rotational center axis A1. The first reference circle RC11 intersects with the external-spline non-driving surface 50 at a reference point 50R. The circumferential maximum width MW1 extends straight from the radially innermost edge 48B to the reference point 50R in the circumferential direction D1.

The plurality of external-spline non-driving surfaces 50 each includes a radially outermost edge 50A and a radially innermost edge 50B. The external-spline non-driving surface 50 extends from the radially outermost edge 50A to the radially innermost edge 50B. The reference point 50R is provided between the radially outermost edge 50A and the radially innermost edge 50B. However, the reference point 50R can coincide with the radially innermost edge 50B.

A total of the circumferential maximum widths MW1 is equal to or larger than 55 mm. The total of the circumferential maximum widths MW1 is equal to or larger than 60 mm. The total of the circumferential maximum widths MW1 is equal to or larger than 65 mm. In this embodiment, the total of the circumferential maximum widths MW1 is 68 mm. However, the total of the circumferential maximum widths MW1 is not limited to this embodiment and the above ranges.

Figure 12:
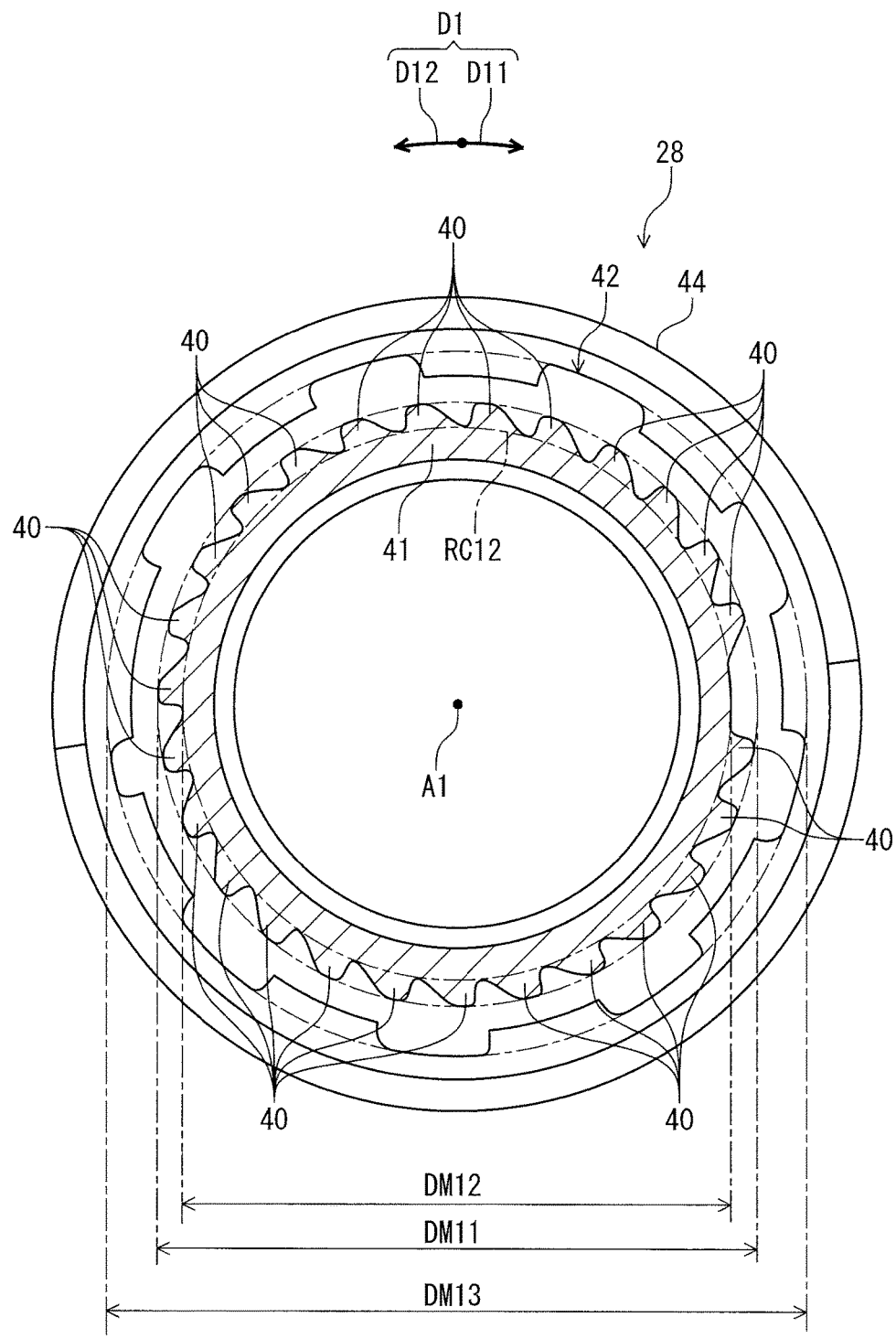
FIG. 12 is a cross-sectional view of the sprocket support body illustrated in FIG. 7.

As seen in FIG. 12, the at least one external spline tooth 40 has an external-spline major diameter DM11. The external-spline major diameter DM11 is equal to or larger than 25 mm. The external-spline major diameter DM11 is equal to or larger than 29 mm. The external-spline major diameter DM11 is equal to or smaller than 30 mm. In this embodiment, the external-spline major diameter DM11 is 29.6 mm. However, the external-spline major diameter DM11 is not limited to this embodiment and the above ranges. For example, the external-spline major diameter DM11 can be larger than 34 mm and smaller than 35 mm. An example of the external-spline major diameter DM11 includes 34.55 mm.

The at least one external spline tooth 40 has an external-spline minor diameter DM12. The at least one external spline tooth 40 has an external-spline root circle RC12 having the external-spline minor diameter DM12. However, the external-spline root circle RC12 can have another diameter different from the external-spline minor diameter DM12. The external-spline minor diameter DM12 is equal to or smaller than 28 mm. The external-spline minor diameter DM12 is equal to or larger than 25 mm. The external-spline minor diameter DM12 is equal to or larger than 27 mm. In this embodiment, the external-spline minor diameter DM12 is 27.2 mm. However, the external-spline minor diameter DM12 is not limited to this embodiment and the above ranges.

The larger-diameter part 42 has an outer diameter DM13 larger than the external-spline major diameter DM11. The outer diameter DM13 ranges from 32 mm to 40 mm. In this embodiment, the outer diameter DM13 is 35 mm. However, the outer diameter DM13 is not limited to this embodiment.

As seen in FIG. 11, the plurality of external-spline driving surfaces 48 each includes a radial length RL11 defined from the radially outermost edge 48A to the radially innermost edge 48B. A total of the radial lengths RL11 of the plurality of external-spline driving surfaces 48 is equal to or larger than 7 mm. The total of the radial lengths RL11 is equal to or larger than 10 mm. The total of the radial lengths RL11 is equal to or larger than 15 mm. In this embodiment, the total of the radial lengths RL11 is 19.5 mm. However, the total of the radial lengths RL11 is not limited to this embodiment.

The plurality of external spline tooth 40 has an additional radial length RL12. The additional radial lengths RL12 are respectively defined from the external-spline root circle RC12 to radially outermost ends 40A of the plurality of external spline teeth 40. A total of the additional radial lengths RL12 is equal to or larger than 12 mm. In this embodiment, the total of the additional radial lengths RL12 is 31.85 mm. However, the total of the additional radial lengths RL12 is not limited to this embodiment.

At least one of the at least nine external spline teeth 40 has an asymmetric shape with respect to a circumferential tooth-tip center line CL1. The circumferential tooth-tip center line CL1 is a line connecting the rotational center axis A1 and a circumferential center point CP1 of the radially outermost end 40A of the external spline tooth 40. However, at least one of the external spline teeth 40 can have a symmetric shape with respect to the circumferential tooth-tip center line CL1. The at least one of the at least nine external spline teeth 40 comprises the external-spline driving surface 48 and the external-spline non-driving surface 50.

The external-spline driving surface 48 has a first external-spline-surface angle AG11. The first external-spline-surface angle AG11 is defined between the external-spline driving surface 48 and a first radial line L11. The first radial line L11 extends from the rotational center axis A1 of the bicycle hub assembly 12 to the radially outermost edge 48A of the external-spline driving surface 48. The first external pitch angle PA11 or the second external pitch angle PA12 is defined between the adjacent first radial lines L11 (see, e.g., FIG. 9).

The external-spline non-driving surface 50 has a second external-spline-surface angle AG12. The second external-spline-surface angle AG12 is defined between the external-spline non-driving surface 50 and a second radial line L12. The second radial line L12 extends from the rotational center axis A1 of the bicycle hub assembly 12 to the radially outermost edge 50A of the external-spline non-driving surface 50.

In this embodiment, the second external-spline-surface angle AG12 is different from the first external-spline-surface angle AG11. The first external-spline-surface angle AG11 is smaller than the second external-spline-surface angle AG12. However, the first external-spline-surface angle AG11 can be equal to or larger than the second external-spline-surface angle AG12.

The first external-spline-surface angle AG11 ranges from 0 degree to 10 degrees. The second external-spline-surface angle AG12 ranges from 0 degree to 60 degrees. In this embodiment, the first external-spline-surface angle AG11 is 5 degrees. The second external-spline-surface angle AG12 is 45 degrees. However, the first external-spline-surface angle AG11 and the second external-spline-surface angle AG12 are not limited to this embodiment and the above ranges.

Figure 13:
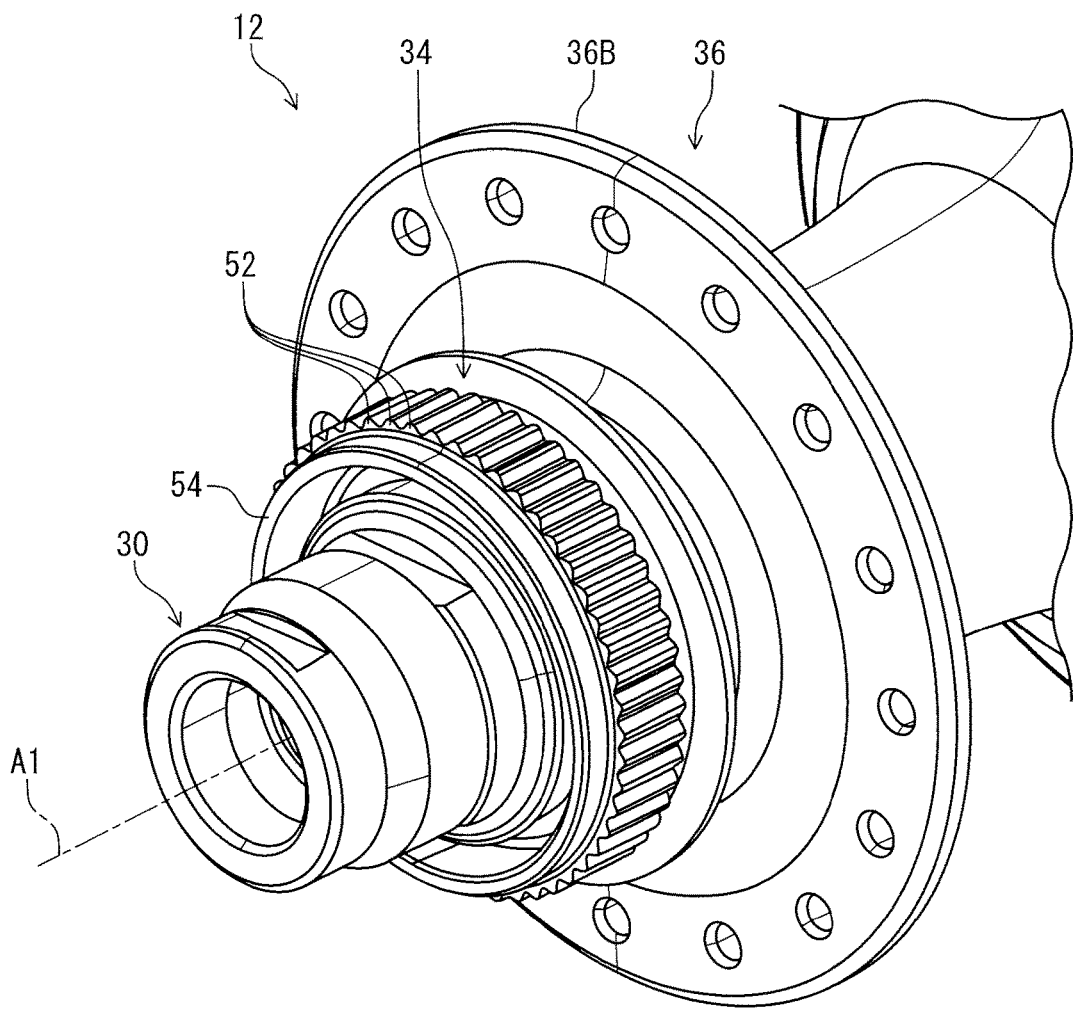
FIG. 13 is a perspective view of the bicycle hub assembly of the bicycle drive train illustrated in FIG. 2.
Figure 14:
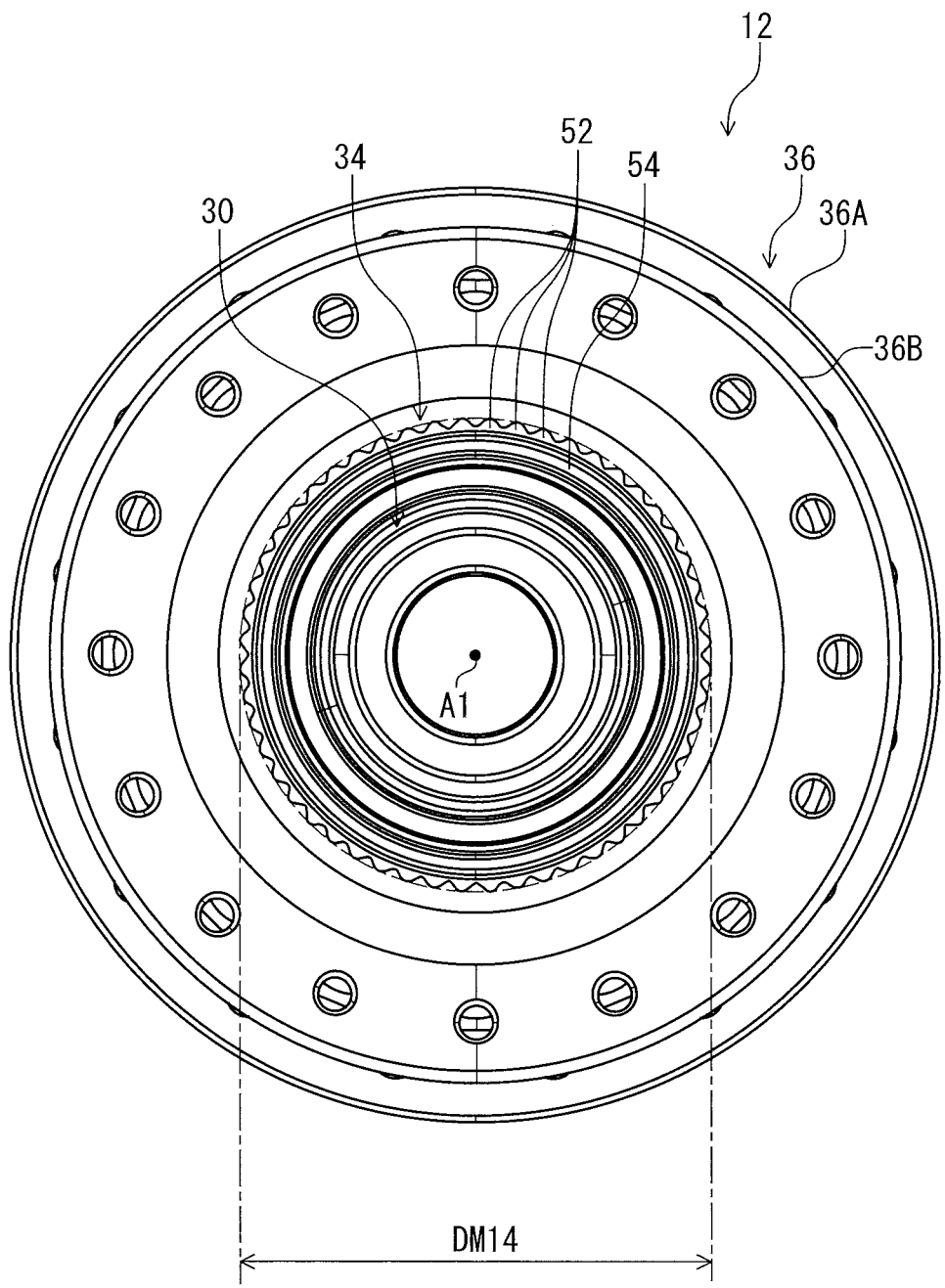
FIG. 14 is a side elevational view of the bicycle hub assembly of the bicycle drive train illustrated in FIG. 2.

As seen in FIGS. 13 and 14, the brake-rotor support body 34 includes at least one additional external spline tooth 52 configured to engage with the bicycle brake rotor 16 (FIG. 4). In this embodiment, the brake-rotor support body 34 includes an additional base support 54 and a plurality of additional external spline teeth 52. The additional base support 54 has a tubular shape and extends from the hub body 36 along the rotational center axis A1. The additional external spline tooth 52 extends radially outwardly from additional base support 54. A total number of the additional external spline teeth 52 is 52. However, the total number of the additional external spline teeth 52 is not limited to this embodiment.

Figure 15:
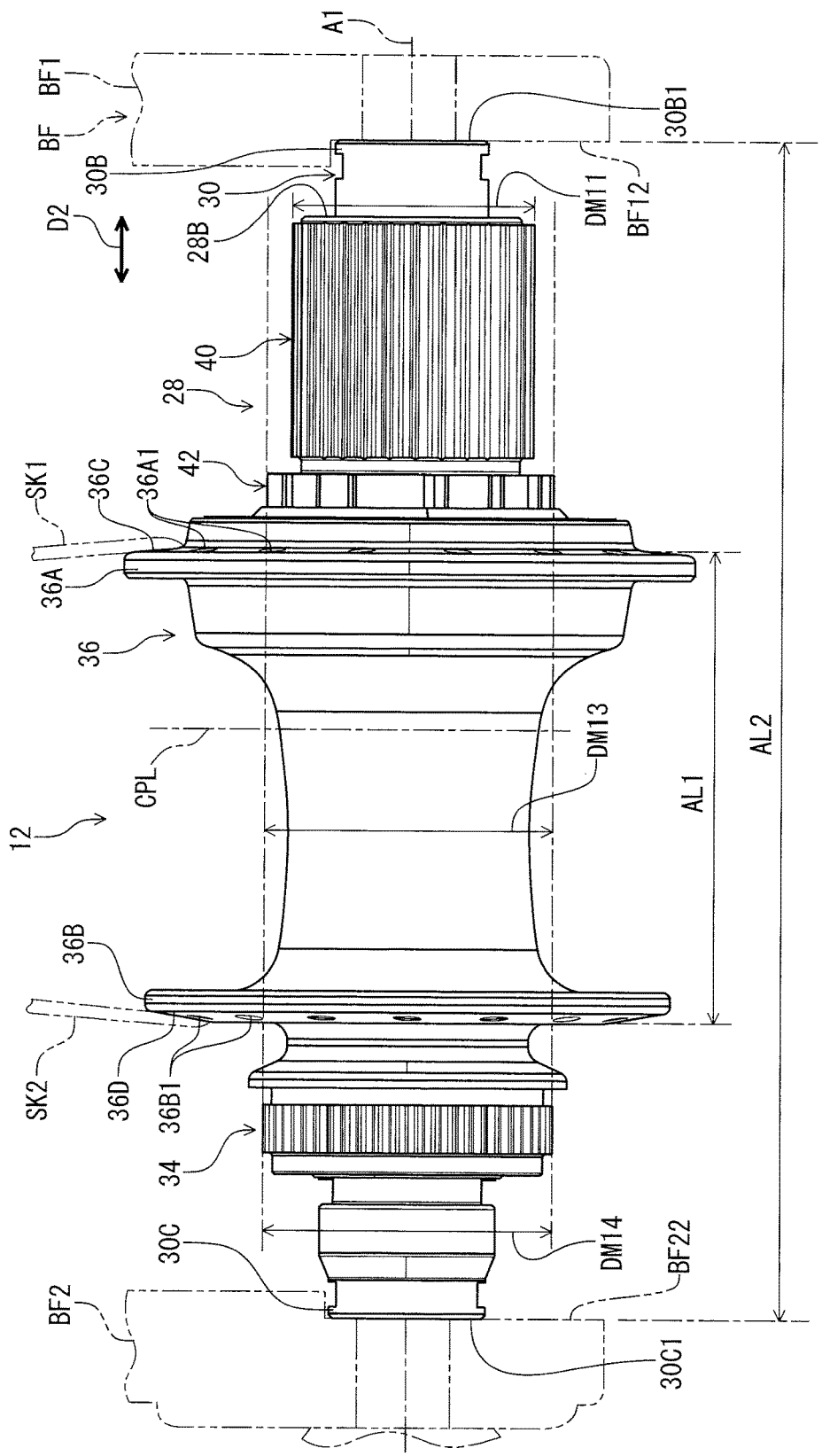
FIG. 15 is a rear view of the bicycle hub assembly of the bicycle drive train illustrated in FIG. 2.

As seen in FIG. 14, the at least one additional external spline tooth 52 has an additional external-spline major diameter DM14. As seen in FIG. 15, the additional external-spline major diameter DM14 is larger than the external-spline major diameter DM11. The additional external-spline major diameter DM14 is substantially equal to the outer diameter DM13 of the larger-diameter part 42. However, the additional external-spline major diameter DM14 can be equal to or smaller than the external-spline major diameter DM11. The additional external-spline major diameter DM14 can be different from the outer diameter DM13 of the larger-diameter part 42.

As seen in FIG. 15, the hub body 36 includes a first spoke-mounting portion 36A and a second spoke-mounting portion 36B. A plurality of first spokes SK1 are coupled to the first spoke-mounting portion 36A. A plurality of second spokes SK2 are coupled to the second spoke-mounting portion 36B. In this embodiment, the first spoke-mounting portion 36A includes a plurality of first attachment holes 36A1. The first spoke SK1 extends through the first attachment hole 36A1. The second spoke-mounting portion 36B includes a plurality of second attachment holes 36B1. The second spoke SK2 extends through the second attachment hole 36B1. The term "spoke-mounting portion", as used herein, encompasses configurations in which the spoke-mounting opening has a flange-like shape so that the spoke mounting portion extends radially outwardly with respect to the rotational center axis of the bicycle hub assembly as seen in FIG. 15, and configurations in which the spoke mounting portion is an opening directly formed on a radially outer peripheral surface of the hub body.

The second spoke-mounting portion 36B is spaced apart from the first spoke-mounting portion 36A in the axial direction D2. The first spoke-mounting portion 36A is provided between the sprocket support body 28 and the second spoke-mounting portion 36B in the axial direction D2. The second spoke-mounting portion 36B is provided between the first spoke-mounting portion 36A and the brake-rotor support body 34 in the axial direction D2.

The first spoke-mounting portion 36A has a first axially outermost part 36C. The second spoke-mounting portion 36B has a second axially outermost part 36D. The first axially outermost part 36C includes a surface facing toward the first frame BF1 in the axial direction D2 in a state where the bicycle hub assembly 12 is mounted to the bicycle frame BF. The second axially outermost part 36D includes a surface facing toward the second frame BF2 in the axial direction D2 in a state where the bicycle hub assembly 12 is mounted to the bicycle frame BF.

The hub body 36 includes a first axial length AL1. The first axial length AL1 is defined between the first axially outermost part 36C of the first spoke-mounting portion 36A and the second axially outermost part 36D of the second spoke-mounting portion 36B in the axial direction D2 with respect to the rotational center axis A1. The first axial length AL1 can be equal to or larger than 55 mm. The first axial length AL1 can be equal to or smaller than 80 mm. The first axial length AL1 can be equal to or larger than 60 mm. The first axial length AL1 can be equal to or larger than 65 mm. The first axial length AL1 can be 67 mm. However, the first axial length AL1 is not limited to this embodiment and the above ranges. Examples of the first axial length AL1 include 55.7 mm, 62.3 mm, and 67 mm.

As seen in FIG. 15, the hub axle 30 includes a first axial frame abutment surface 30B1 and a second axial frame abutment surface 30C1. The first axial frame abutment surface 30B1 is configured to abut against a first part BF12 of the bicycle frame BF in the axial direction D2 in the state where the bicycle hub assembly 12 is mounted to the bicycle frame BF. The second axial frame abutment surface 30C1 is configured to abut against a second part BF22 of the bicycle frame BF in the axial direction D2 in the state where the bicycle hub assembly 12 is mounted to the bicycle frame BF. The first axial frame abutment surface 30B1 is positioned closer to the sprocket support body 28 than the second axial frame abutment surface 30C1 in the axial direction D2. The sprocket support body 28 is provided between the first axial frame abutment surface 30B1 and the second axial frame abutment surface 30C1 in the axial direction D2.

The hub axle 30 includes a second axial length AL2. The second axial length AL2 is defined between the first axial frame abutment surface 30B1 and the second axial frame abutment surface 30C1 in the axial direction D2. The second axial length AL2 can be equal to or larger than 140 mm. The second axial length AL2 can be equal to or smaller than 160 mm. The second axial length AL2 can be equal to or larger than 145 mm. The second axial length AL2 can be equal to or larger than 147 mm. The second axial length AL2 can be 148 mm. However, the second axial length AL2 is not limited to this embodiment and the above ranges. Examples of the second axial length AL2 include 142 mm, 148 mm, and 157 mm.

A ratio of the first axial length AL1 to the second axial length AL2 can be equal to or larger than 0.3. The ratio of the first axial length AL1 to the second axial length AL2 can be equal to or larger than 0.4. The ratio of the first axial length AL1 to the second axial length AL2 can be equal to or smaller than 0.5. For example, the ratio of the first axial length AL1 (67 mm) to the second axial length AL2 (148 mm) is approximately 0.45. However, the ratio of first axial length AL1 to the second axial length AL2 is not limited to this embodiment and the above ranges. Examples of the ratio of the first axial length AL1 to the second axial length AL2 include approximately 0.42 (AL1 is 62.3 mm and AL2 is 148 mm), or include approximately 0.39 (AL1 is 55.7 mm and AL2 is 142 mm).

Figure 16:
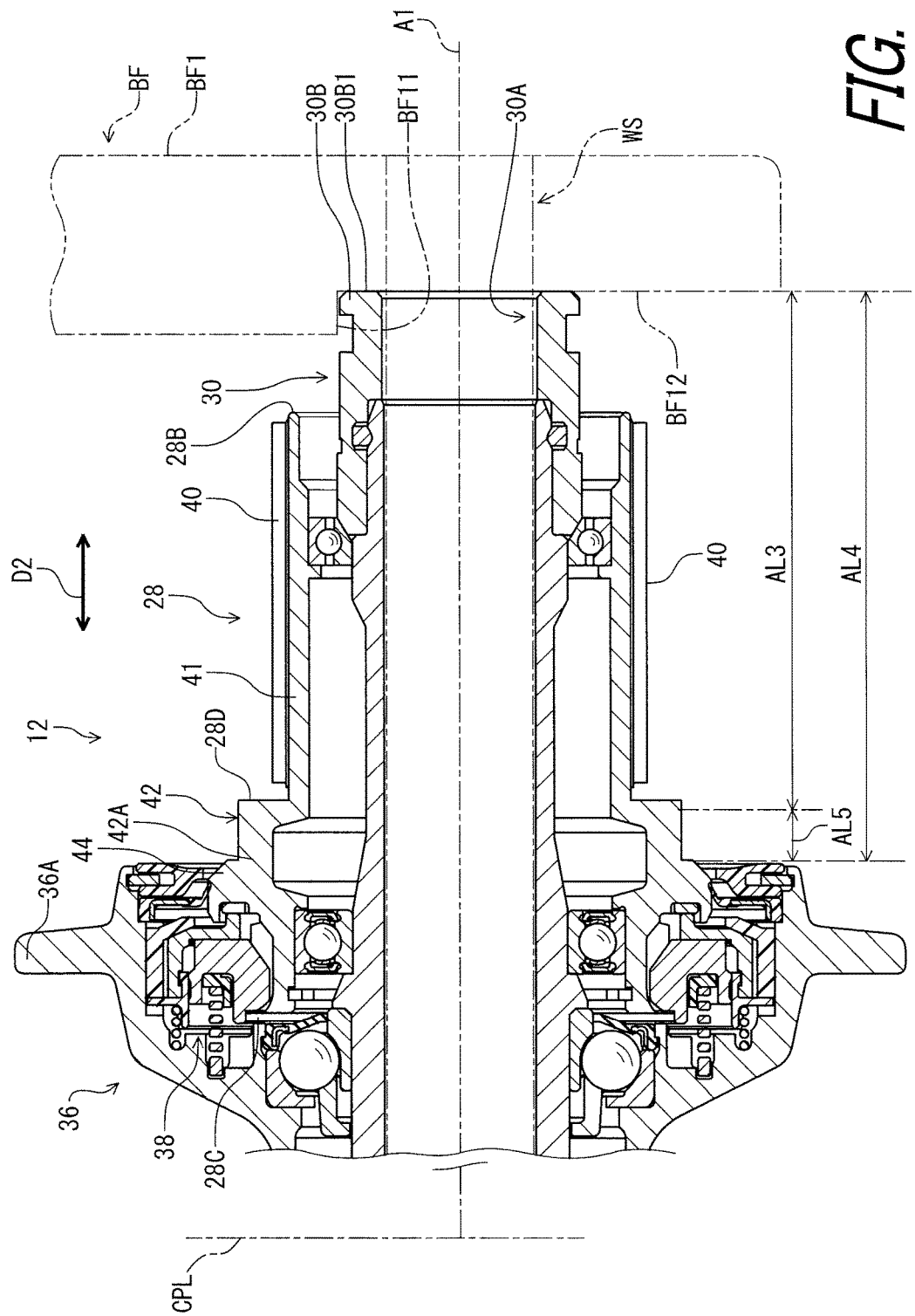
FIG. 16 is a cross-sectional view of the bicycle hub assembly taken along line XVI-XVI of FIG. 5.

As seen in FIG. 16, the sprocket support body 28 includes a first axial end 28B, a second axial end 28C, and an axially sprocket abutment surface 28D. The second axial end 28C is opposite to the first axial end 28B in the axial direction D2. The bicycle hub assembly 12 has an axial center plane CPL that bisects the bicycle hub assembly 12 in the axial direction D2. The axially sprocket abutment surface 28D is positioned closer to the axial center plane CPL of the bicycle hub assembly 12 than the first axial end 28B in the axial direction D2. The second axial end 28C is positioned closer to the axial center plane CPL of the bicycle hub assembly 12 than the axially sprocket abutment surface 28D in the axial direction D2. The axial center plane CPL of the bicycle hub assembly 12 is perpendicular to the rotational center axis A1. The axially sprocket abutment surface 28D is provided on the larger-diameter part 42 in this embodiment whereas the axially sprocket abutment surface 28D can be provided on other parts of the bicycle hub assembly 12 according to need. The axially sprocket abutment surface 28D is in contact with the bicycle rear sprocket assembly 14 in a state where the bicycle rear sprocket assembly 14 is mounted on the sprocket support body 28. The axially sprocket abutment surface 28D faces the first axial end 28B in the axial direction D2.

The hub axle 30 includes a sprocket-arranging axial length AL3. The sprocket-arranging axial length AL3 is defined between the first axial frame abutment surface 30B1 and the axially sprocket abutment surface 28D of the sprocket support body 28 in the axial direction D2. In this embodiment, the sprocket-arranging axial length AL3 ranges from 35 mm to 45 mm. For example, the sprocket-arranging axial length AL3 is 39.64 mm. The sprocket-arranging axial length AL3 can also be extended up to 44.25 mm, for example, by omitting the larger-diameter part 42.

However, the sprocket-arranging axial length AL3 is not limited to this embodiment and the above range.

The larger-diameter part 42 has an axial end 42A which is the farthest from the first axial frame abutment surface 30B1 in the axial direction D2. An additional axial length AL4 is defined from the first axial frame abutment surface 30B1 to the axial end 42A in the axial direction D2. The additional axial length AL4 ranges from 38 mm to 47 mm. The additional axial length AL4 can range from 44 mm to 45 mm. The additional axial length AL4 can also range from 40 mm to 41 mm. In this embodiment, the additional axial length AL4 is 44.25 mm. However, the additional axial length AL4 is not limited to this embodiment and the above ranges.

A larger-diameter axial length AL5 of the larger-diameter part 42 ranges from 3 mm to 6 mm. In this embodiment, the larger-diameter axial length AL5 is 4.61 mm. However, the larger-diameter axial length AL5 is not limited to this embodiment and the above ranges.

A ratio of the first axial length AL1 to the sprocket-arranging axial length AL3 ranges from 1.2 to 1.7. For example, the ratio of the first axial length AL1 to the sprocket-arranging axial length AL3 is 1.4 if the first axial length AL1 is 55.7 mm and the sprocket-arranging axial length AL3 is 39.64 mm. However, the ratio of the first axial length AL1 to the sprocket-arranging axial length AL3 is not limited to this embodiment and the above range. For example, the ratio of the first axial length AL1 to the sprocket-arranging axial length AL3 can be 1.57 if the first axial length AL1 is 62.3 mm and the sprocket-arranging axial length AL3 is 39.64 mm, or the ratio of the first axial length AL1 to the sprocket-arranging axial length AL3 can be 1.69 if the first axial length AL1 is 67 mm and the sprocket-arranging axial length AL3 is 39.64 mm.

Figure 17:
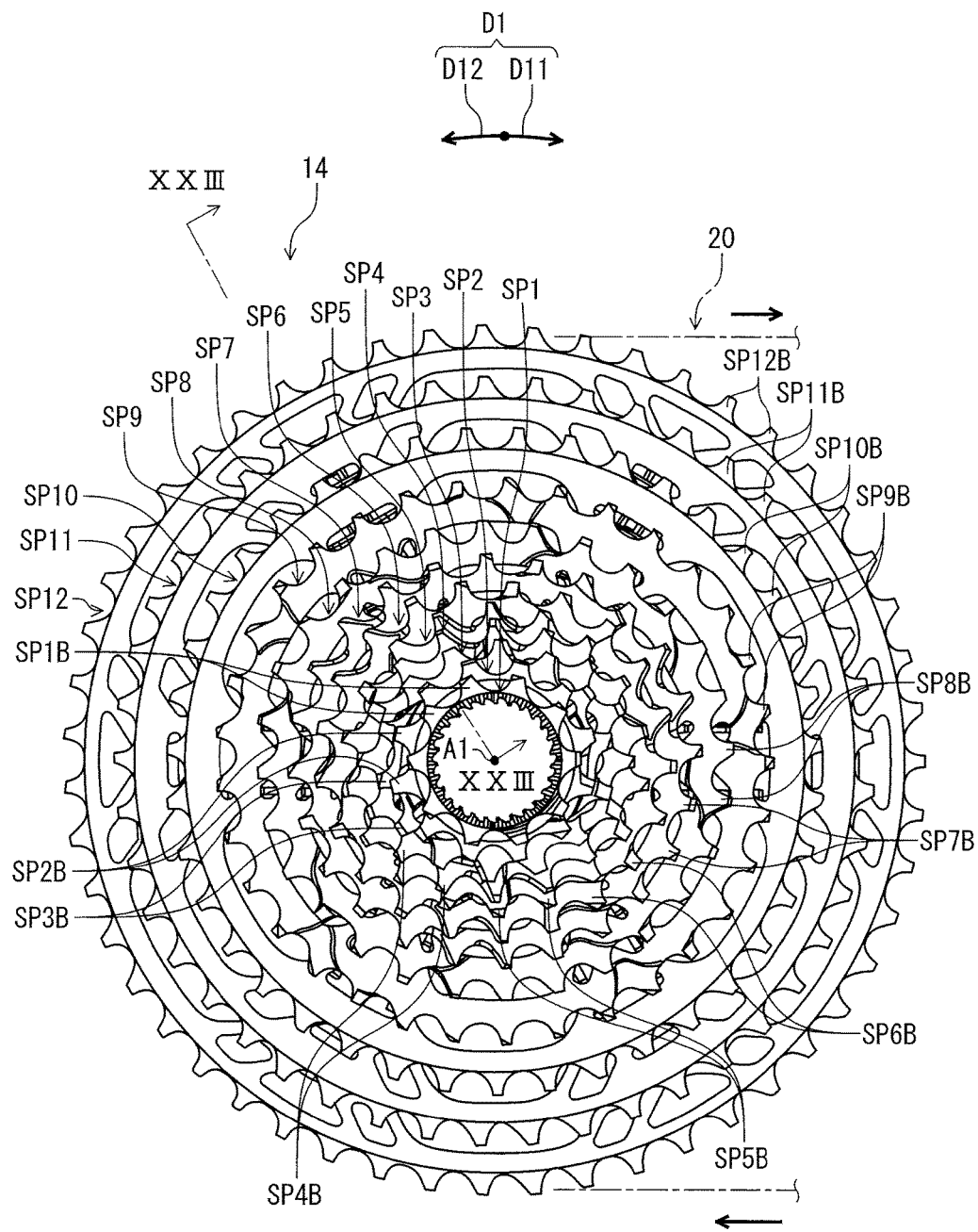
FIG. 17 is a side elevational view of the bicycle rear sprocket assembly of the bicycle drive train illustrated in FIG. 2.

As seen in FIG. 17, the bicycle rear sprocket assembly 14 comprises at least one sprocket. The at least one sprocket includes a smallest sprocket SP1 and a largest sprocket SP12. The smallest sprocket SP1 can also be referred to as a sprocket SP1. The largest sprocket SP12 can also be referred to as a sprocket SP12. In this embodiment, the at least one sprocket further includes sprockets SP2 to SP11. The sprocket SP1 corresponds to top gear. The sprocket SP12 corresponds to low gear. A total number of the sprockets of the bicycle rear sprocket assembly 14 is not limited to this embodiment.

The smallest sprocket SP1 includes at least one sprocket tooth SP1B. A total number of the at least one sprocket tooth SP of the smallest sprocket SP1 is equal to or smaller than 10. In this embodiment, the total number of the at least one sprocket tooth SP of the smallest sprocket SP1 is 10. However, the total number of the at least one sprocket tooth SP1B of the smallest sprocket SP1 is not limited to this embodiment and the above range.

The largest sprocket SP12 includes at least one sprocket tooth SP12B. A total number of the at least one sprocket tooth SP12B of the largest sprocket SP12 is equal to or larger than 46. The total number of the at least one sprocket tooth SP12B of the largest sprocket SP12 is equal to or larger than 50. In this embodiment, the total number of the at least one sprocket tooth SP12B of the largest sprocket SP12 is 51. However, the total number of the at least one sprocket tooth SP12B of the largest sprocket SP12 is not limited to this embodiment and the above ranges.

The sprocket SP2 includes at least one sprocket tooth SP2B. The sprocket SP3 includes at least one sprocket tooth SP3B. The sprocket SP4 includes at least one sprocket tooth SP4B. The sprocket SP5 includes at least one sprocket tooth SP5B. The sprocket SP6 includes at least one sprocket tooth SP6B. The sprocket SP7 includes at least one sprocket tooth SP7B. The sprocket SP8 includes at least one sprocket tooth SP8B. The sprocket SP9 includes at least one sprocket tooth SP9B. The sprocket SP10 includes at least one sprocket tooth SP10B. The sprocket SP11 includes at least one sprocket tooth SP11B.

A total number of the at least one sprocket tooth SP2B is 12. A total number of the at least one sprocket tooth SP3B is 14. A total number of the at least one sprocket tooth SP4B is 16. A total number of the at least one sprocket tooth SP5B is 18. A total number of the at least one sprocket tooth SP6B is 21. A total number of the at least one sprocket tooth SP7B is 24. A total number of the at least one sprocket tooth SP8B is 28. A total number of the at least one sprocket tooth SP9B is 33. A total number of the at least one sprocket tooth SP10B is 39. A total number of the at least one sprocket tooth SP11B is 45. The total number of the sprocket teeth of each of the sprockets SP2 to SP11 is not limited to this embodiment.

Figure 18:
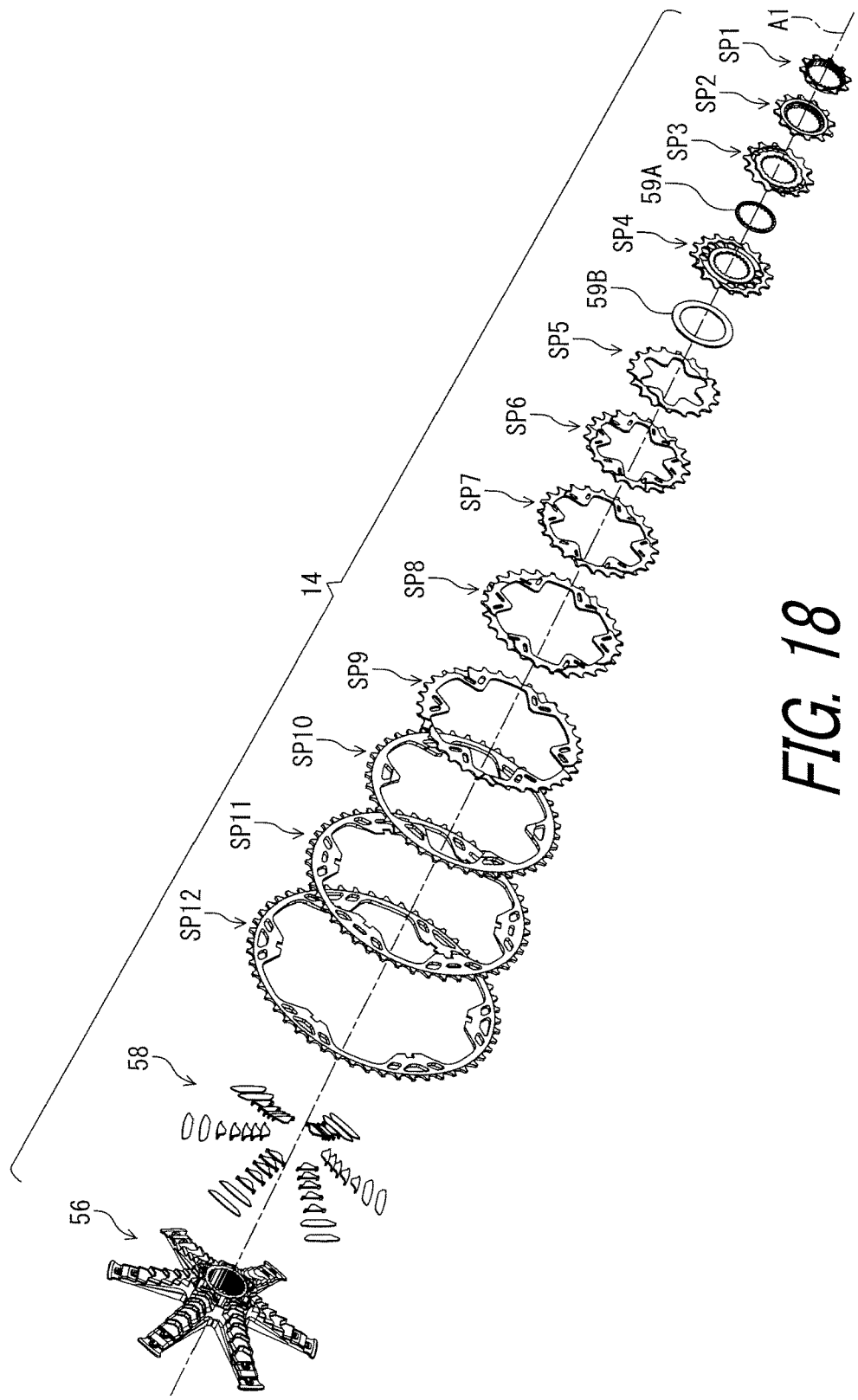
FIG. 18 is an exploded perspective view of the bicycle rear sprocket assembly illustrated in FIG. 17.

As seen in FIG. 18, the sprockets SP1 to SP12 are separate members from each other. However, at least one of the sprockets SP1 to SP12 can be at least partly provided integrally with another of the sprockets SP1 to SP12. The bicycle rear sprocket assembly 14 comprises a sprocket support 56, a plurality of spacers 58, a first ring 59A, and a second ring 59B. The sprockets SP1 to SP12 are attached to the sprocket support 56 in the illustrated embodiment. For example, the sprockets SP1 to SP12 are attached to the sprocket support 56 with a bonding structure such as an adhesive agent so that weight of the bicycle rear sprocket assembly 14 can be saved due to no metallic fastening member being used.

Figure 19:
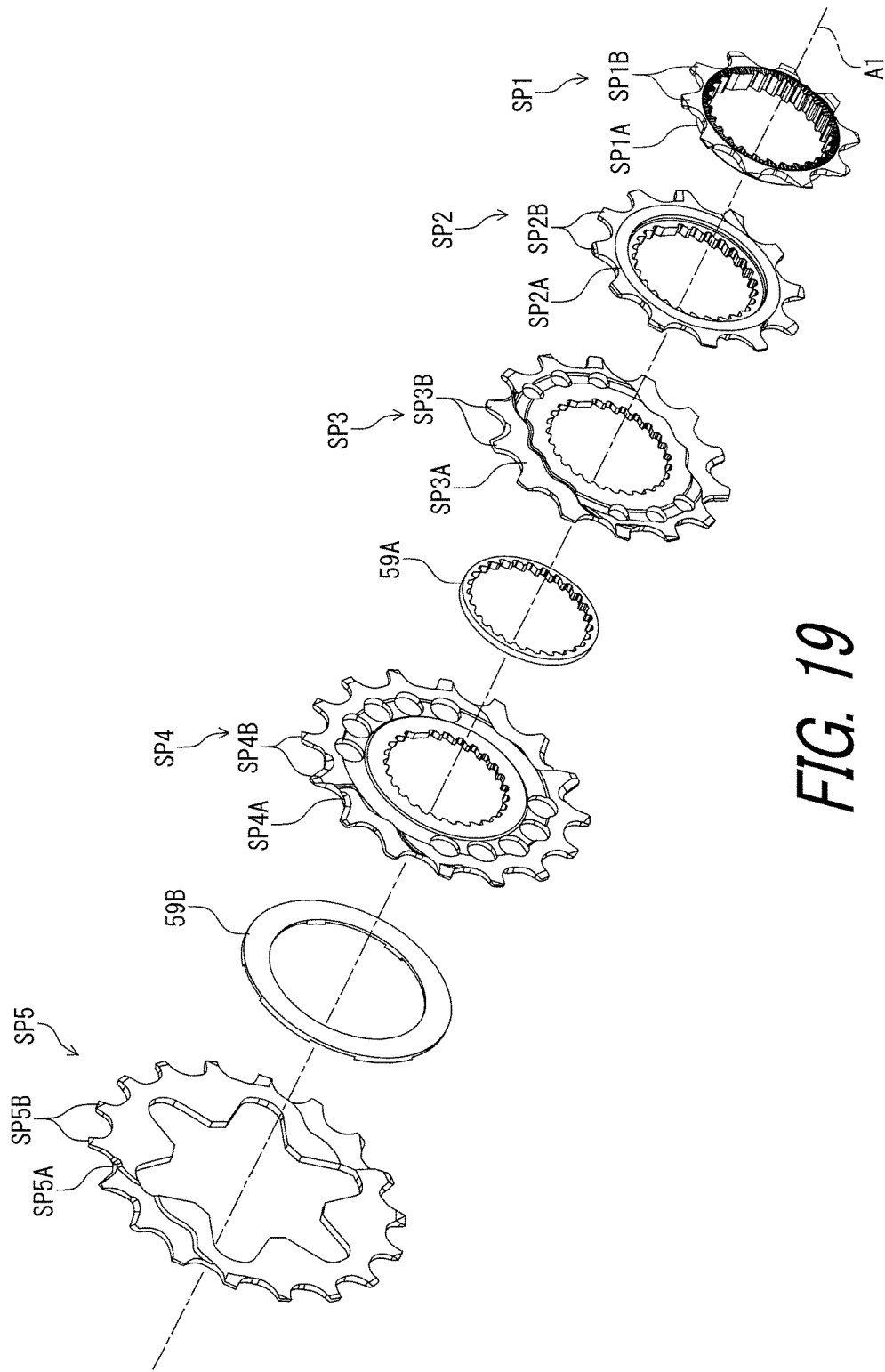
FIG. 19 is a partial exploded perspective view of the bicycle rear sprocket assembly illustrated in FIG. 17.

As seen in FIG. 19, the sprocket SP1 includes a sprocket body SP1A and the plurality of sprocket teeth SP1B. The plurality of sprocket teeth SP1B extends radially outwardly from the sprocket body SP1A. The sprocket SP2 includes a sprocket body SP2A and the plurality of sprocket teeth SP2B. The plurality of sprocket teeth SP2B extends radially outwardly from the sprocket body SP2A. The sprocket SP3 includes a sprocket body SP3A and the plurality of sprocket teeth SP3B. The plurality of sprocket teeth SP3B extends radially outwardly from the sprocket body SP3A. The sprocket SP4 includes a sprocket body SP4A and the plurality of sprocket teeth SP4B. The plurality of sprocket teeth SP4B extends radially outwardly from the sprocket body SP4A. The sprocket SP5 includes a sprocket body SP5A and the plurality of sprocket teeth SP5B. The plurality of sprocket teeth SP5B extends radially outwardly from the sprocket body SP5A. The first ring 59A is provided between the sprockets SP3 and SP4. The second ring 59B is provided between the sprockets SP4 and SP5.

Figure 20:
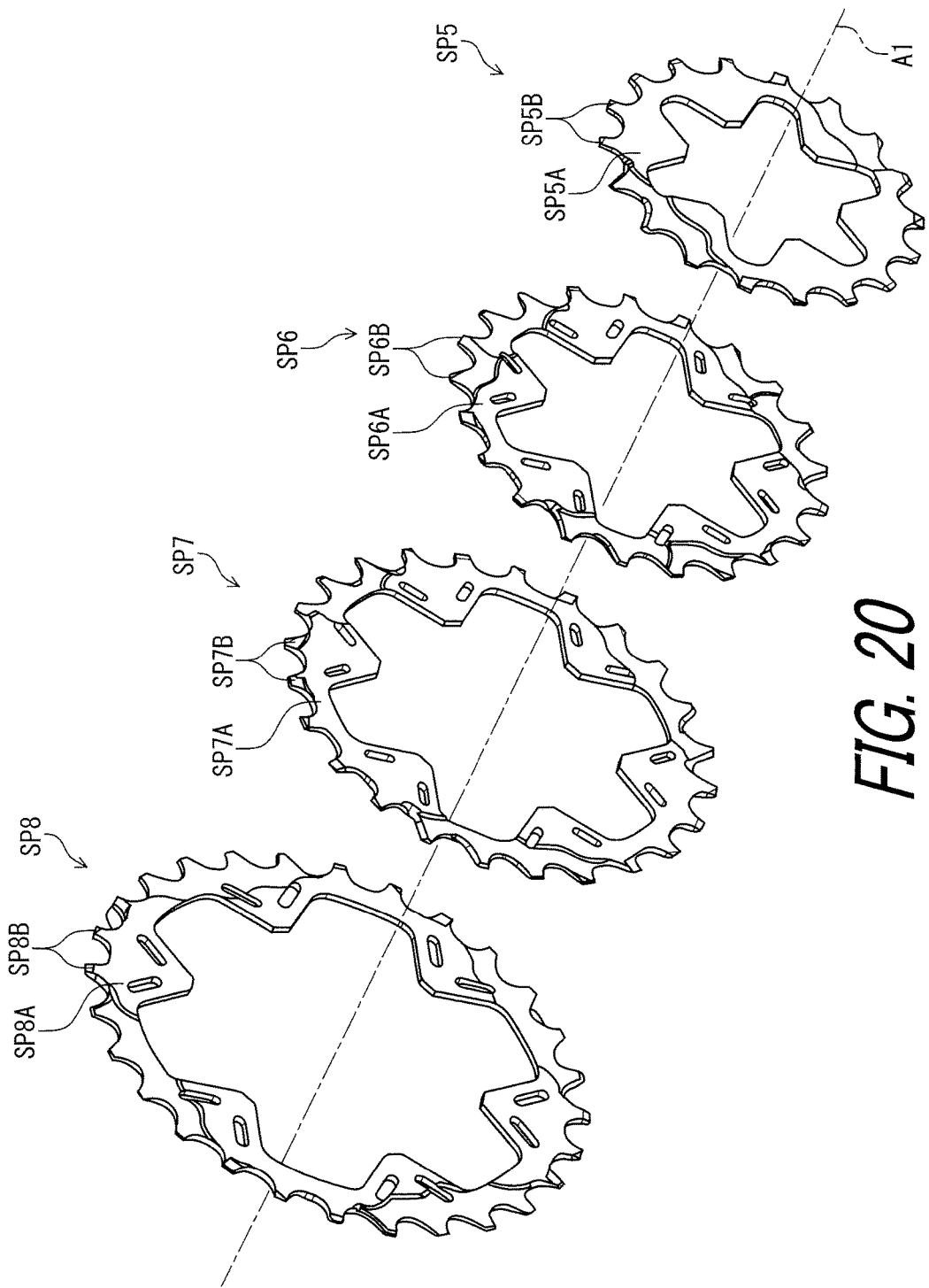
FIG. 20 is another partial exploded perspective view of the bicycle rear sprocket assembly illustrated in FIG. 17.

As seen in FIG. 20, the sprocket SP6 includes a sprocket body SP6A and the plurality of sprocket teeth SP6B. The plurality of sprocket teeth SP6B extends radially outwardly from the sprocket body SP6A. The sprocket SP7 includes a sprocket body SP7A and the plurality of sprocket teeth SP7B. The plurality of sprocket teeth SP7B extends radially outwardly from the sprocket body SP7A. The sprocket SP8 includes a sprocket body SP8A and the plurality of sprocket teeth SP8B. The plurality of sprocket teeth SP8B extends radially outwardly from the sprocket body SP8A.

Figure 21:
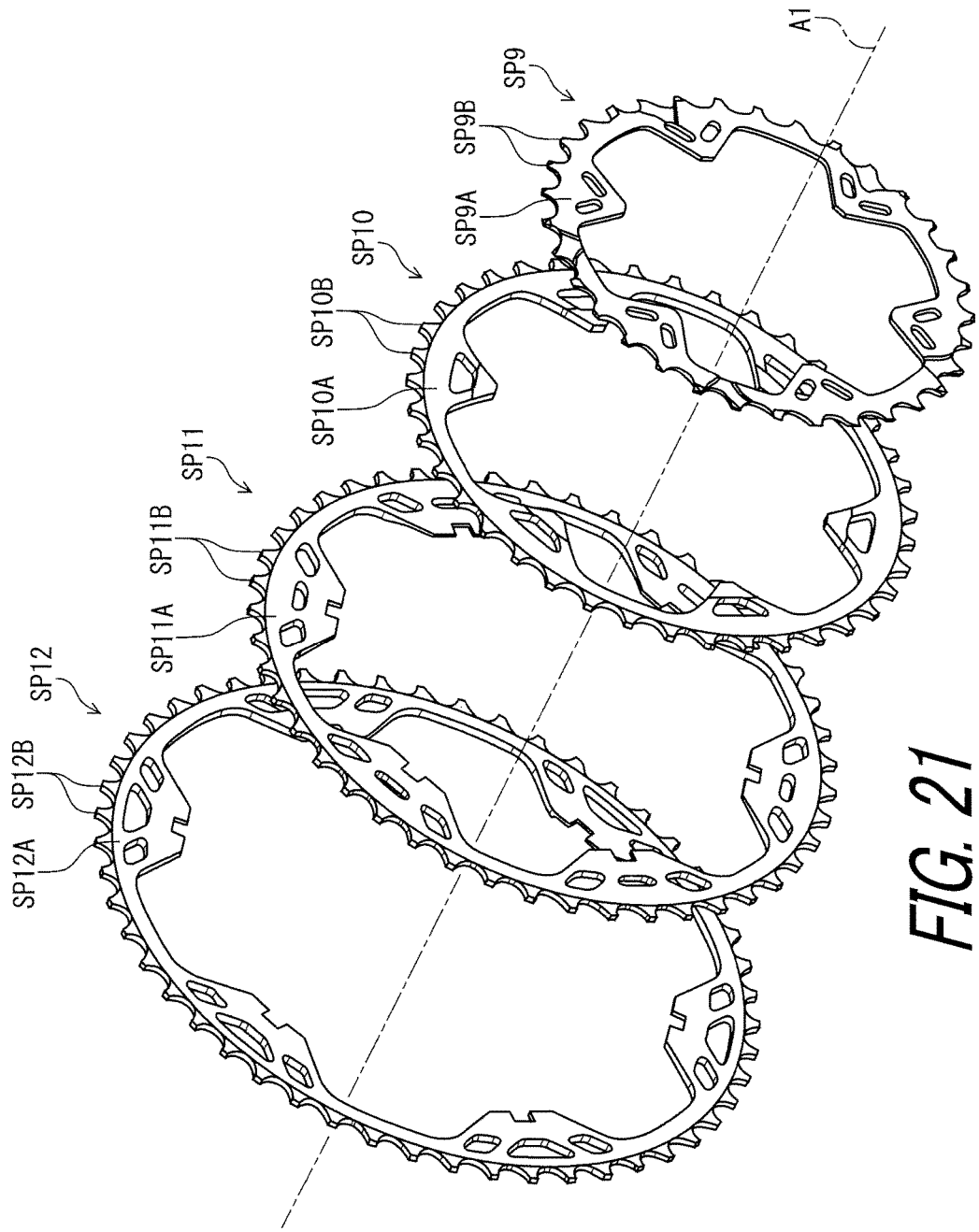
FIG. 21 is another partial exploded perspective view of the bicycle rear sprocket assembly illustrated in FIG. 17.

As seen in FIG. 21, the sprocket SP9 includes a sprocket body SP9A and the plurality of sprocket teeth SP9B. The plurality of sprocket teeth SP9B extends radially outwardly from the sprocket body SP9A. The sprocket SP10 includes a sprocket body SP10A and the plurality of sprocket teeth SP10B. The plurality of sprocket teeth SP10B extends radially outwardly from the sprocket body SP10A. The sprocket SP11 includes a sprocket body SP11A and the plurality of sprocket teeth SP11B. The plurality of sprocket teeth SP11B extends radially outwardly from the sprocket body SP11A. The sprocket SP12 includes a sprocket body SP12A and the plurality of sprocket teeth SP12B. The plurality of sprocket teeth SP12B extends radially outwardly from the sprocket body SP12A.

Figure 22:
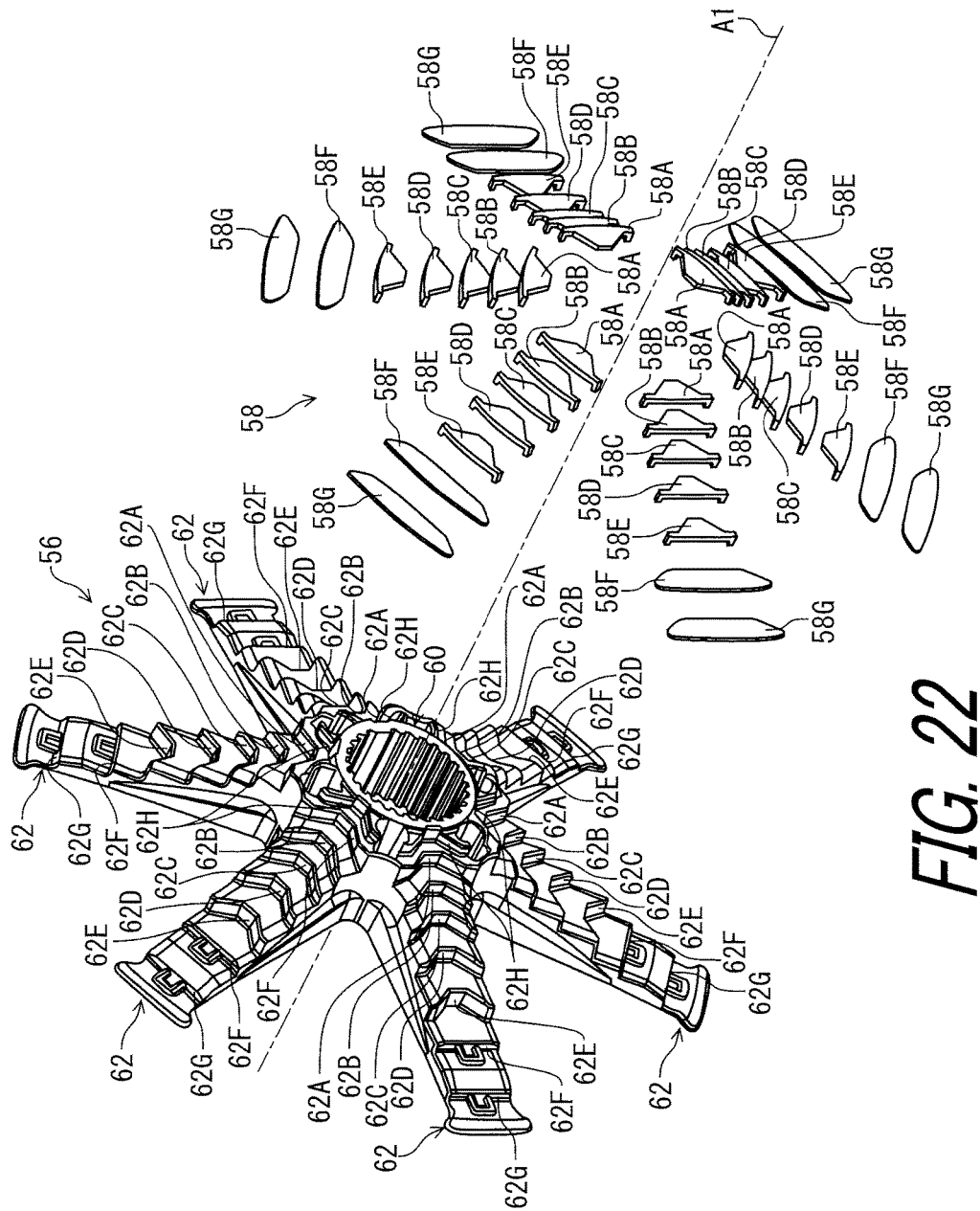
FIG. 22 is another partial exploded perspective view of the bicycle rear sprocket assembly illustrated in FIG. 17.

As seen in FIG. 22, the sprocket support 56 includes a hub engagement part 60 and a plurality of support arms 62. The plurality of support arms 62 extends radially outwardly from the hub engagement part 60. The support arm 62 includes first to eighth attachment parts 62A to 62H. The plurality of spacers 58 includes a plurality of first spacers 58A, a plurality of second spacers 58B, a plurality of third spacers 58C, a plurality of fourth spacers 58D, a plurality of fifth spacers 58E, a plurality of sixth spacers 58F, and a plurality of seventh spacers 58G.

Figure 23:
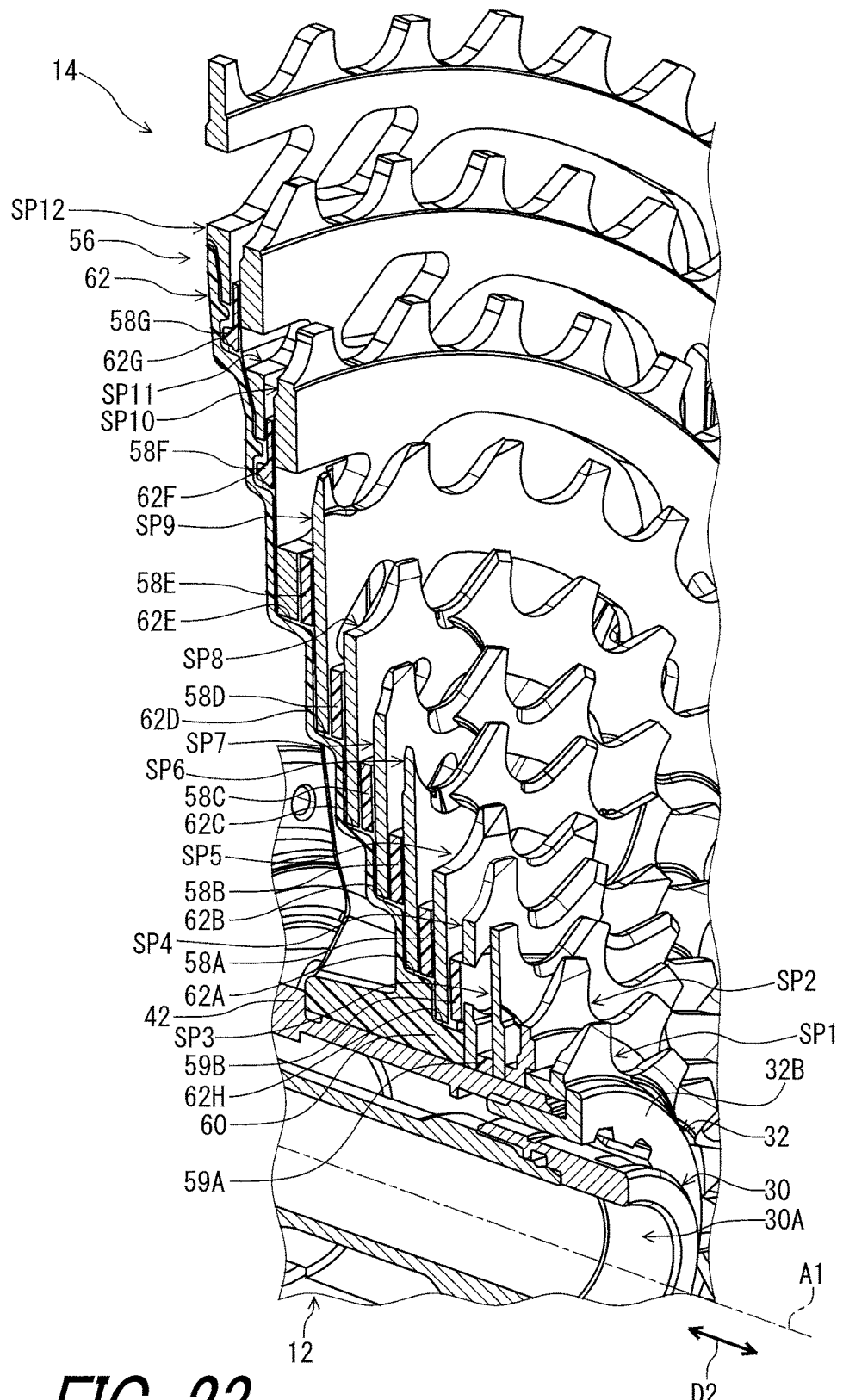
FIG. 23 is a perspective cross-sectional view of the bicycle rear sprocket assembly taken along line XXIII-XXIII of FIG. 17.

As seen in FIG. 23, the first spacers 58A are provided between the sprockets SP5 and SP6. The second spacers 58B are provided between the sprockets SP6 and SP7. The third spacers 58C are provided between the sprockets SP7 and SP8. The fourth spacers 58D are provided between the sprockets SP8 and SP9. The fifth spacers 58E are provided between the sprockets SP9 and SP10. The sixth spacers 58F are provided between the sprockets SP10 and SP11. The seventh spacers 58G are provided between the sprockets SP11 and SP12.

The sprocket SP6 and the first spacer 58A are attached to the first attachment part 62A with a bonding structure such as an adhesive agent. The sprocket SP7 and the second spacer 58B are attached to the second attachment part 62B with a bonding structure such as an adhesive agent. The sprocket SP8 and the third spacer 58C are attached to the third attachment part 62C with a bonding structure such as an adhesive agent. The sprocket SP9 and the fourth spacer 58D are attached to the fourth attachment part 62D with a bonding structure such as an adhesive agent. The sprocket SP10 and the fifth spacer 58E are attached to the fifth attachment part 62E with a bonding structure such as an adhesive agent. The sprocket SP11 and the sixth spacer 58F are attached to the sixth attachment part 62F with a bonding structure such as an adhesive agent. The sprocket SP12 and the seventh spacer 58G are attached to the seventh attachment part 62G with a bonding structure such as an adhesive agent. The sprocket SP5 and the second ring 59B are attached to the eighth attachment part 6211 with a bonding structure such as an adhesive agent. The hub engagement part 60, the sprockets SP1 to SP4, the first ring 59A, and the second ring 59B are held between the larger-diameter part 42 and the lock flange 32B of the lock ring 32 in the axial direction D2.

In this embodiment, each of the sprockets SP1 to SP12 is made of a metallic material such as aluminum, iron, or titanium. Each of the sprocket support 56, the first to seventh spacers 58A and to 58G, the first ring 59A, and the second ring 59B is made of a non-metallic material such as a resin material. However, at least one of the sprockets SP1 to SP12 can be at least partly made of a non-metallic material. At least one of the sprocket support 56, the first to seventh spacers 58A and to 58G, the first ring 59A, and the second ring 59B can be at least partly made of a metallic material such as aluminum, iron, or titanium.

Figure 24:
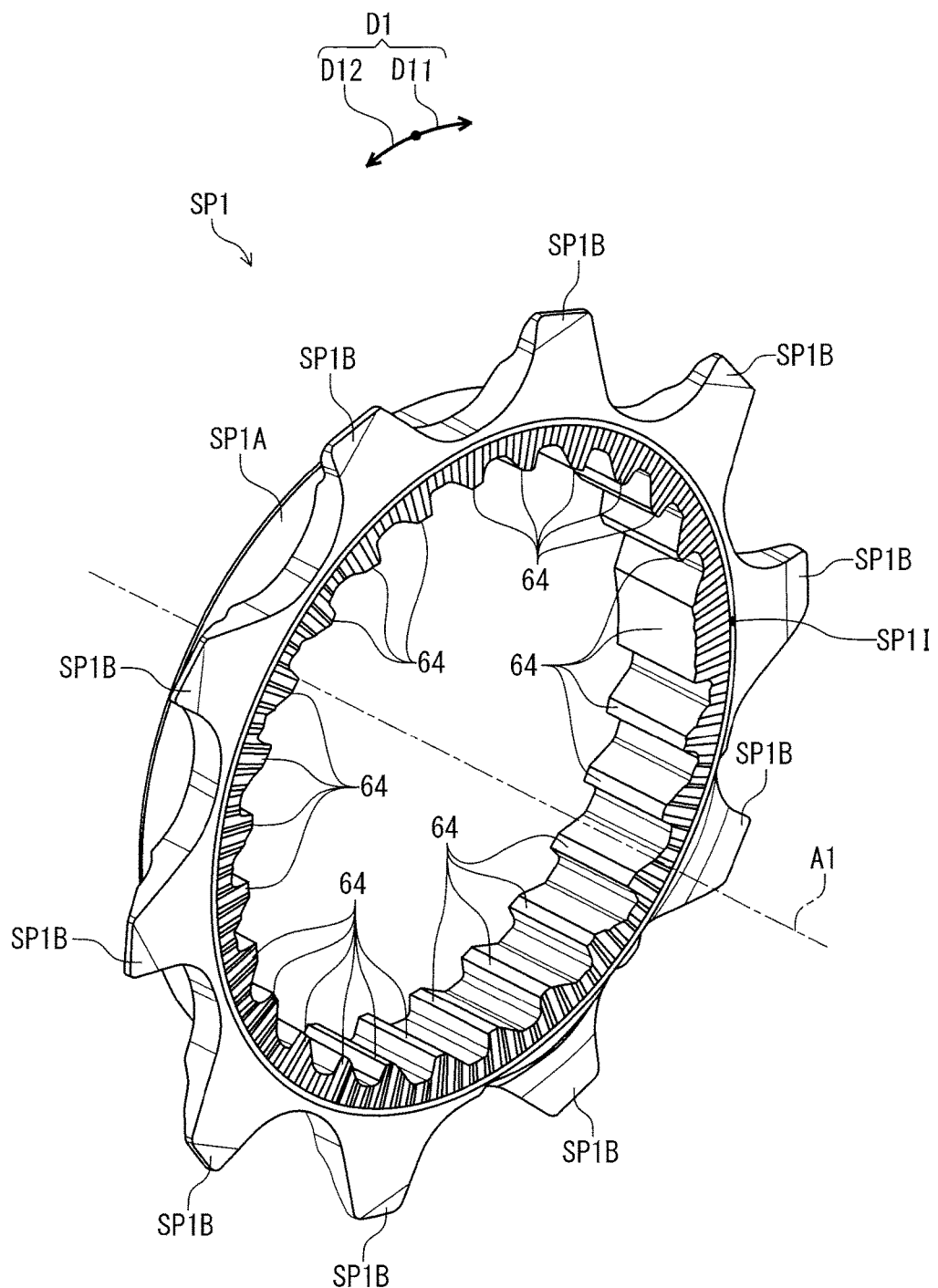
FIG. 24 is a perspective view of a smallest sprocket of the bicycle rear sprocket assembly illustrated in FIG. 17.
Figure 25:
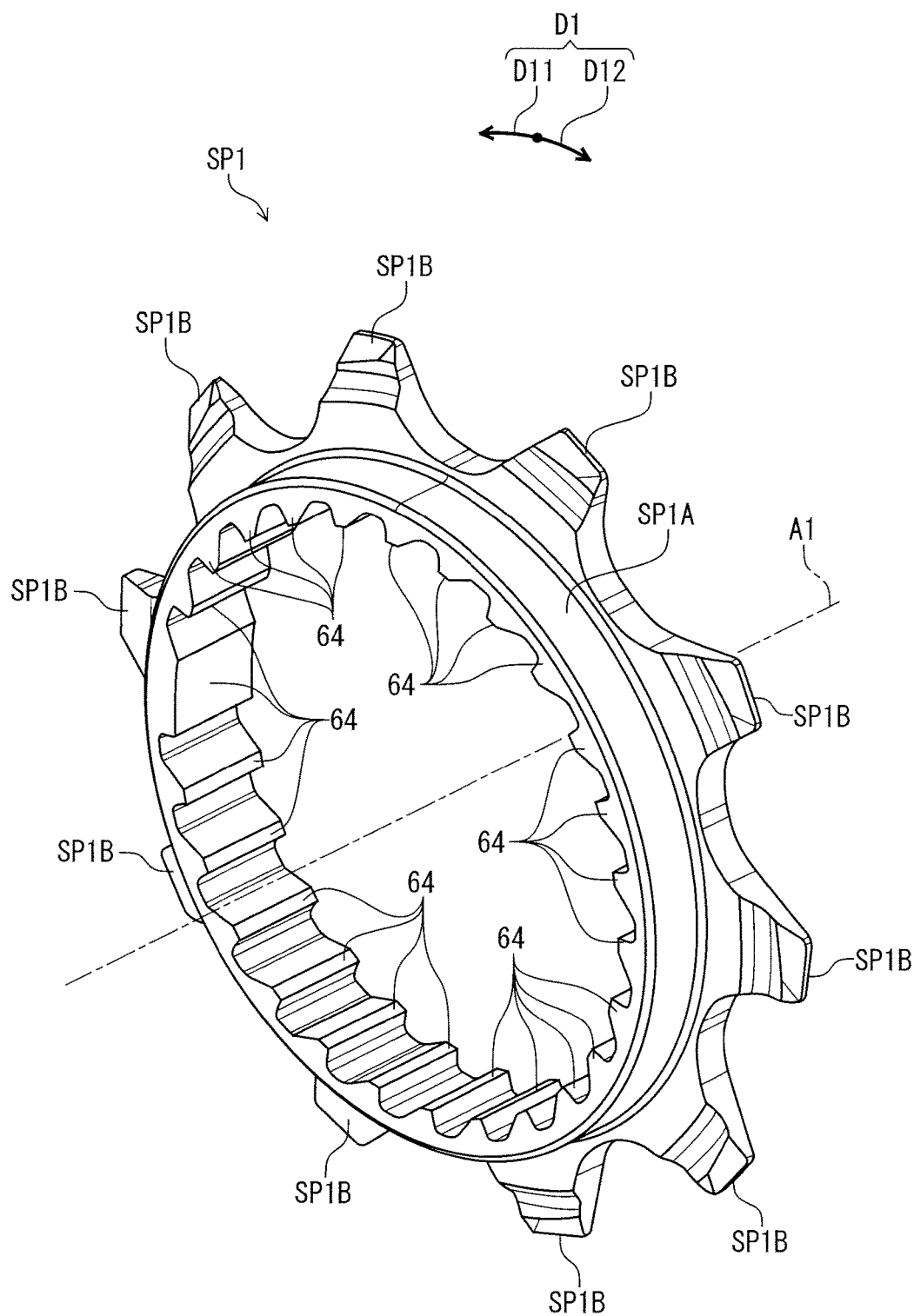
FIG. 25 is another perspective view of the smallest sprocket of the bicycle rear sprocket assembly illustrated in FIG. 17.

The at least one sprocket includes at least one internal spline tooth configured to engage with the bicycle hub assembly 12. As seen in FIGS. 24 and 25, the at least one sprocket includes at least ten internal spline teeth configured to engage with the bicycle hub assembly 12. The at least one internal spline tooth includes a plurality of internal spline teeth. Thus, the at least one sprocket includes a plurality of internal spline teeth configured to engage with the bicycle hub assembly 12. In this embodiment, the sprocket SP1 includes at least ten internal spline teeth 64 configured to engage with the bicycle hub assembly 12. In this embodiment, the sprocket SP1 includes the internal spline teeth 64 configured to mesh with the external spline teeth 40 of the sprocket support body 28 of the bicycle hub assembly 12. The sprocket body SP1A has an annular shape. The internal spline teeth 64 extend radially inwardly from the sprocket body SP1A.

Figure 26:
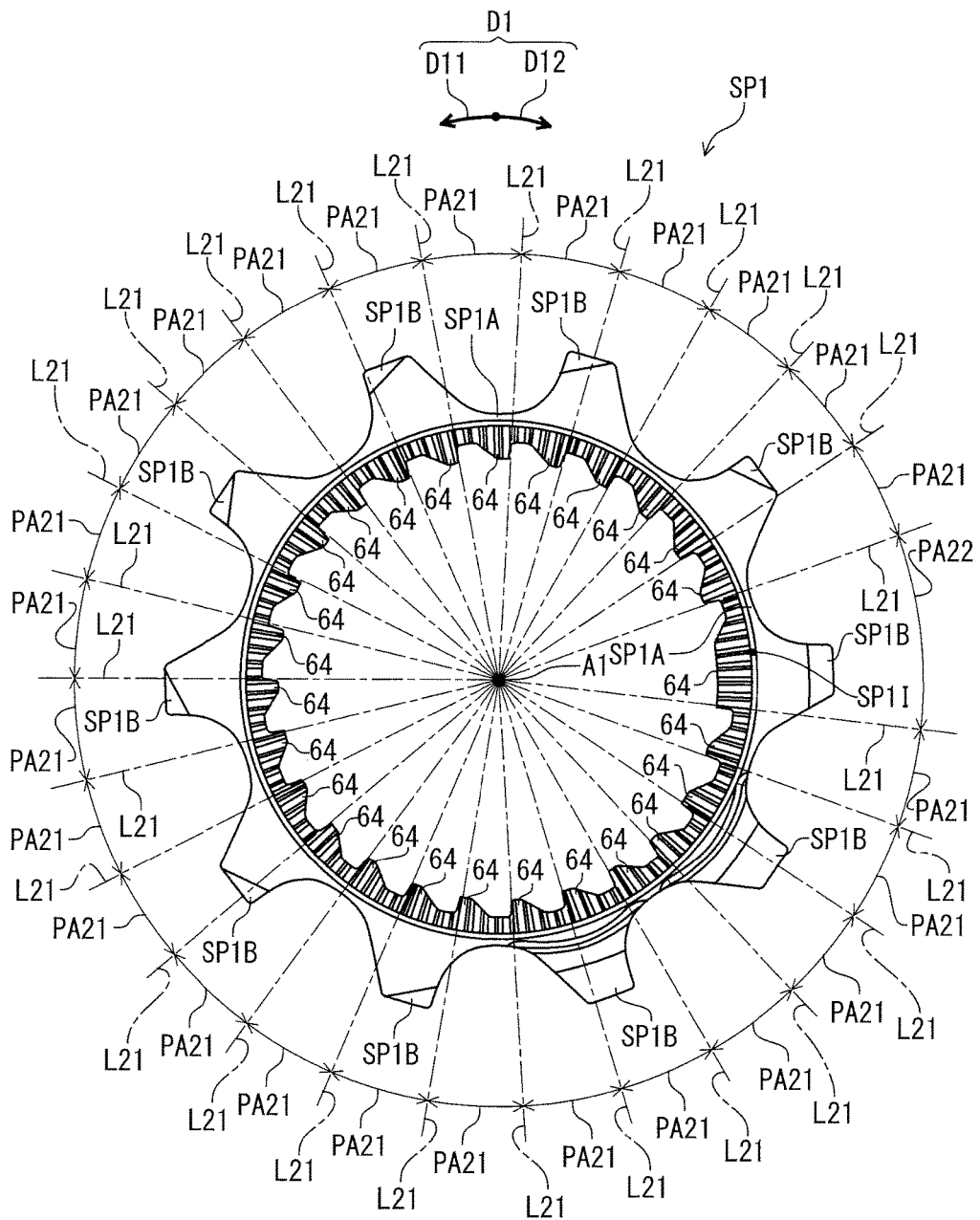
FIG. 26 is a side elevational view of the smallest sprocket of the bicycle rear sprocket assembly illustrated in FIG. 17.

As seen in FIG. 26, a total number of the at least ten internal spline teeth 64 is equal to or larger than 20. The total number of the at least ten internal spline teeth 64 is equal to or larger than 25. In this embodiment, the total number of the internal spline teeth 64 is 26. However, the total number of the internal spline teeth 64 is not limited to this embodiment and the above ranges.

The at least ten internal spline teeth 64 have a first internal pitch angle PA21 and a second internal pitch angle PA22. At least two internal spline teeth of the plurality of internal spline teeth 64 is circumferentially arranged at a first internal pitch angle PA21 with respect to the rotational center axis A1 of the bicycle rear sprocket assembly 14. At least two internal spline teeth of the plurality of internal spline teeth 64 is circumferentially arranged at a second internal pitch angle PA22 with respect to the rotational center axis A1. In this embodiment, the second internal pitch angle PA22 is different from the first internal pitch angle PA21. However, the second internal pitch angle PA22 can be substantially equal to the first internal pitch angle PA21.

In this embodiment, the internal spline teeth 64 are circumferentially arranged at the first internal pitch angle PA21 in the circumferential direction D1. Two internal spline teeth of the internal spline teeth 64 is arranged at the second internal pitch angle PA22 in the circumferential direction D1. However, at least two internal spline teeth of the internal spline teeth 64 can be arranged at another internal pitch angle in the circumferential direction D1.

The first internal pitch angle PA21 ranges from 10 degrees to 20 degrees. The first internal pitch angle PA21 ranges from 12 degrees to 15 degrees. The first internal pitch angle PA21 ranges from 13 degrees to 14 degrees. In this embodiment, the first internal pitch angle PA21 is 13.3 degrees. However, the first internal pitch angle PA21 is not limited to this embodiment and the above ranges.

The second internal pitch angle PA22 ranges from 5 degrees to 30 degrees. In this embodiment, the second internal pitch angle PA22 is 26 degrees. However, the second internal pitch angle PA22 is not limited to this embodiment and the above range.

Figure 27:
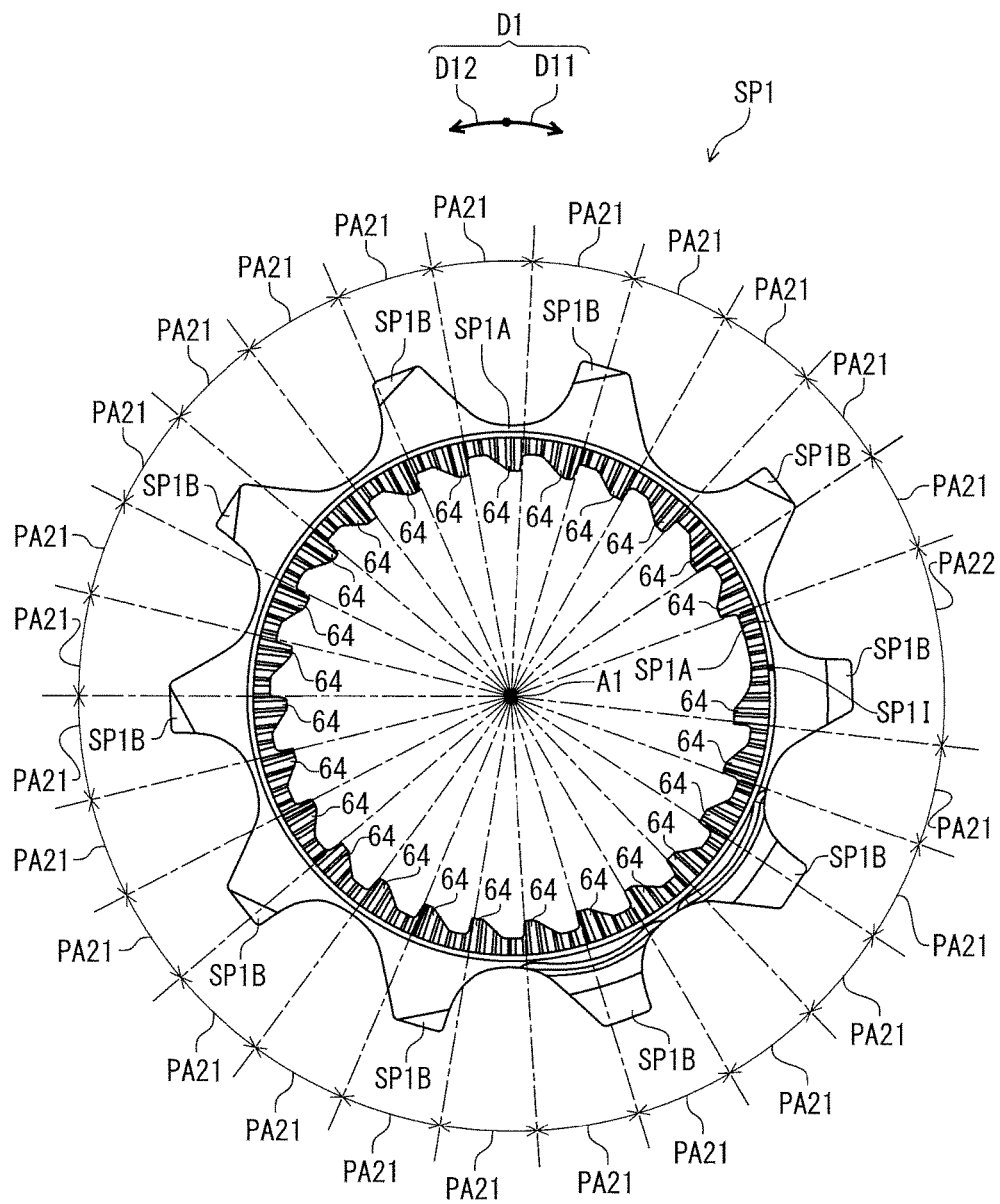
FIG. 27 is a side elevational view of a smallest sprocket in accordance with a modification.

At least one of the at least ten internal spline teeth 64 has a first spline shape different from a second spline shape of another of the at least ten internal spline teeth 64. At least one of the at least ten internal spline teeth 64 has a first spline size different from a second spline size of another of the at least ten internal spline teeth 64. At least one of the at least ten internal spline teeth 64 has a cross-sectional shape different from a cross-sectional shape of another of the at least ten internal spline teeth 64. As seen in FIG. 27, however, the internal spline teeth 64 can have the same shape as each other. The internal spline teeth 64 can have the same size as each other. The internal spline teeth 64 can have the same cross-sectional shape as each other.

Figure 28:
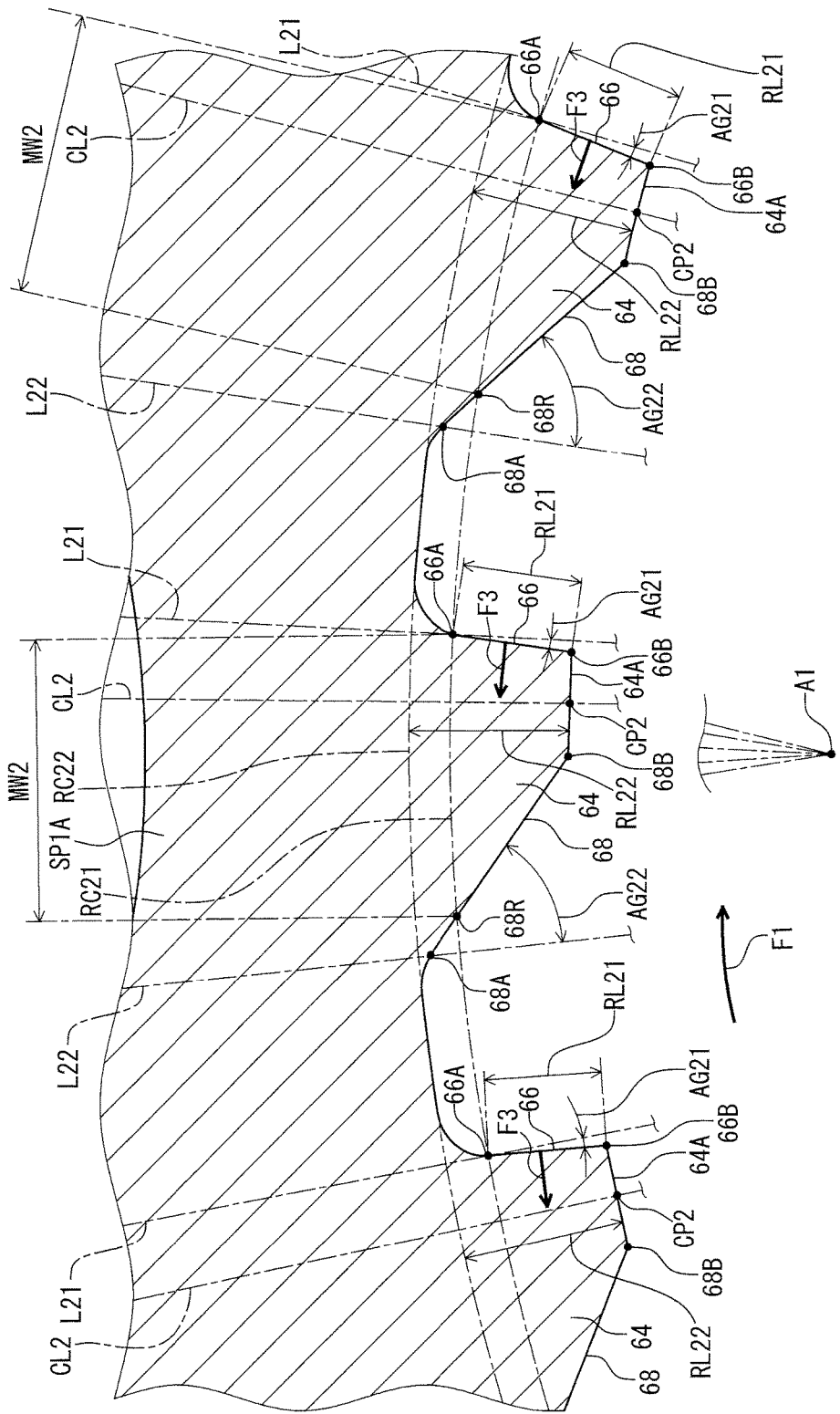
FIG. 28 is an enlarged cross-sectional view of the smallest sprocket illustrated in FIG. 24.

As seen in FIG. 28, the at least one internal spline tooth 64 comprises an internal-spline driving surface 66 and an internal-spline non-driving surface 68. The at least one internal spline tooth 64 includes a plurality of internal spline teeth 64. The plurality of internal spline teeth 64 includes a plurality of internal-spline driving surfaces 66 to receive the driving rotational force F1 from the bicycle hub assembly 12 (FIG. 6) during pedaling. The plurality of internal spline teeth 64 includes a plurality of internal-spline non-driving surfaces 68. The internal-spline driving surface 66 is contactable with the sprocket support body 28 to transmit the driving rotational force F1 from the sprocket SP1 to the sprocket support body 28 during pedaling. The internal-spline driving surface 66 faces in the driving rotational direction D11. The internal-spline driving surface 66 faces the external-spline driving surface 48 of the bicycle hub assembly 12 in a state where the bicycle rear sprocket assembly 14 is mounted to the bicycle hub assembly 12. The internal-spline non-driving surface 68 is provided on a reverse side of the internal-spline driving surface 66 in the circumferential direction D1. The internal-spline non-driving surface 68 faces in the reverse rotational direction D12 not to transmit the driving rotational force F1 from the sprocket SP1 to the sprocket support body 28 during pedaling. The internal-spline non-driving surface 68 faces the external-spline non-driving surface 50 of the bicycle hub assembly 12 in a state where the bicycle rear sprocket assembly 14 is mounted to the bicycle hub assembly 12.

The at least ten internal spline teeth 64 respectively have circumferential maximum widths MW2. The internal spline teeth 64 respectively have circumferential maximum widths MW2. The circumferential maximum width MW2 is defined as a maximum width to receive a thrust force F3 applied to the internal spline tooth 64. The circumferential maximum width MW2 is defined as a straight distance based on the internal-spline driving surface 66.

The internal-spline driving surface 66 includes a radially outermost edge 66A and a radially innermost edge 66B. The internal-spline driving surface 66 extends from the radially outermost edge 66A to the radially innermost edge 66B. A second reference circle RC21 is defined on the radially outermost edge 66A and is centered at the rotational center axis A1. The second reference circle RC21 intersects with the internal-spline non-driving surface 68 at a reference point 68R. The circumferential maximum width MW2 extends straight from the radially innermost edge 66B to the reference point 68R in the circumferential direction D1.

The internal-spline non-driving surface 68 includes a radially outermost edge 68A and a radially innermost edge 68B. The internal-spline non-driving surface 68 extends from the radially outermost edge 68A to the radially innermost edge 68B. The reference point 68R is provided between the radially outermost edge 68A and the radially innermost edge 68B.

A total of the circumferential maximum widths MW2 is equal to or larger than 40 mm. The total of the circumferential maximum widths MW2 is equal to or larger than 45 mm. The total of the circumferential maximum widths MW2 is equal to or larger than 50 mm. In this embodiment, the total of the circumferential maximum widths MW2 is 50.8 mm. However, the total of the circumferential maximum widths MW2 is not limited to this embodiment.

Figure 29:
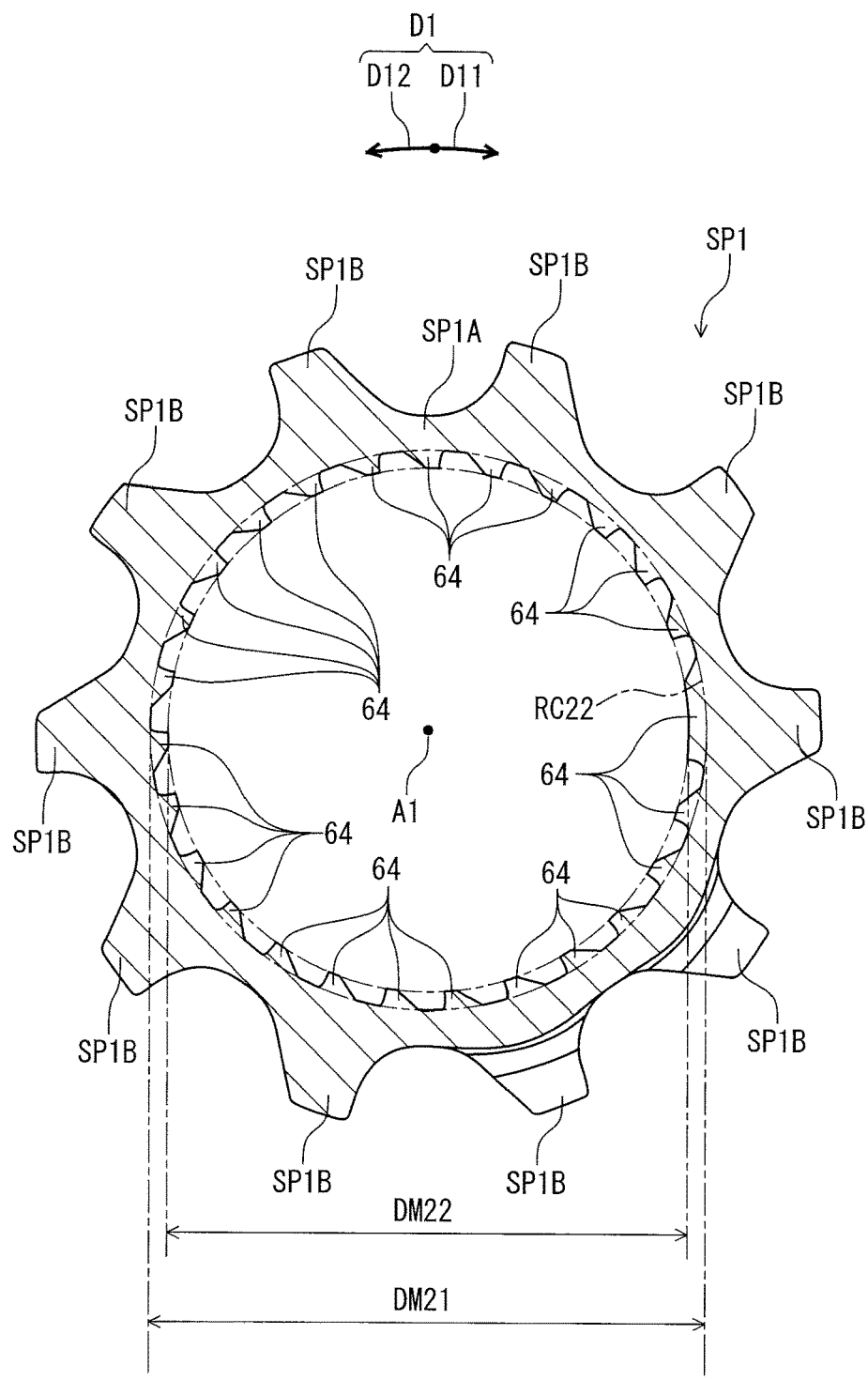
FIG. 29 is a cross-sectional view of the smallest sprocket illustrated in FIG. 24.

As seen in FIG. 29, the at least one internal spline tooth 64 has an internal-spline major diameter DM21. The at least one internal spline tooth 64 has an internal-spline root circle RC22 having the internal-spline major diameter DM21. However, the internal-spline root circle RC22 can have another diameter different from the internal-spline major diameter DM21. The internal-spline major diameter DM21 equal to or smaller than 30 mm. The internal-spline major diameter DM21 is equal to or larger than 25 mm. The internal-spline major diameter DM21 is equal to or larger than 29 mm. In this embodiment, the internal-spline major diameter DM21 is 29.8 mm. However, the internal-spline major diameter DM21 is not limited to this embodiment and the above ranges.

The at least one internal spline tooth 64 has an internal-spline minor diameter DM22 equal to or smaller than 28 mm. The internal-spline minor diameter DM22 is equal to or larger than 25 mm. The internal-spline minor diameter DM22 is equal to or larger than 27 mm. In this embodiment, the internal-spline minor diameter DM22 is 27.7 mm. However, the internal-spline minor diameter DM22 is not limited to this embodiment and the above ranges.

As seen in FIG. 28, the plurality of internal-spline driving surface 66 includes the radially outermost edge 66A and the radially innermost edge 66B. The plurality of internal-spline driving surfaces 66 each includes a radial length RL21 defined from the radially outermost edge 66A to the radially innermost edge 66B. A total of the radial lengths RL21 of the plurality of internal-spline driving surfaces 66 is equal to or larger than 7 mm. The total of the radial lengths RL21 is equal to or larger than 10 mm. The total of the radial lengths RL21 is equal to or larger than 15 mm. In this embodiment, the total of the radial lengths RL21 is 19.5 mm. However, the total of the radial lengths RL21 is not limited to this embodiment and the above ranges.

The plurality of internal spline tooth 64 has an additional radial length RL22. The additional radial lengths RL22 are respectively defined from the internal-spline root circle RC22 to radially innermost ends 64A of the plurality of internal spline teeth 64. A total of the additional radial lengths RL22 is equal to or larger than 12 mm. In this embodiment, the total of the additional radial lengths RL22 is 27.95 mm. However, the total of the additional radial lengths RL22 is not limited to this embodiment and the above ranges.

At least one of the internal spline tooth 64 has an asymmetric shape with respect to a circumferential tooth-tip center line CL2. The circumferential tooth-tip center line CL2 is a line connecting the rotational center axis A1 and a circumferential center point CP2 of the radially innermost end 64A of the internal spline tooth 64. However, at least one of the internal spline teeth 64 can have a symmetric shape with respect to the circumferential tooth-tip center line CL2. The at least one of the internal spline tooth 64 comprises the internal-spline driving surface 66 and the internal-spline non-driving surface 68.

The internal-spline driving surface 66 has a first internal-spline-surface angle AG21. The first internal-spline-surface angle AG21 is defined between the internal-spline driving surface 66 and a first radial line L21. The first radial line L21 extends from the rotational center axis A1 of the bicycle rear sprocket assembly 14 to the radially outermost edge 66A of the internal-spline driving surface 66. The first internal pitch angle PA21 or the second internal pitch angle PA22 is defined between the adjacent first radial lines L21 (see, e.g., FIG. 26).

The internal-spline non-driving surface 68 has a second internal-spline-surface angle AG22. The second internal-spline-surface angle AG22 is defined between the internal-spline non-driving surface 68 and a second radial line L22. The second radial line L22 extends from the rotational center axis A1 of the bicycle rear sprocket assembly 14 to the radially outermost edge 68A of the internal-spline non-driving surface 68.

In this embodiment, the second internal-spline-surface angle AG22 is different from the first internal-spline-surface angle AG21. The first internal-spline-surface angle AG21 is smaller than the second internal-spline-surface angle AG22. However, the first internal-spline-surface angle AG21 can be equal to or larger than the second internal-spline-surface angle AG22.

The first internal-spline-surface angle AG21 ranges from 0 degree to 10 degrees. The second internal-spline-surface angle AG22 ranges from 0 degree to 60 degrees. In this embodiment, the first internal-spline-surface angle AG21 is 5 degrees. The second internal-spline-surface angle AG22 is 45 degrees. However, the first internal-spline-surface angle AG21 and the second internal-spline-surface angle AG22 are not limited to this embodiment and the above ranges.

Figure 30:
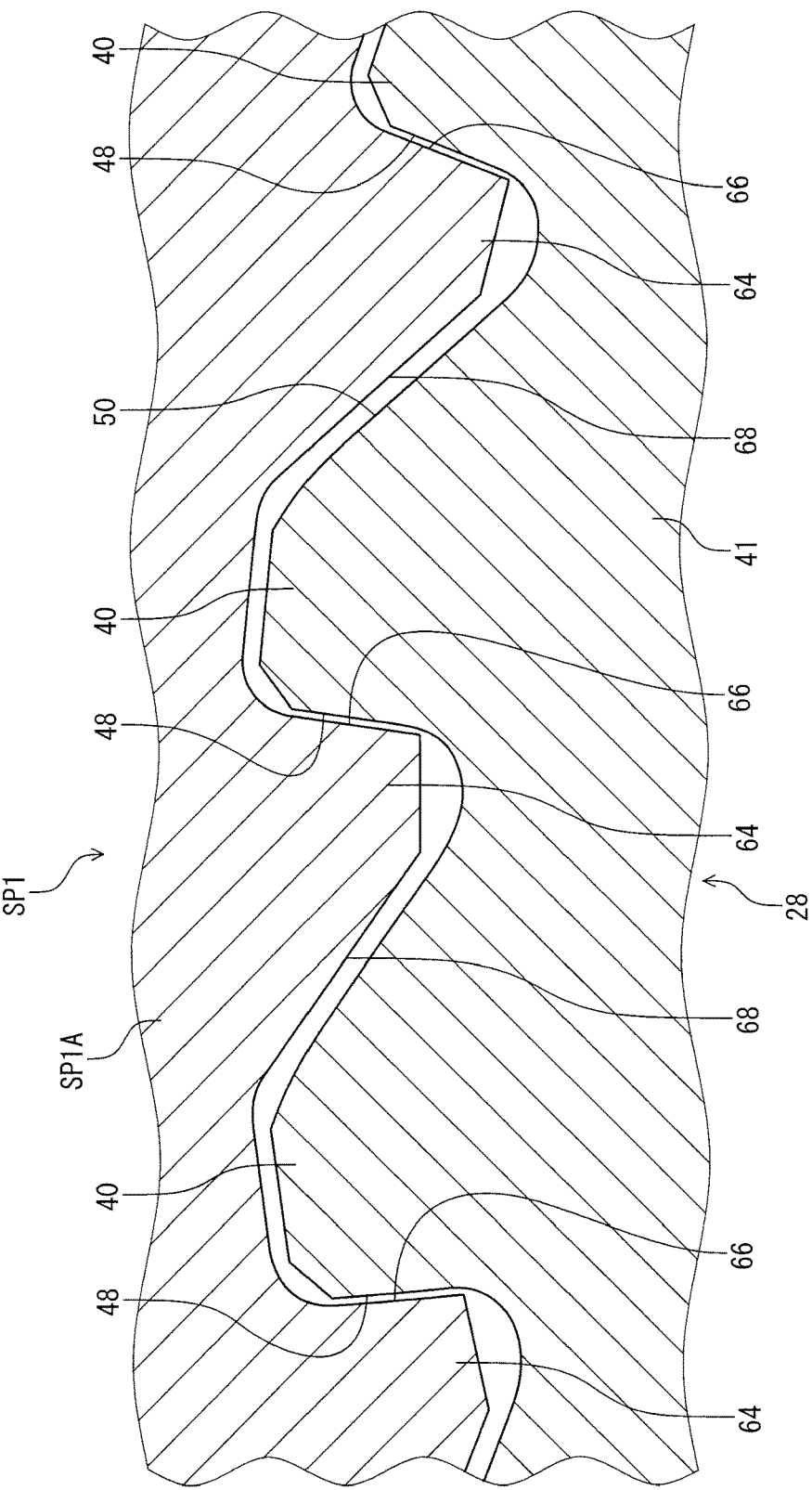
FIG. 30 is a cross-sectional view of the sprocket support body and the smallest sprocket of the bicycle drive train illustrated in FIG. 2.

As seen in FIG. 30, the internal spline teeth 64 mesh with the external spline teeth 40 to transmit the driving rotational force F1 from the sprocket SP1 to the sprocket support body 28. The internal-spline driving surface 66 is contactable with the external-spline driving surface 48 to transmit the driving rotational force F1 from the sprocket SP1 to the sprocket support body 28. The internal-spline non-driving surface 68 is spaced apart from the external-spline non-driving surface 50 in a state where the internal-spline driving surface 66 is in contact with the external-spline driving surface 48.

Figure 31:
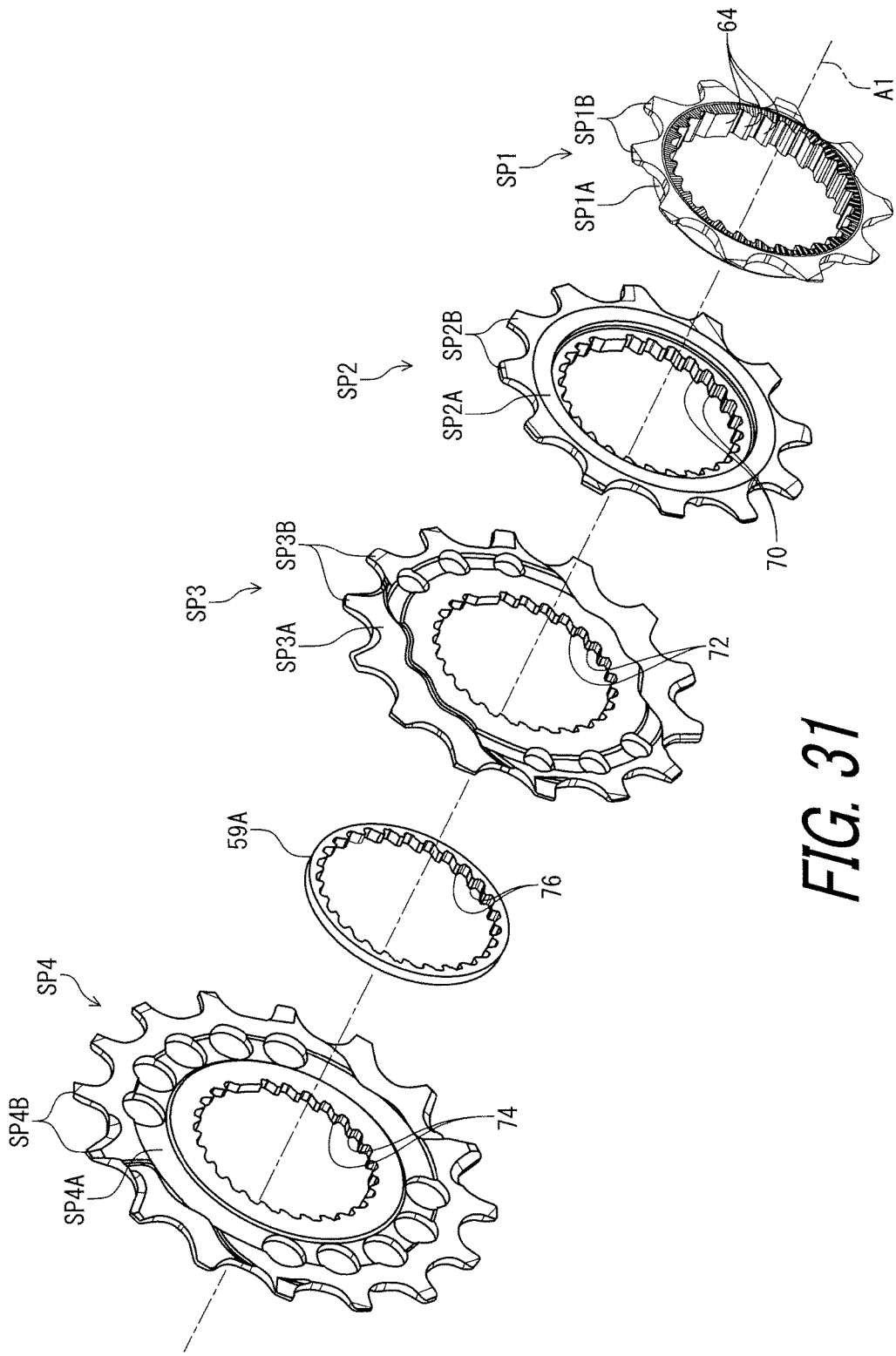
FIG. 31 is a partial exploded perspective view of the bicycle rear sprocket assembly illustrated in FIG. 17.
Figure 32:
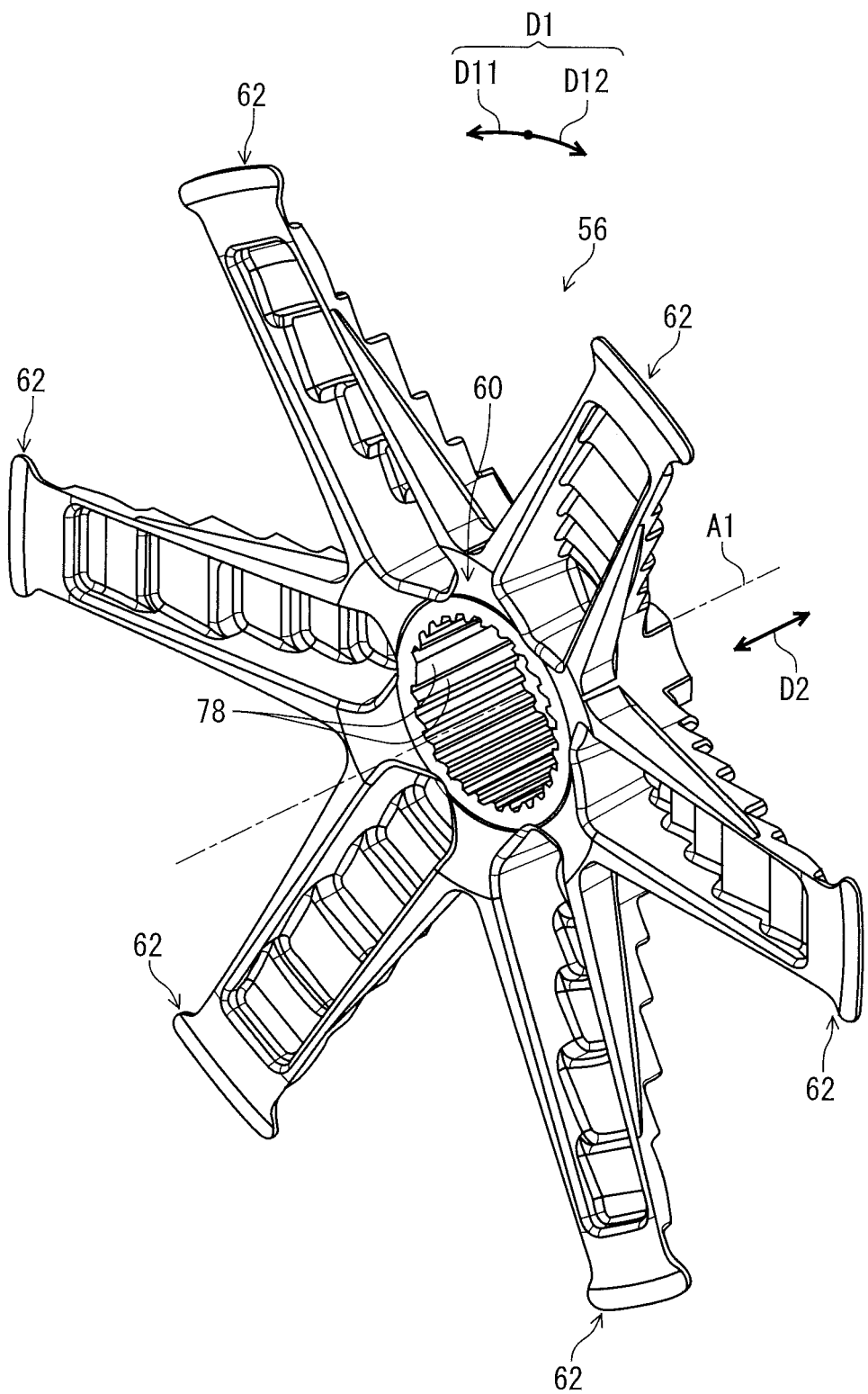
FIG. 32 is a perspective view of a sprocket support of the bicycle rear sprocket assembly illustrated in FIG. 17.

As seen in FIG. 31, the sprocket SP2 includes a plurality of internal spline teeth 70. The sprocket SP3 includes a plurality of internal spline teeth 72. The sprocket SP4 includes a plurality of internal spline teeth 74. The first ring 59A includes a plurality of internal spline teeth 76. As seen in FIG. 32, the hub engagement part 60 of the sprocket support 56 includes a plurality of internal spline teeth 78. The plurality of internal spline teeth 70 has substantially the same structure as that of the plurality of internal spline teeth 64. The plurality of internal spline teeth 72 has substantially the same structure as that of the plurality of internal spline teeth 64. The plurality of internal spline teeth 74 has substantially the same structure as that of the plurality of internal spline teeth 64. The plurality of internal spline teeth 76 has substantially the same structure as that of the plurality of internal spline teeth 64. The plurality of internal spline teeth 78 has substantially the same structure as that of the plurality of internal spline teeth 64. Thus, they will not be described in detail here for the sake of brevity.

As seen in FIGS. 9 and 10, the sprocket support body 28 includes a hub indicator 281 provided at an axial end of the base support 41. The hub indicator 281 is provided in an area of the second external pitch angle PA12 when viewed along the rotational center axis A1. In this embodiment, the hub indicator 281 includes a dot. However, the hub indicator 281 can include other shapes such as a triangle and a line. Further, the hub indicator 281 can be a separate member that is attached to the sprocket support body 28 e.g. with a bonding structure such as an adhesive agent. The position of the hub indicator 281 is not limited to this embodiment.

As seen in FIGS. 26 and 27, the sprocket SP1 includes a sprocket indicator SP1I provided at an axial end of the sprocket body SP1A. The sprocket indicator SP1I is provided in an area of the second internal pitch angle PA22 when viewed along the rotational center axis A1. In this embodiment, the sprocket indicator SP1I includes a dot. However, the sprocket indicator SP1I can include other shapes such as a triangle and a line. Further, the sprocket indicator SP1I can be a separate member that is attached to the sprocket SP1 e.g. with a bonding structure such as an adhesive agent. The position of the sprocket indicator SP1I is not limited to this embodiment. The sprocket indicator SP1I can be provided to any one of other sprockets SP2 to SP12. The sprocket indicator SP1I can also be provided to the sprocket support 56.

Figure 33:
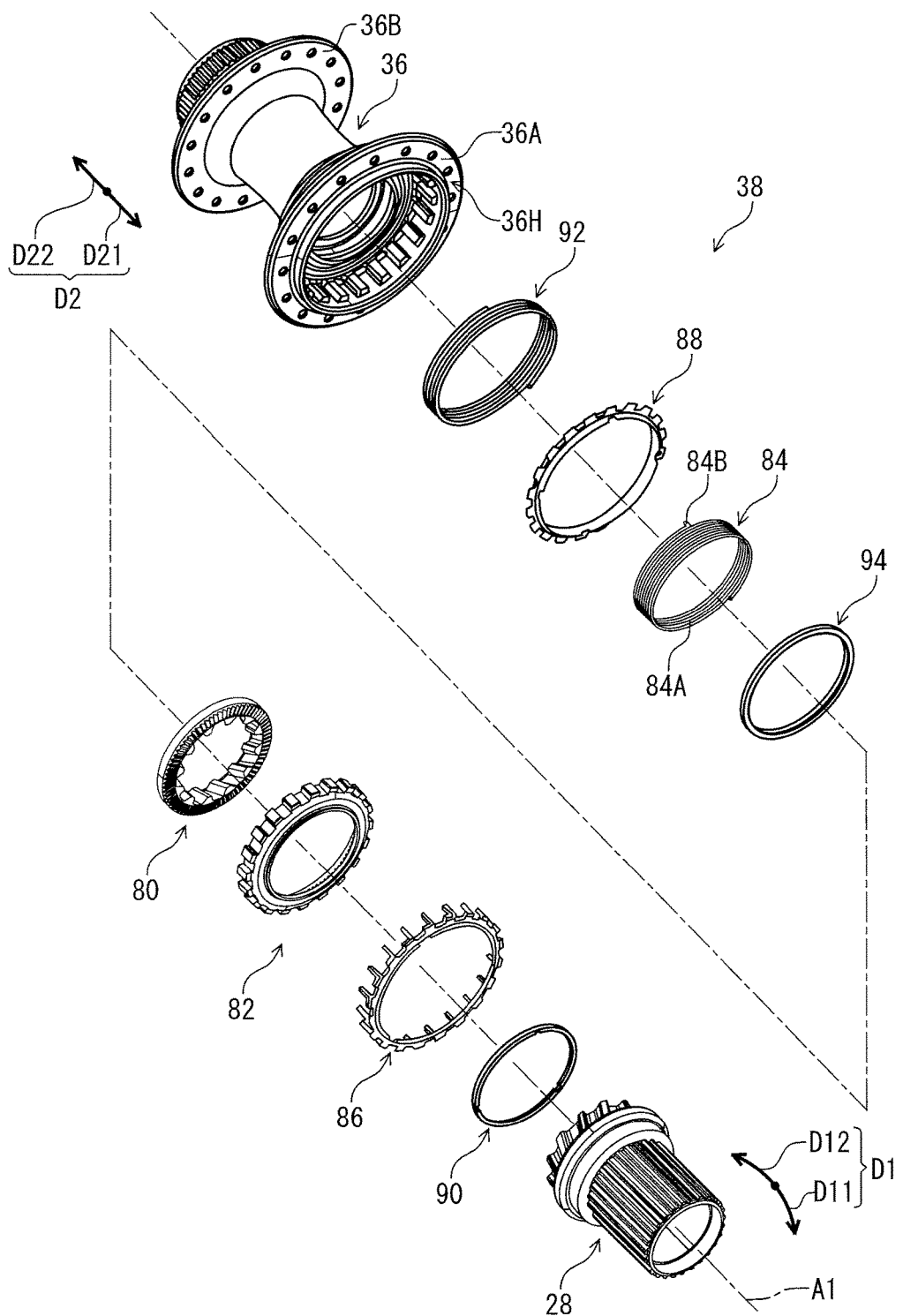
FIG. 33 is an exploded perspective view of a part of the bicycle hub assembly illustrated in FIG. 5.

As seen in FIG. 33, the freewheel structure 38 includes a first ratchet member 80 and a second ratchet member 82. The first ratchet member 80 is configured to engage with one of the hub body 36 and the sprocket support body 28 in a torque transmitting manner. The second ratchet member 82 is configured to engage with the other of the hub body 36 and the sprocket support body 28 in a torque transmitting manner. In this embodiment, the first ratchet member 80 is engage with the sprocket support body 28 in a torque transmitting manner. The second ratchet member 82 is engage with the hub body 36 in a torque transmitting manner. However, the first ratchet member 80 can be configured to engage with the hub body 36 in a torque transmitting manner. The second ratchet member 82 can be configured to engage with the sprocket support body 28 in a torque transmitting manner.

The first ratchet member 80 is mounted to the sprocket support body 28 to rotate together with the sprocket support body 28 relative to the hub body 36 about the rotational center axis A1. The second ratchet member 82 is mounted to the hub body 36 to rotate together with the hub body 36 relative to the sprocket support body 28 about the rotational center axis A1. Each of the first ratchet member 80 and the second ratchet member 82 has an annular shape.

At least one of the first ratchet member 80 and the second ratchet member 82 is movable relative to the hub axle 30 in the axial direction D2 with respect to the rotational center axis A1. In this embodiment, each of the first ratchet member 80 and the second ratchet member 82 is movable relative to the hub axle 30 in the axial direction D2. The second ratchet member 82 is movable relative to the hub body 36 in the axial direction D2. The first ratchet member 80 is movable relative to the sprocket support body 28 in the axial direction D2.

The hub body 36 includes a freewheel housing 36H having an annular shape. The freewheel housing 36H extends in the axial direction D2. The first ratchet member 80 and the second ratchet member 82 are provided in the freewheel housing 36H in an assembled state.

Figure 34:
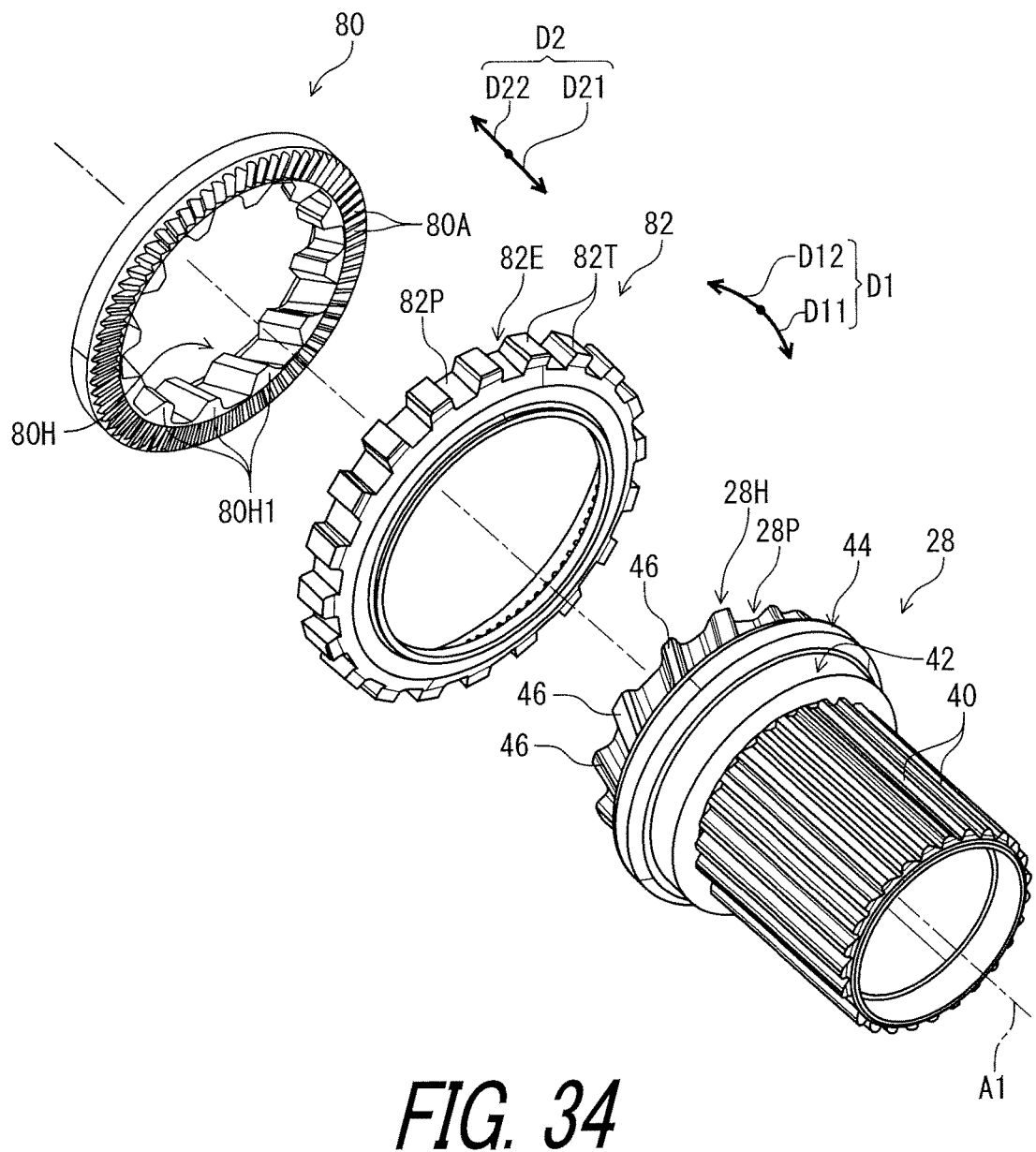
FIG. 34 is an exploded perspective view of a part of the bicycle hub assembly illustrated in FIG. 33.

As seen in FIG. 34, the first ratchet member 80 includes at least one first ratchet tooth 80A. In this embodiment, the at least one first ratchet tooth 80A includes a plurality of first ratchet teeth 80A. The plurality of first ratchet teeth 80A is arranged in the circumferential direction D1 to provide a serration.

Figure 35:
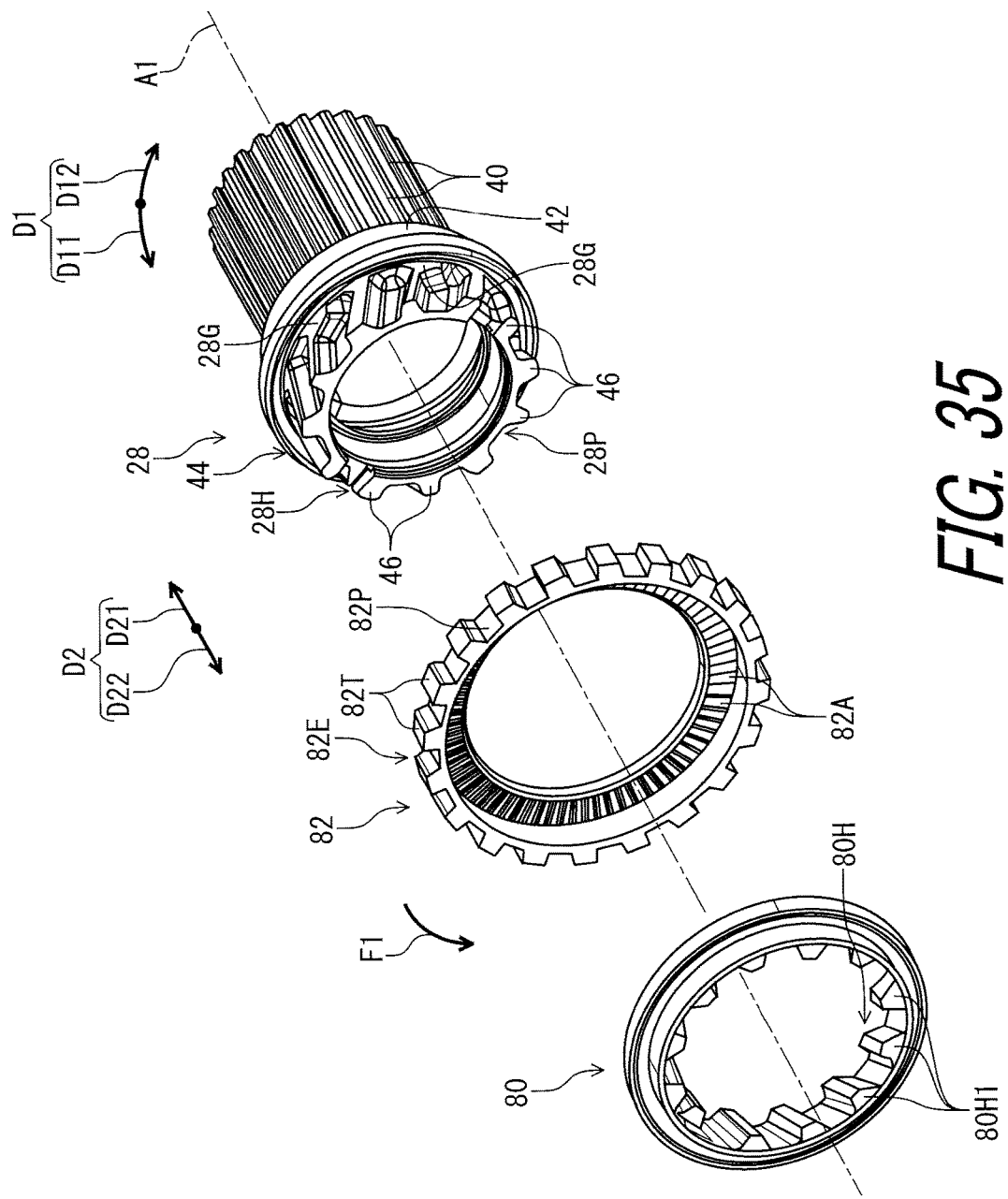
FIG. 35 is an exploded perspective view of a part of the bicycle hub assembly illustrated in FIG. 33.

As seen in FIG. 35, the second ratchet member 82 includes at least one second ratchet tooth 82A configured to engage with the at least one first ratchet tooth 80A in a torque transmitting manner. The at least one second ratchet tooth 82A engages with the at least one first ratchet tooth 80A to transmit the rotational force F1 from the sprocket support body 28 to the hub body 36 (FIG. 33). In this embodiment, the at least one second ratchet tooth 82A includes a plurality of second ratchet teeth 82A configured to engage with the plurality of first ratchet teeth 80A in a torque transmitting manner. The plurality of second ratchet teeth 82A is arranged in the circumferential direction D1 to provide a serration. The plurality of second ratchet teeth 82A is engageable with the plurality of first ratchet teeth 80A. The first ratchet member 80 and the second ratchet member 82 rotate together in a state where the second ratchet teeth 82A are engaged with the first ratchet teeth 80A.

As seen in FIGS. 34 and 35, the sprocket support body 28 includes an outer peripheral surface 28P having a first helical spline 28H. The first ratchet member 80 is configured to engage with the sprocket support body 28 in a torque transmitting manner and includes a second helical spline 80I4 mating with the first helical spline 28H. The first ratchet member 80 is movably mounted in the axial direction D2 with respect to the sprocket support body 28 via the second helical spline 80H mating with the first helical spline 28H during driving by a first thrust force applied from the sprocket support body 28. In this embodiment, the first helical spline 28H includes the plurality of helical external spline teeth 46. The second helical spline 80H includes a plurality of helical internal spline teeth 80H1 mating with the plurality of helical external spline teeth 46.

Figure 36:
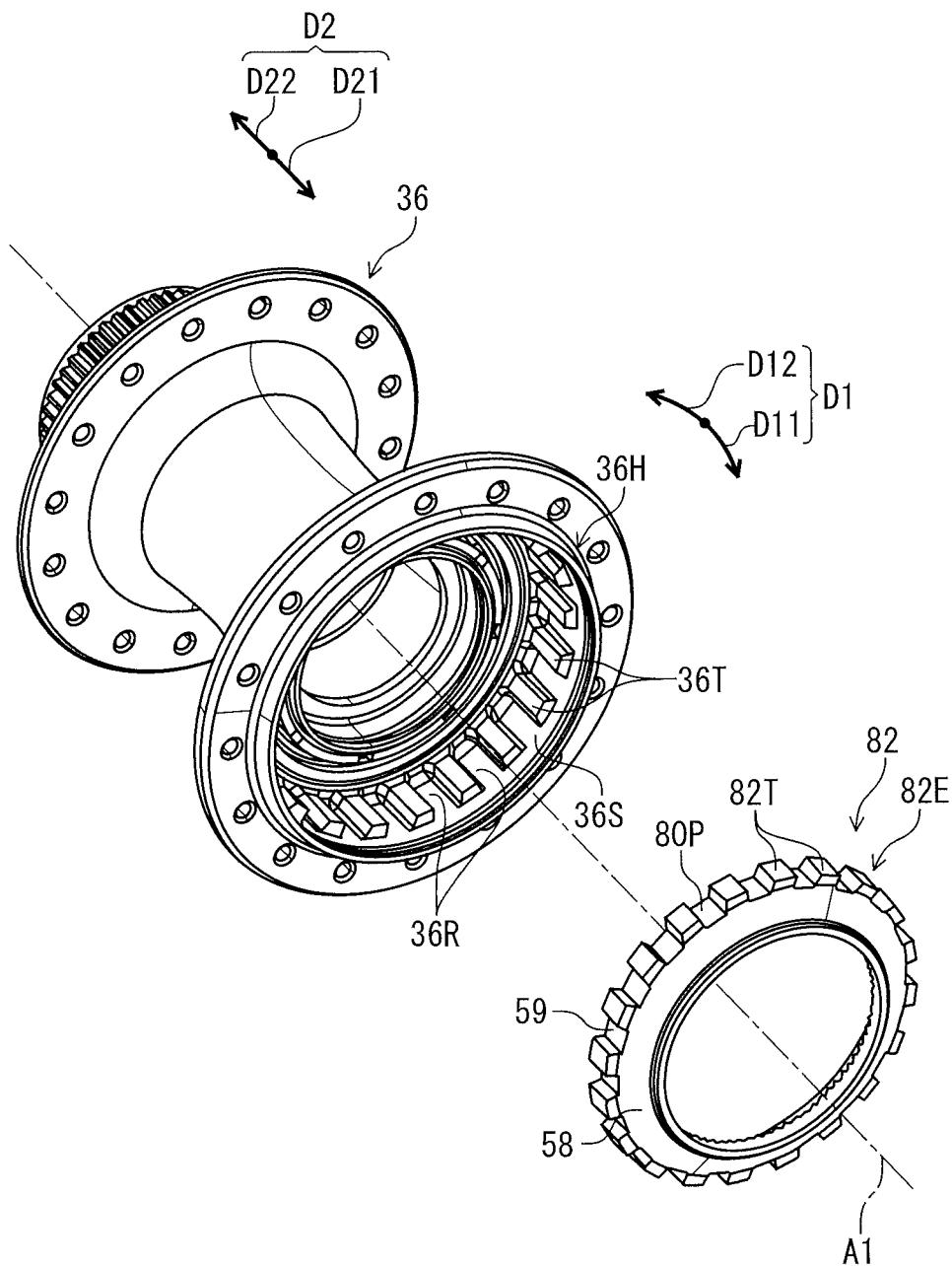
FIG. 36 is an exploded perspective view of a part of the bicycle hub assembly illustrated in FIG. 33.

As seen in FIG. 36, the hub body 36 includes an inner peripheral surface 36S and at least one first tooth 36T. The at least one first tooth 36T is provided on the inner peripheral surface 36S. In this embodiment, the freewheel housing 36H includes the inner peripheral surface 36S. The hub body 36 includes a plurality of first teeth 36T. The plurality of first teeth 36T is provided on the inner peripheral surface 36S and extends radially inwardly from the inner peripheral surface 36S with respect to the rotational center axis A1. The first teeth 36T are arranged in the circumferential direction D1 to define a plurality of recesses 36R between adjacent two teeth of the first teeth 36T.

The second ratchet member 82 includes a hub body engagement portion 82E engaged with the hub body 36 in a torque transmitting manner to transmit the rotational force F1 from the first ratchet member 80 to the hub body 36 via the hub body engagement portion 82E. One of the hub body engagement portion 82E and the hub body 36 includes at least one protrusion extending radially. The other of the hub body engagement portion 82E and the hub body 36 includes at least one recess engaged with the at least one protrusion. In this embodiment, the hub body engagement portion 82E includes at least one protrusion 82T extending radially as at least one protrusion. The hub body 36 includes at least one recess 36R engaged with the at least one protrusion 82T. In this embodiment, the hub body engagement portion 82E includes a plurality of protrusions 82T. The plurality of protrusions 82T is engaged with the plurality of recesses 36R.

As seen in FIG. 35, the outer peripheral surface 28P of the sprocket support body 28 has a guiding portion 28G configured to guide the first ratchet member 80 toward the hub body 36 during coasting. The guiding portion 28G is preferably arranged to define an obtuse angle AG28 (FIG. 41) with respect to the first helical spline 28H. The sprocket support body 28 includes a plurality of guiding portions 28G. The guiding portion 28G is configured to guide the first ratchet member 80 toward the hub body 36 during coasting or freewheeling. The guiding portion 28G guides the first ratchet member 80 toward the hub body 36 to release a meshing engagement between the at least one first ratchet tooth 80A (FIG. 34) and the at least one second ratchet tooth 82A during coasting. The guiding portion 28G is configured to move the first ratchet member 80 away from the second ratchet member 82 in the axial direction D2. The guiding portion 28G extends in at least the circumferential direction D1 with respect to the sprocket support body 28. The guiding portion 28G extends from one tooth of the plurality of helical external spline teeth 46 in at least the circumferential direction D1. While the guiding portion 28G is integrally provided with the helical external spline tooth 46 as a one-piece unitary member in this embodiment, the guiding portion 28G can be a separate member from the plurality of helical external spline teeth 46. The first ratchet member 80 and the second ratchet member 82 are smoothly disengaged from each other during coasting because of the guiding portion 28G, especially in a case where the guiding portion 28G is arranged to define an obtuse angle AG28 with respect to the first helical spline 28H. This also results in reducing noise during coasting because the at least one first ratchet tooth 80A and the at least one second ratchet tooth 82A are smoothly separated from each other during coasting.

As seen in FIG. 33, the bicycle hub assembly 12 further comprises a biasing member 84. The biasing member 84 is disposed between the hub body 36 and the first ratchet member 80 to bias the first ratchet member 80 in the axial direction D2 toward the second ratchet member 82. In this embodiment, for example, the biasing member 84 is a compression spring.

Figure 37:
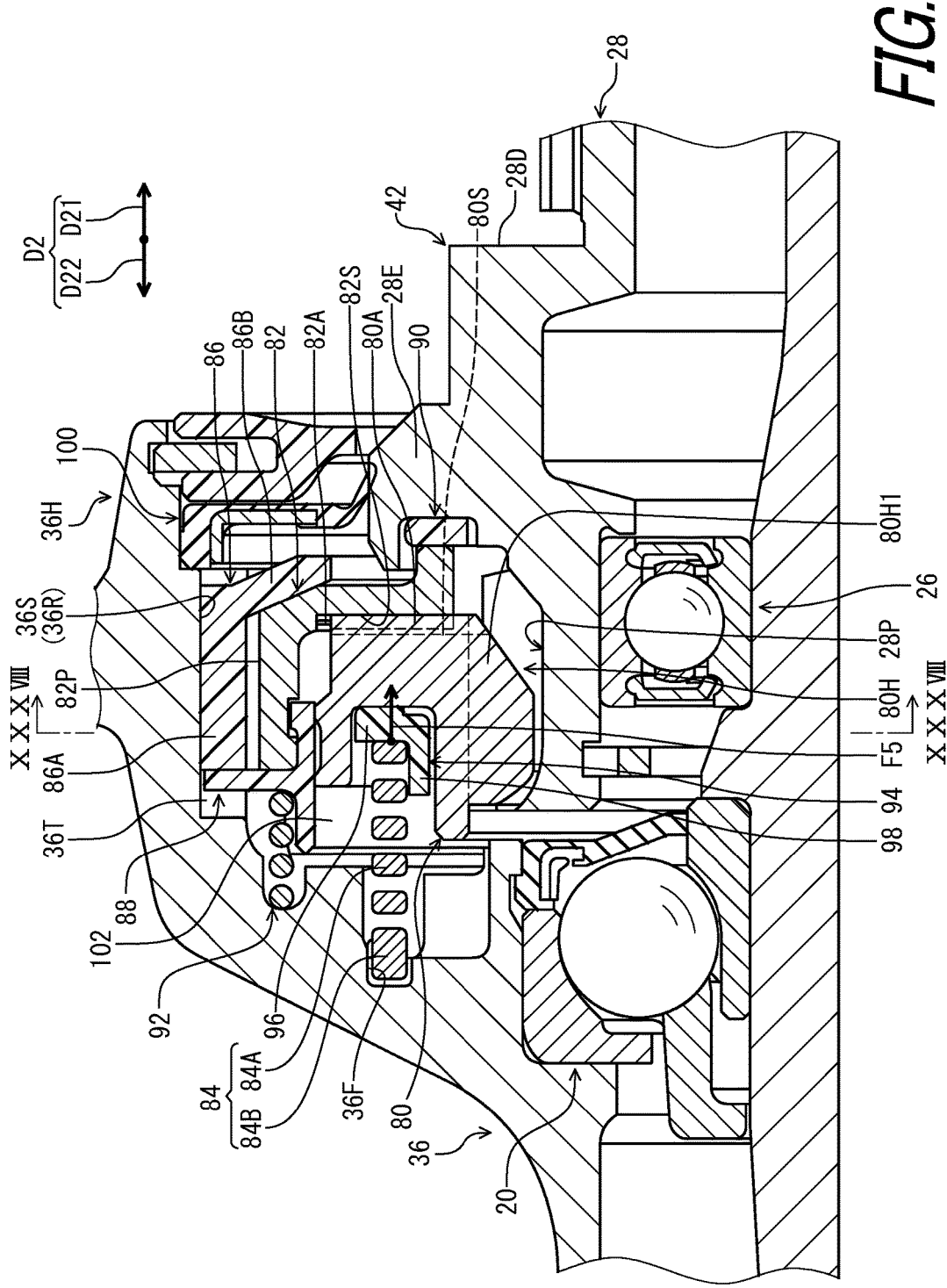
FIG. 37 is a partial cross-sectional view of the bicycle hub assembly illustrated in FIG. 33.

As seen in FIG. 37, the biasing member 84 is compressed between the hub body 36 and the first ratchet member 80 in the axial direction D2. The biasing member 84 biases the first ratchet member 80 toward the second ratchet member 82 to maintain an engagement state where the first ratchet member 80 and the second ratchet member 82 are engaged with each other via the first ratchet teeth 80A and the second ratchet teeth 82A.

Preferably, the biasing member 84 is engaged with the hub body 36 to rotate with the hub body 36. The biasing member 84 is mounted to the hub body 36 to rotate together with the hub body 36 about the rotational center axis A1 (FIG. 33). The biasing member 84 includes a coiled body 84A and a connecting end 84B. The hub body 36 includes a connecting hole 36F. The connecting end 84B is provided in the connecting hole 36F so that the biasing member 84 rotates together with the hub body 36 about the rotational center axis A1 (FIG. 33).

As seen in FIG. 37, the outer peripheral surface 28P of the sprocket support body 28 supports the first ratchet member 80 and the second ratchet member 82. The first ratchet member 80 includes an axial facing surface 80S facing in the axial direction D2. The at least one first ratchet tooth 80A is disposed on the axial facing surface 80S of the first ratchet member 80. In this embodiment, the plurality of first ratchet teeth 80A is disposed on the axial facing surface 80S of the first ratchet member 80. The axial facing surface 80S is substantially perpendicular to the axial direction D2. However, the axial facing surface 80S can be non-perpendicular to the axial direction D2.

The second ratchet member 82 includes an axial facing surface 82S facing in the axial direction D2. The plurality of second ratchet teeth 82A is disposed on the axial facing surface 82S of the second ratchet member 82. The axial facing surface 82S of the second ratchet member 82 faces toward the axial facing surface 80S of the first ratchet member 80. The axial facing surface 82S is substantially perpendicular to the axial direction D2. However, the axial facing surface 82S can be non-perpendicular to the axial direction D2.

As seen in FIG. 33, the bicycle hub assembly 12 comprises a spacer 86, a supporting member 88, a sliding member 90, an additional biasing member 92, and a receiving member 94. However, it is possible to omit at least one of the spacer 86, the supporting member 88, the sliding member 90, the additional biasing member 92, and the receiving member 94 from the bicycle hub assembly 12.

Figure 38:
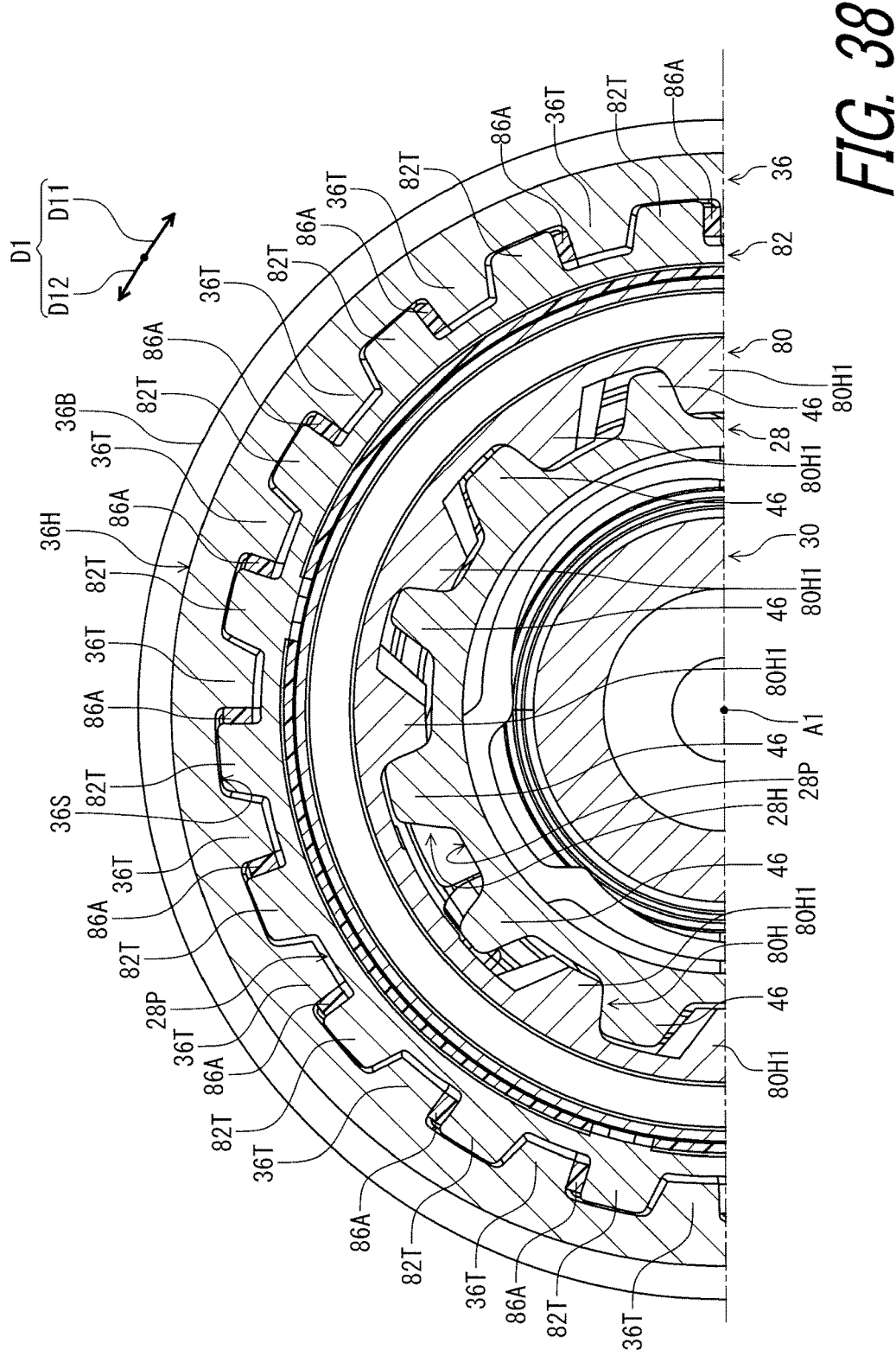
FIG. 38 is a cross-sectional view of the bicycle hub assembly taken along line XXXVIII-XXXVIII of FIG. 37.

As seen in FIGS. 37 and 38, the spacer 86 is at least partly provided between the at least one first tooth 36T and the at least one protrusion 82T in the circumferential direction D1 defined about the rotational center axis A1. In this embodiment, the spacer 86 is partly provided between the first teeth 36T and the protrusions 82T in the circumferential direction D1. However, the spacer 86 can be entirely provided between the first teeth 36T and the protrusions 82T in the circumferential direction D1.

Figure 39:
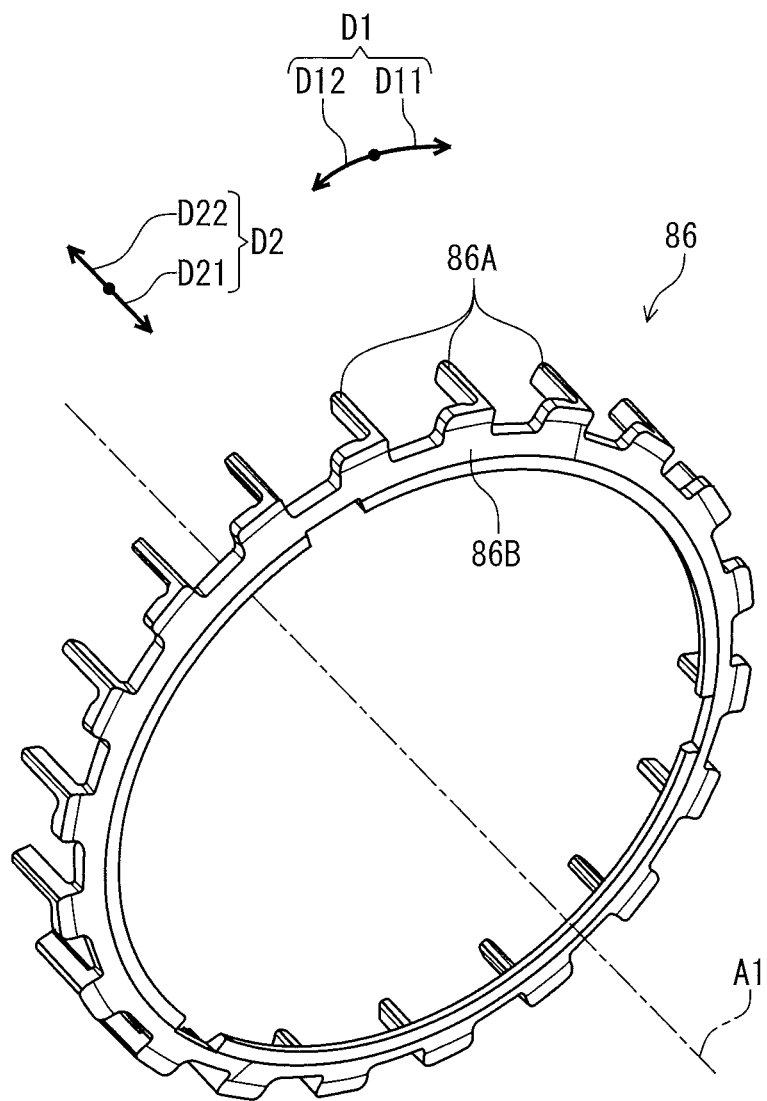
FIG. 39 is a perspective view of a spacer of the bicycle hub assembly illustrated in FIG. 33.
Figure 40:
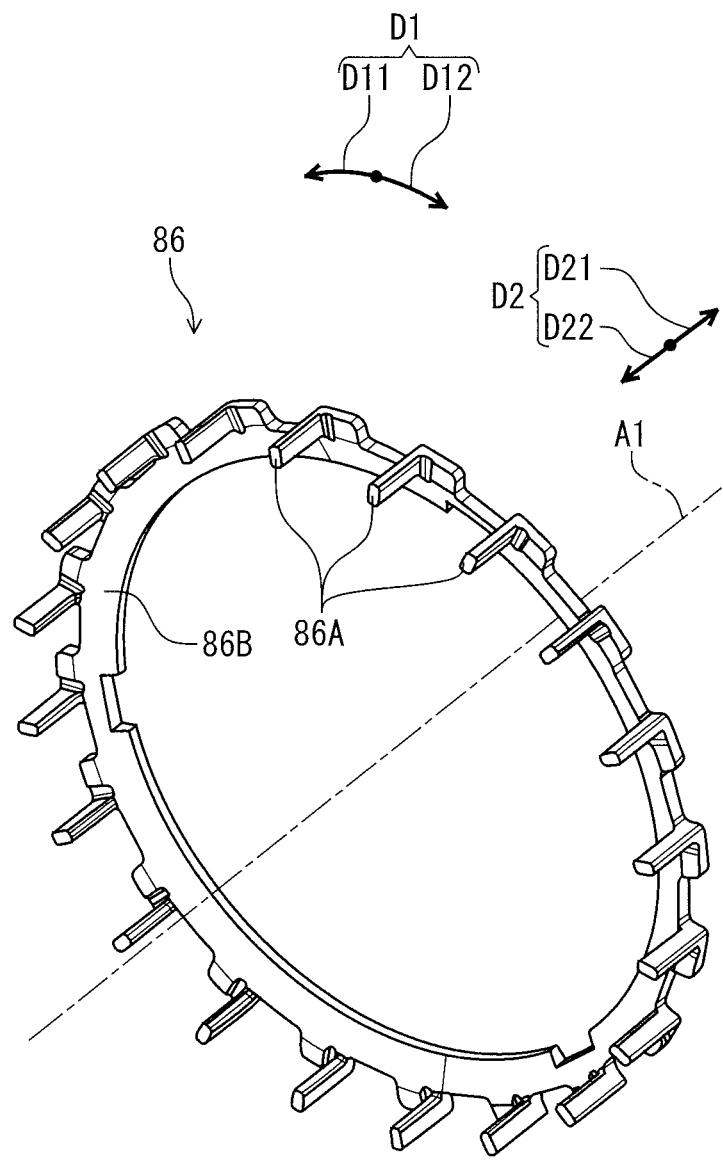
FIG. 40 is a perspective view of a spacer of the bicycle hub assembly illustrated in FIG. 33.

As seen in FIGS. 38 to 40, the spacer 86 includes at least one intermediate portion 86A provided between the at least one first tooth 36T and the at least one protrusion 82T. The at least one intermediate portion 86A provided between the at least one first tooth 36T and the at least one protrusion 82T in the circumferential direction D1. In this embodiment, the spacer 86 includes a plurality of intermediate portions 86A respectively provided between the first teeth 36T and the protrusions 82T in the circumferential direction D1. While the spacer 86 includes the intermediate portions 86A in this embodiment, the spacer 86 can include one intermediate portion 86A.

As seen in FIGS. 39 and 40, the spacer 86 includes a connection portion 86B. The plurality of intermediate portions 86A extends from the connection portion 86B in the axial direction D2 parallel to the rotational center axis A1. While the spacer 86 includes the connection portion 86B in this embodiment, the connection portion 86B can be omitted from the spacer 86.

The spacer 86 including a non-metallic material. In this embodiment, the non-metallic material includes a resin material. Examples of the resin material include synthetic resin. The non-metallic material can include a material other than the resin material instead of or in addition to the resin material. While the intermediate portions 86A and the connection portion 86B are integrally provided with each other as a one-piece unitary member in this embodiment, at least one of the intermediate portions 86A can be a separate portion from the connection portion 86B.

As seen in FIGS. 37 and 38, the plurality of intermediate portions 86A is provided between the inner peripheral surface 36S of the hub body 36 and an outer peripheral surface 82P of the second ratchet member 82 in the radial direction.

As seen in FIG. 37, the supporting member 88 is provided between the hub body 36 and the second ratchet member 82 in the axial direction D2. The supporting member 88 is attached to the second ratchet member 82. The supporting member 88 is provided radially outwardly of the first ratchet member 80. The supporting member 88 is contactable with the first ratchet member 80. The supporting member 88 preferably includes a non-metallic material. The supporting member 88 made of a non-metallic material reduces noise during operation of the bicycle hub assembly 12. In this embodiment, the non-metallic material includes a resin material. The non-metallic material can include a material other than the resin material instead of or in addition to the resin material.

The sliding member 90 is provided between the sprocket support body 28 and the second ratchet member 82 in the axial direction D2 parallel to the rotational center axis A1. The second ratchet member 82 is provided between the first ratchet member 80 and the sliding member 90 in the axial direction D2. The sliding member 90 preferably includes a non-metallic material. The sliding member 90 made of a non-metallic material reduces noise during operation of the bicycle hub assembly 12. In this embodiment, the non-metallic material includes a resin material. The non-metallic material can include a material other than the resin material instead of or in addition to the resin material.

The sprocket support body 28 includes an abutment 28E to abut the second ratchet member 82 to restrict an axial movement of the second ratchet member 82 away from the hub body 36. The abutment 28E can indirectly abut the second ratchet member 82 via the sliding member 90 in this embodiment. Alternatively, the abutment 28E can directly abut the second ratchet member 82. The first ratchet member 80 is disposed on an axial side of the second ratchet member 82 that is opposite to the abutment 28E of the sprocket support body 28 in the axial direction D2. The sliding member 90 is provided between the abutment 28E of the sprocket support body 28 and the second ratchet member 82 in the axial direction D2.

As seen in FIG. 37, the additional biasing member 92 is provided between the hub body 36 and the second ratchet member 82 in the axial direction D2 to bias the second ratchet member 82 toward the sprocket support body 28. In this embodiment, the additional biasing member 92 biases the second ratchet member 82 in the axial direction D2 via the supporting member 88. The additional biasing member 92 is provided radially outwardly of the biasing member 84. The additional biasing member 92 is provided radially outwardly of the plurality of second ratchet teeth 82A in this embodiment.

The receiving member 94 includes a non-metallic material. The receiving member 94 made of a non-metallic material prevent the biasing member 84 from excessively twisting during operation of the bicycle hub assembly 12. In this embodiment, the non-metallic material includes a resin material. The non-metallic material can include a material other than the resin material instead of or in addition to the resin material. The receiving member 94 includes an axially receiving part 96 and a radially receiving part 98. The axially receiving part 96 is provided between the first ratchet member 80 and the biasing member 84 in the axial direction D2. The radially receiving part 98 extends from the axially receiving part 96 in the axial direction D2. The radially receiving part 98 is provided radially inwardly of the biasing member 84. The axially receiving part 96 and the radially receiving part 98 are integrally provided with each other as a one-piece unitary member. However, the axially receiving part 96 can be a separate member from the radially receiving part 98.

As seen in FIG. 37, the bicycle hub assembly 12 comprises a seal structure 100. The seal structure 100 is provided between the sprocket support body 28 and the hub body 36. The hub body 36 includes an internal space 102. Each of the sprocket support body 28, the biasing member 84, the first ratchet member 80, and the second ratchet member 82 is at least partly disposed in the internal space 102 of the hub body 36. The internal space 102 is sealed by the seal structure 100. In this embodiment, no lubricant is provided in the internal space 102. However, the bicycle hub assembly 12 can comprises lubricant provided in the internal space 102. Each gap between members disposed in the internal space 102 can be reduced if no lubricant is provided in comparison with a case in which the bicycle hub assembly 12 can comprises lubricant provided in the internal space 102.

The operation of the bicycle hub assembly 12 will be described in detail below referring to FIGS. 37, 41, and 42.

As seen in FIG. 37, the axial direction D2 includes a first axial direction D21 and a second axial direction D22 opposite to the first axial direction D21. A biasing force F5 is applied from the biasing member 84 to the receiving member 94 in the first axial direction D21. The biasing force F5 of the biasing member 84 biases the receiving member 94, the first ratchet member 80, the second ratchet member 82, and the sliding member 90 toward the sprocket support body 28 in the first axial direction D21. This brings the first ratchet teeth 80A into engagement with the second ratchet teeth 82A.

Figure 41:
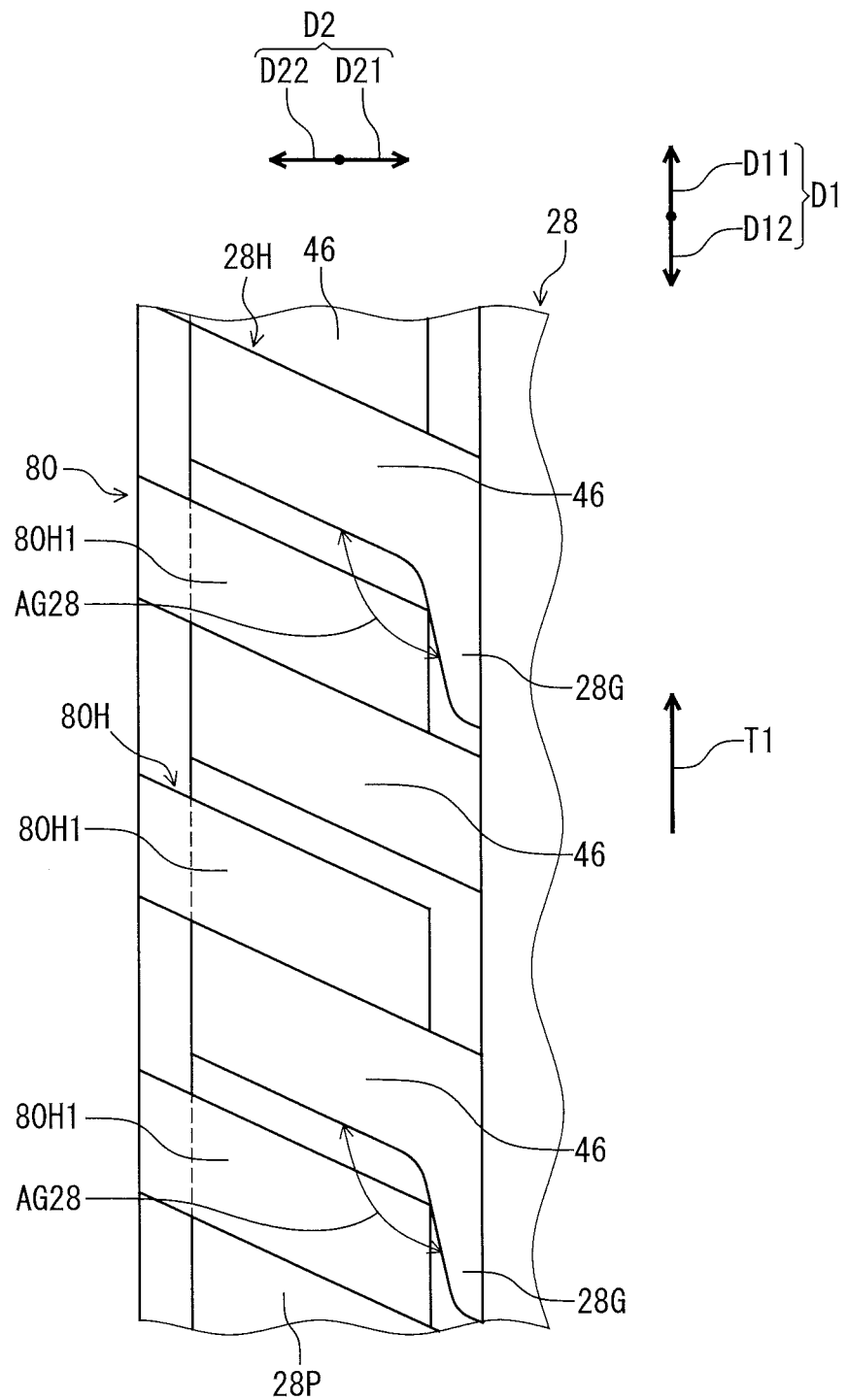
FIG. 41 is a schematic diagram showing an action of a first ratchet member and a sprocket support body of the bicycle hub assembly illustrated in FIG. 33 (pedaling).
Figure 42:
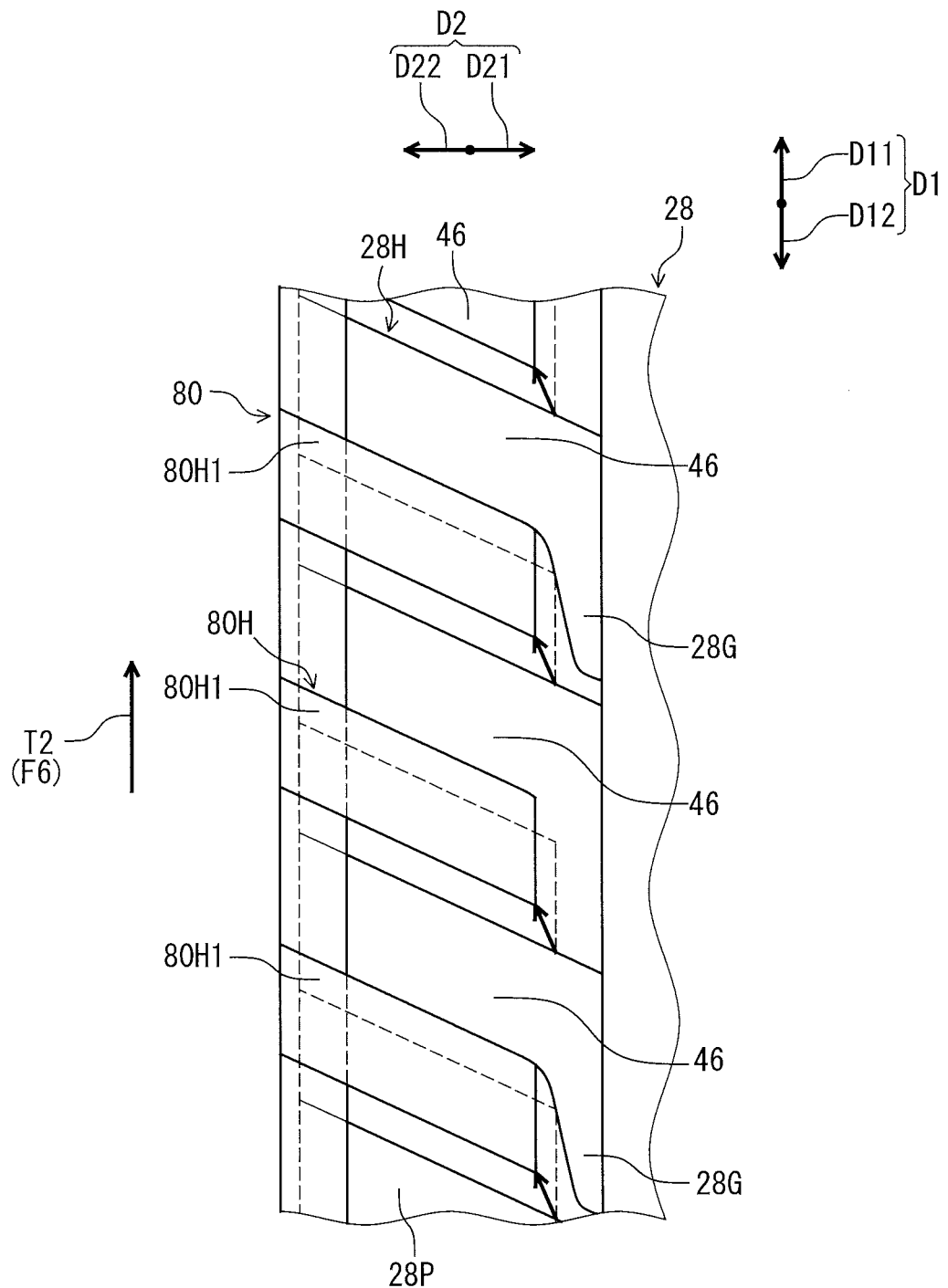
FIG. 42 is a schematic diagram showing an action of the first ratchet member and the sprocket support body of the bicycle hub assembly illustrated in FIG. 33 (coasting).

Furthermore, as seen in FIG. 41, when a pedaling torque T1 is input to the sprocket support body 28 in the driving rotational direction D11, the helical internal spline teeth 80H1 are guided by the helical external spline teeth 46 relative to the sprocket support body 28 in the first axial direction D21. This strongly brings the first ratchet teeth 80A into engagement with the second ratchet teeth 82A. In this state, the pedaling torque T1 is transmitted from the sprocket support body 28 to the hub body 36 (FIG. 37) via the first ratchet member 80 and the second ratchet member 82 (FIG. 37).

As seen in FIG. 41, the first ratchet member 80 contacts the guiding portion 28G to disengage from the second ratchet member 82 with a rotational friction force F6 generated between the biasing member 84 (FIG. 37) and the first ratchet member 80 during coasting. As seen in FIG. 42, a coasting torque T2 is applied to the hub body 36 in the driving rotational direction D11 during coasting. The coasting torque T2 is transmitted from the hub body 36 (FIG. 37) to the first ratchet member 80 via the second ratchet member 82 (FIG. 37). At this time, the helical internal spline teeth 80H1 are guided by the helical external spline teeth 46 relative to the sprocket support body 28 in the second axial direction D22. This moves the first ratchet member 80 relative to the sprocket support body 28 in the second axial direction D22 against the biasing force F5. Thus, the first ratchet member 80 is moved away from the second ratchet member 82 in the second axial direction D22, causing the engagement between the first ratchet teeth 80A and the second ratchet teeth 82A to be weaker. This allows the second ratchet member 82 to rotate relative to the first ratchet member 80 in the driving rotational direction D11, preventing the coasting torque T2 from being transmitted from the hub body 36 to the sprocket support body 28 via the first ratchet member 80 and the second ratchet member 82. At this time, the first ratchet teeth 80A slide with the second ratchet teeth 82A in the circumferential direction D1.

Second Embodiment

A bicycle hub assembly 212 in accordance with a second embodiment will be described below referring to FIGS. 43 and 44. The bicycle hub assembly 212 has the same structure and/or configuration as those of the bicycle hub assembly 12 except for the hub body 36. Thus, elements having substantially the same function as those in the first embodiment will be numbered the same here, and will not be described and/or illustrated again in detail here for the sake of brevity.

Figure 43:
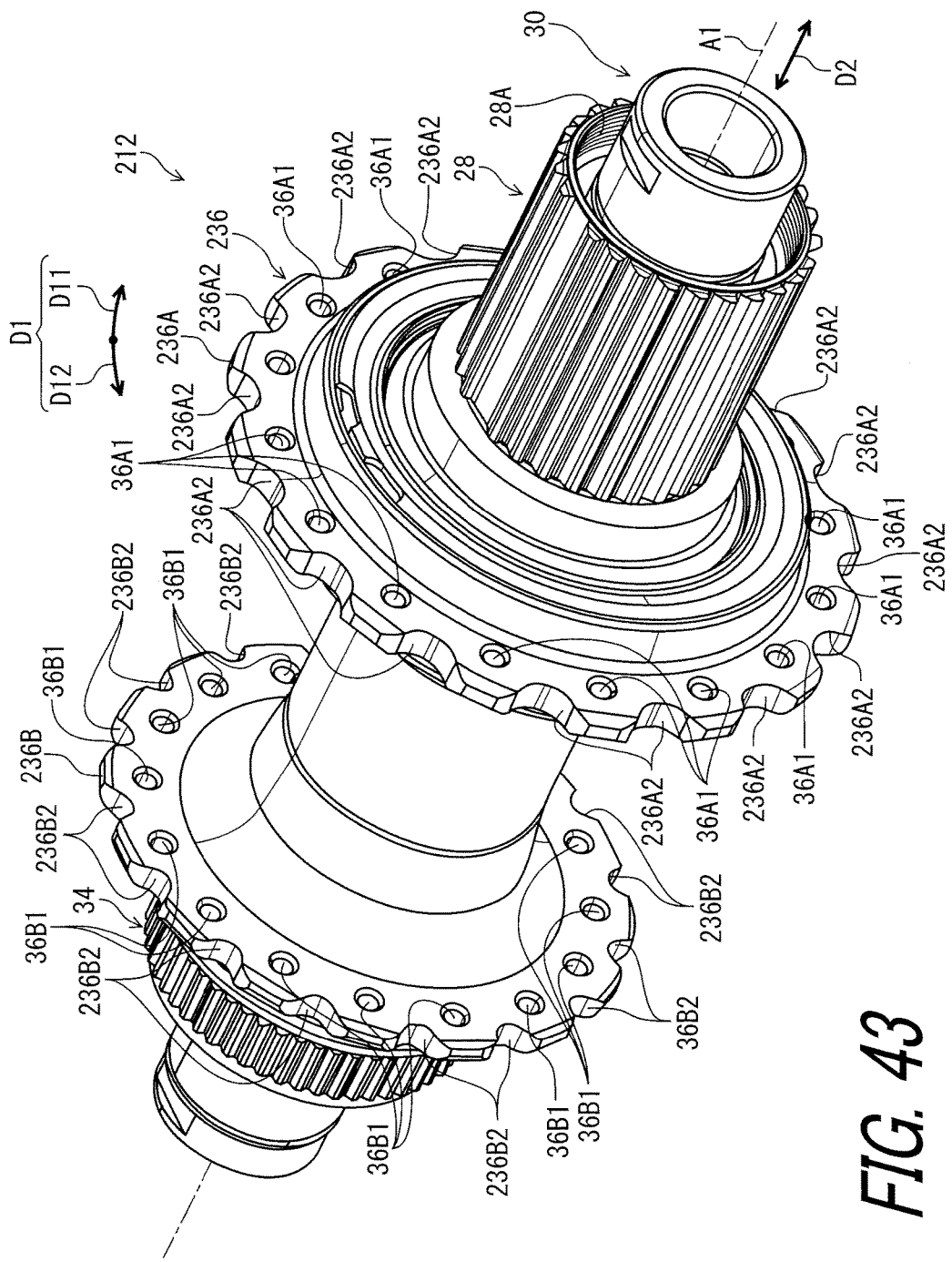
FIG. 43 is a perspective view of a bicycle hub assembly in accordance with a second embodiment.

As seen in FIG. 43, the bicycle hub assembly 212 comprises a hub body 236. The hub body 236 is rotatably mounted on the hub axle 30 about the rotational center axis A1 of the bicycle hub assembly 212. The hub body 236 has substantially the same structure as that of the hub body 36 of the first embodiment.

In this embodiment, the hub body 236 includes a first spoke-mounting portion 236A and a second spoke-mounting portion 236B. The first spoke-mounting portion 236A has substantially the same structure as that of the first spoke-mounting portion 36A of the first embodiment. The second spoke-mounting portion 236B has substantially the same structure as that of the second spoke-mounting portion 36B of the first embodiment.

The first spoke-mounting portion 236A includes the plurality of first attachment holes 36A1 and a plurality of first recesses 236A2. The plurality of first recesses 236A2 is provided on an outer periphery of the first spoke-mounting portion 236A. The plurality of first recesses 236A2 is arranged in the circumferential direction D1.

The second spoke-mounting portion 236B includes the plurality of second attachment holes 36B1 and a plurality of second recesses 236B2. The plurality of second recesses 236B2 is provided on an outer periphery of the second spoke-mounting portion 236B. The plurality of second recesses 236B2 is arranged in the circumferential direction D1.

Figure 44:
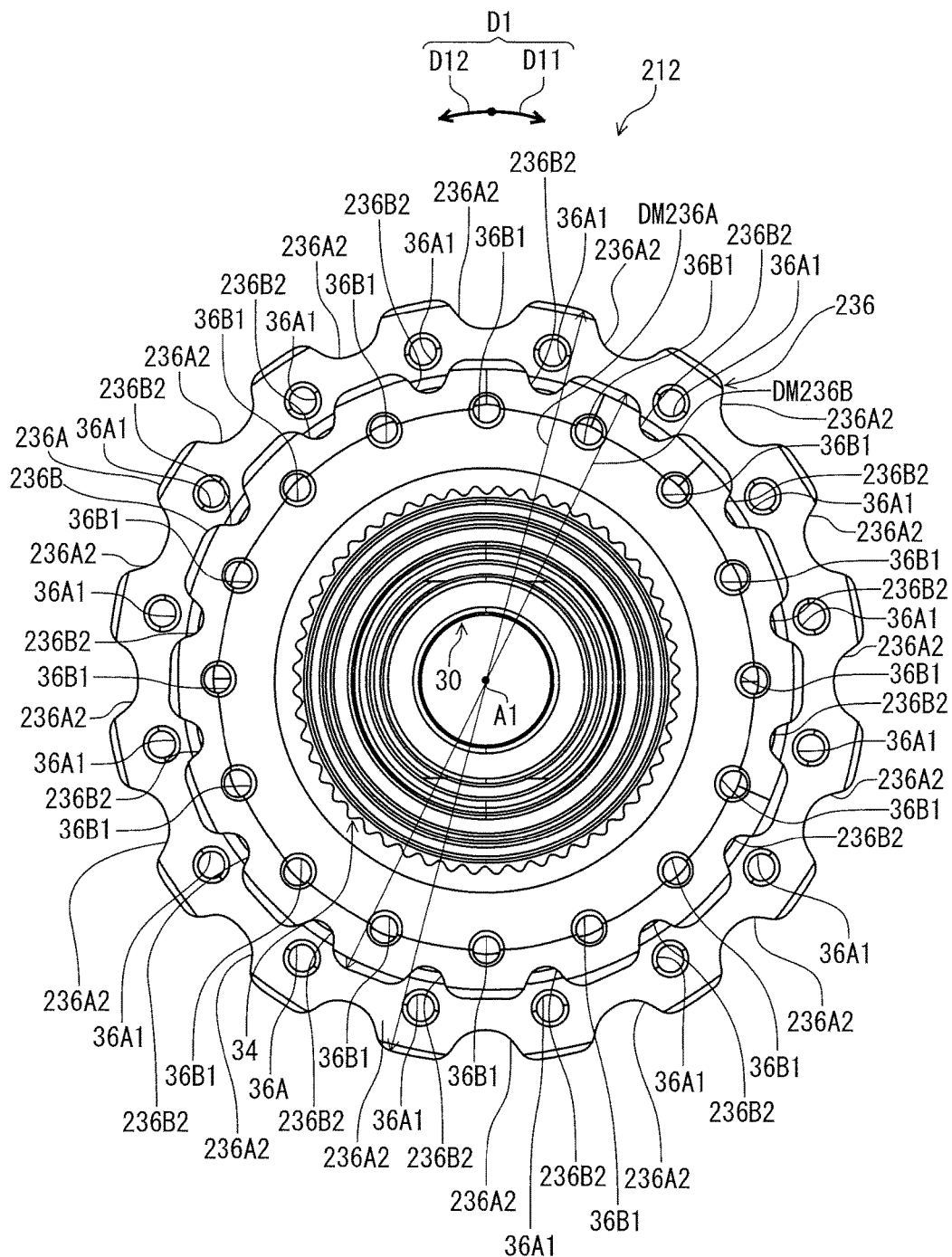
FIG. 44 is a side elevational view of the bicycle hub assembly illustrated in FIG. 43.

As seen in FIG. 44, the plurality of first attachment holes 36A1 is arranged in the circumferential direction D1 at a constant pitch. The plurality of first recesses 236A2 is arranged in the circumferential direction D1 at a constant pitch. A circumferential position of the first recess 236A2 is offset from a circumferential position of the first attachment holes 36A1 in the circumferential direction D1 when viewed along the rotational center axis A1. The first recess 236A2 is provided between adjacent two holes of the plurality of first attachment holes 36A1 in the circumferential direction D1.

The plurality of second attachment holes 36B1 is arranged in the circumferential direction D1 at a constant pitch. The plurality of second recesses 236B2 is arranged in the circumferential direction D1 at a constant pitch. A circumferential position of the second recess 236B2 is offset from a circumferential position of the second attachment holes 36B1 in the circumferential direction D1 when viewed along the rotational center axis A1. The second recess 236B2 is provided between adjacent two holes of the plurality of second attachment holes 36B1 in the circumferential direction D1.

The first spoke-mounting portion 236A has a first outer diameter DM236A. The second spoke-mounting portion 236B has a second outer diameter DM236B. The first outer diameter DM236A is larger than the second outer diameter DM236B because the freewheel structure 38 needs to be disposed radially inwardly from the first spoke-mounting portion 236A with respect to the rotational center axis A1. However, the first outer diameter DM236A can be equal to or smaller than the second outer diameter DM236B.

The plurality of first attachment holes 36A1 is provided radially outwardly of the second spoke-mounting portion 236B when viewed along the rotational center axis A1. The plurality of first attachment holes 36A1 is provided radially outwardly of the plurality of second attachment holes 36B1 and the plurality of second recesses 236B2 when viewed along the rotational center axis A1.

The circumferential position of the second recess 236B2 is substantially the same as the circumferential position of the first attachment hole 36A1 when viewed along the rotational center axis A1. The circumferential position of the first recess 236A2 is substantially the same as the circumferential position of the second attachment hole 36B1 when viewed along the rotational center axis A1. Such circumferentially positional relationship between the first recess 236A2 and the second attachment hole 36B1 allows a spoke to be easily and smoothly mounted to the second spoke-mounting portion 236B.

MODIFICATIONS

Figure 45:
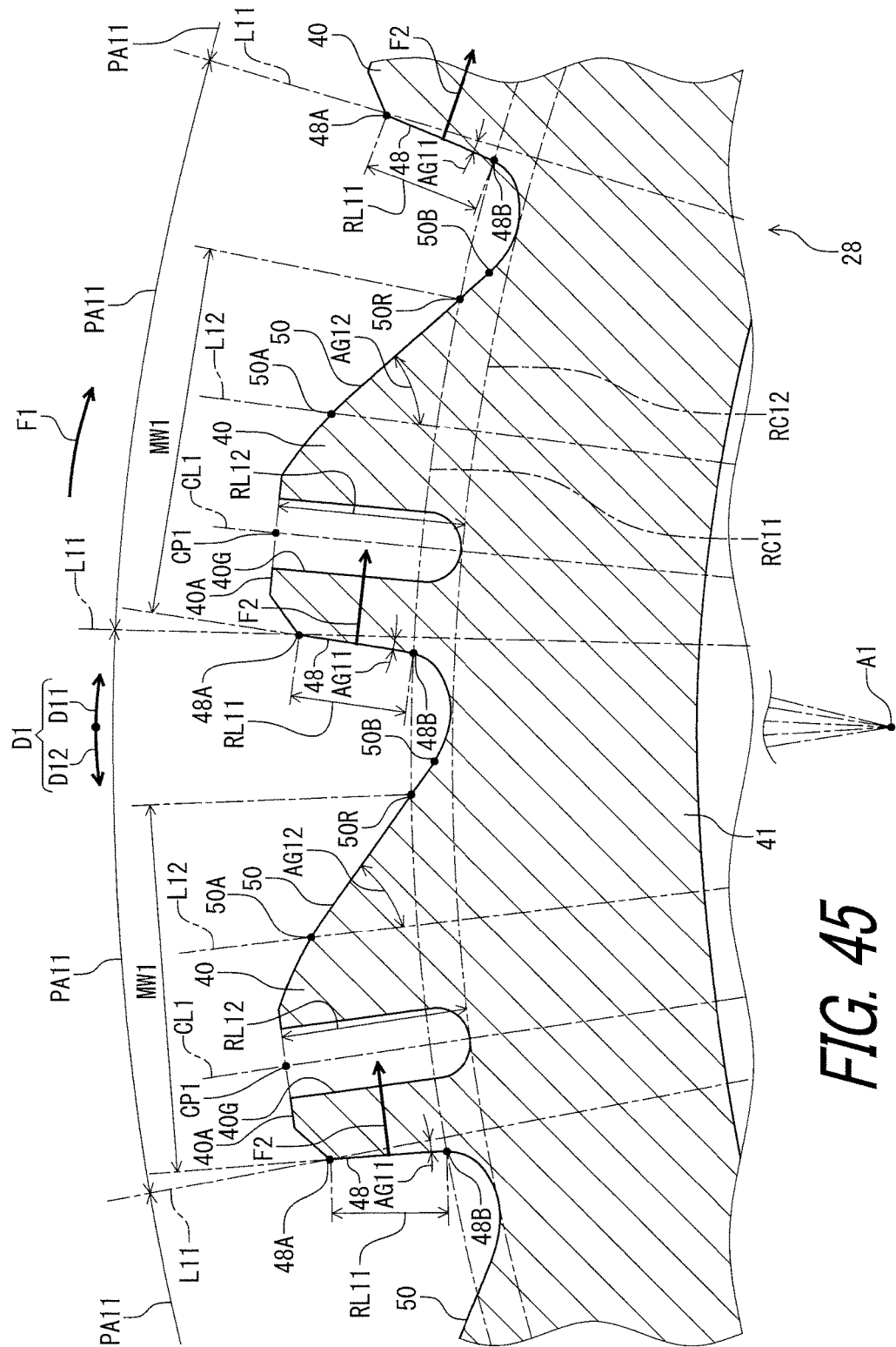
FIG. 45 is an enlarged cross-sectional view of the sprocket support body in accordance with a modification of the first and second embodiments.

As seen in FIG. 45, in the above embodiments, the external spline tooth 40 can include a groove 40G provided between the external-spline driving surface 48 and the external-spline non-driving surface 50 in the circumferential direction D1. The groove 40G reduces weight of the bicycle hub assembly 12 or 212.

Figure 46:
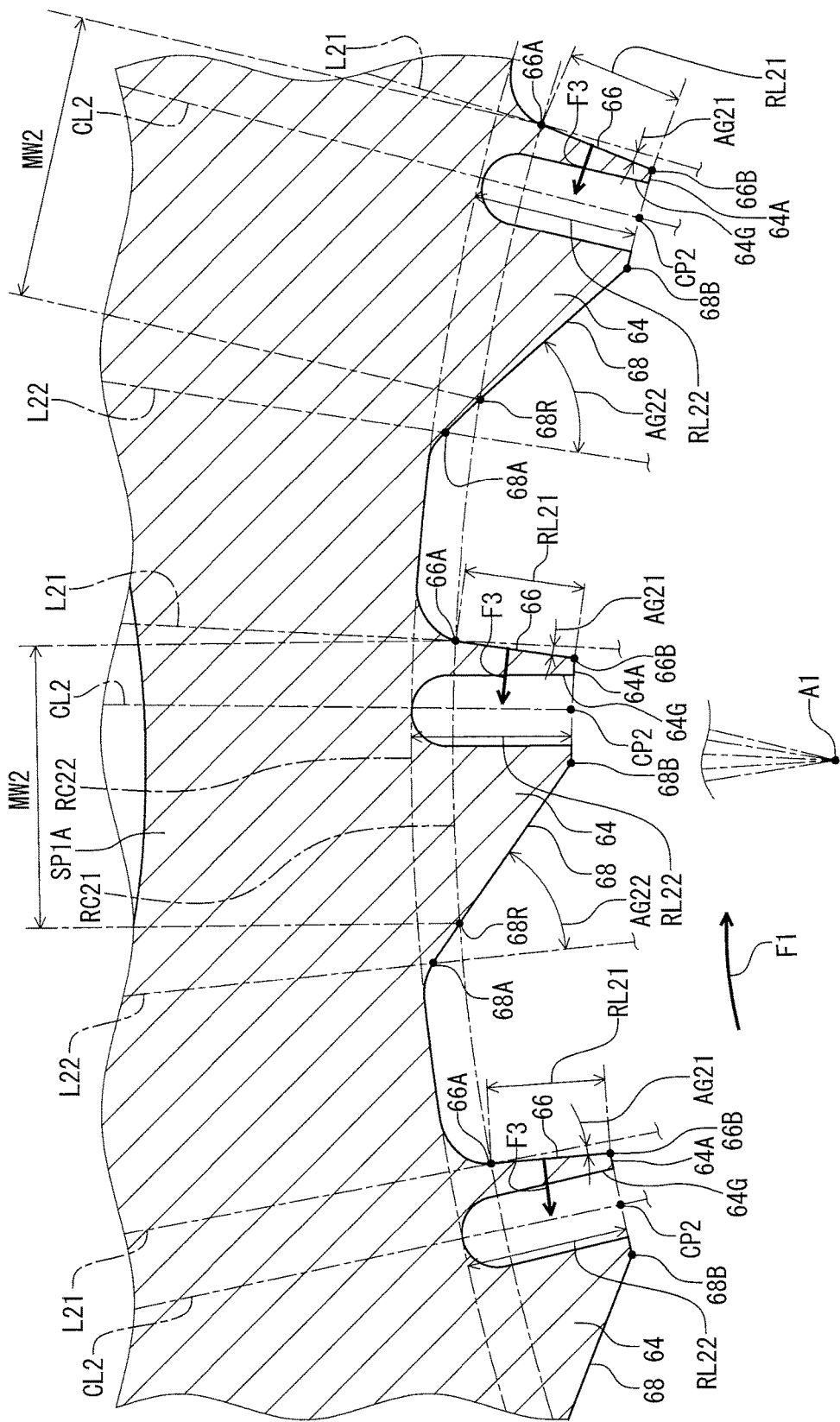
FIG. 46 is an enlarged cross-sectional view of the smallest sprocket in accordance with a modification of the first and second embodiments.

As seen in FIG. 46, in the above embodiments, the internal spline tooth 64 can include a groove 64G provided between the internal-spline driving surface 66 and the internal-spline non-driving surface 68 in the circumferential direction D1. The groove 64G reduces weight of the bicycle rear sprocket assembly 14.

Figure 47:
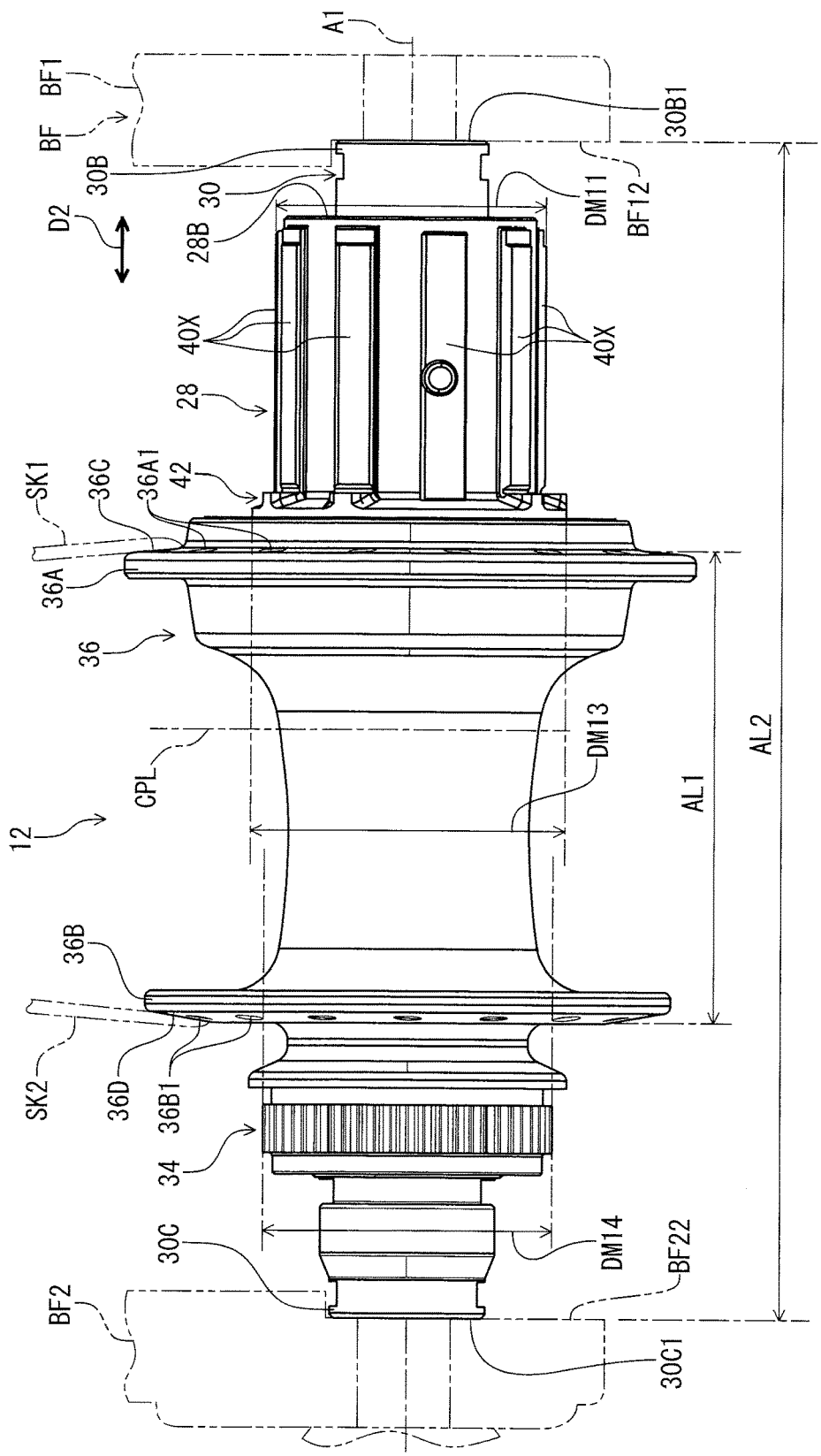
FIG. 47 is a rear view of a bicycle hub assembly in accordance with a modification of the first and second embodiments.
Figure 48:
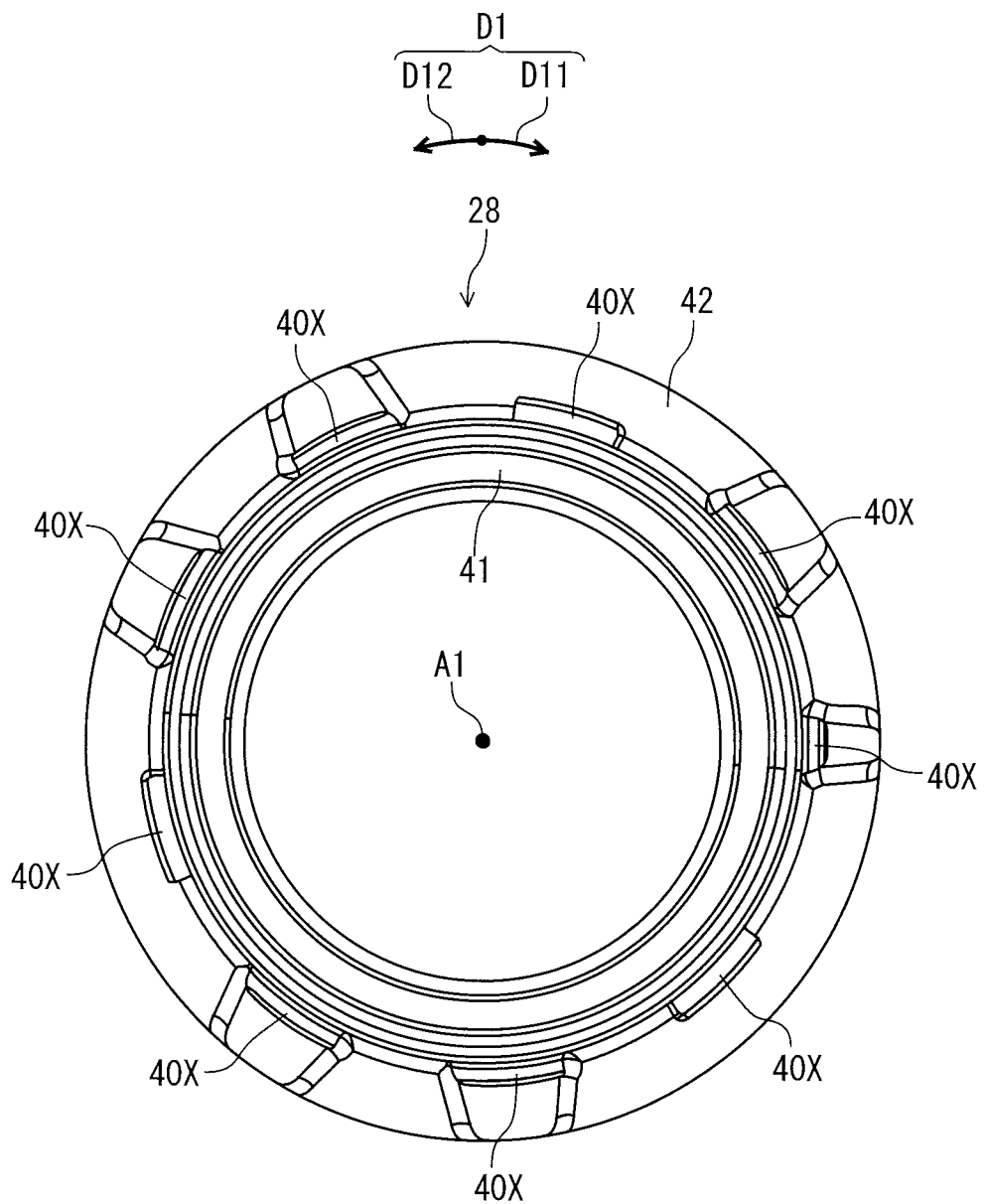
FIG. 48 is a side elevational view of a sprocket support body of the bicycle hub assembly illustrated in FIG. 47.

As seen in FIGS. 47 and 48, the sprocket support body 28 of the bicycle hub assembly 12 can include nine external spline teeth 40X configured to engage with a bicycle rear sprocket assembly when the external-spline major diameter DM11 is larger than 34 mm and smaller than 35 mm and when the first axial length AL1 is equal to or larger than 55 mm. In this modification, since the sprocket support body 28 includes the nine external spline teeth 40X and has the external-spline major diameter DM11 larger than 34 mm and smaller than 35 mm, currently available bicycle rear sprocket assemblies having nine internal spline teeth can be mounted on the bicycle hub assembly 12. As seen in FIG. 47, the first axial length AL1 can be equal to or larger than 55 mm. The first axial length AL1 can be equal to or smaller than 80 mm. The first axial length AL1 can be equal to or larger than 60 mm. The first axial length AL1 can be equal to or larger than 65 mm. The first axial length AL1 can be 67 mm.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
   a hub axle;
   a hub body rotatably mounted on the hub axle about a rotational center axis of the bicycle hub assembly, the hub body including:
      a first spoke-mounting portion having a first axially outermost part;
      a second spoke-mounting portion having a second axially outermost part; and
      a first axial length defined between the first axially outermost part of the first spoke-mounting portion and the second axially outermost part of the second spoke-mounting portion in an axial direction with respect to the rotational center axis, the first axial length being equal to or larger than 55 mm; and
   a sprocket support body rotatably mounted on the hub axle about the rotational center axis, the sprocket support body including a plurality of external spline teeth configured to engage with a bicycle rear sprocket assembly, the plurality of external spline teeth including a plurality of external-spline driving surfaces to receive a driving rotational force from the bicycle rear sprocket assembly during pedaling,
   the plurality of external-spline driving surfaces each including:
      a radially outermost edge;
      a radially innermost edge; and
      a radial length defined from the radially outermost edge to the radially innermost edge, and
   a total of the radial lengths of the plurality of external-spline driving surfaces being equal to or larger than 7 mm.

2. The bicycle hub assembly according to claim 1, wherein
   the total of the radial lengths is equal to or larger than 10 mm.

3. The bicycle hub assembly according to claim 1, wherein
   the plurality of external spline teeth includes at least ten external spline teeth.

4. The bicycle hub assembly according to claim 3, wherein
   a total number of the at least ten external spline teeth is equal to or larger than 20.

5. The bicycle hub assembly according to claim 1, wherein
   the first axial length is equal to or larger than 60 mm.

6. The bicycle hub assembly according to claim 5, wherein
   the hub axle includes:
      a first axial frame abutment surface configured to abut against a first part of a bicycle frame in the axial direction in a state where the bicycle hub assembly is mounted to the bicycle frame;
      a second axial frame abutment surface configured to abut against a second part of the bicycle frame in the axial direction in the state where the bicycle hub assembly is mounted to the bicycle frame; and
      a second axial length defined between the first axial frame abutment surface and the second axial frame abutment surface in the axial direction, the second axial length being equal to or larger than 145 mm.

7. The bicycle hub assembly according to claim 1, wherein
   the first axial length is equal to or larger than 65 mm.

8. The bicycle hub assembly according to claim 7, wherein
   the hub axle includes:
      a first axial frame abutment surface configured to abut against a first part of a bicycle frame in the axial direction in a state where the bicycle hub assembly is mounted to the bicycle frame;
      a second axial frame abutment surface configured to abut against a second part of the bicycle frame in the axial direction in the state where the bicycle hub assembly is mounted to the bicycle frame; and
      a second axial length defined between the first axial frame abutment surface and the second axial frame abutment surface in the axial direction, the second axial length being equal to or larger than 147 mm.

9. The bicycle hub assembly according to claim 1, wherein
   the hub axle includes:
      a first axial frame abutment surface configured to abut against a first part of a bicycle frame in the axial direction in a state where the bicycle hub assembly is mounted to the bicycle frame;
      a second axial frame abutment surface configured to abut against a second part of the bicycle frame in the axial direction in the state where the bicycle hub assembly is mounted to the bicycle frame; and
      a second axial length defined between the first axial frame abutment surface and the second axial frame abutment surface in the axial direction, the second axial length being equal to or larger than 140 mm.

10. The bicycle hub assembly according to claim 1, further comprising:
    a brake-rotor support body including at least one additional external spline tooth configured to engage with a bicycle brake rotor, the at least one additional external spline tooth having an additional external-spline major diameter that is larger than the external-spline major diameter.

11. The bicycle hub assembly according to claim 1, wherein
    the plurality of external spline teeth has an external-spline major diameter, and
    the external-spline major diameter is equal to or larger than 25 mm.

12. The bicycle hub assembly according to claim 11, wherein
    the external-spline major diameter is equal to or larger than 29 mm.

13. The bicycle hub assembly according to claim 1, wherein
    the plurality of external spline teeth has an external-spline minor diameter, and
    the external-spline minor diameter is equal to or larger than 25 mm.

14. The bicycle hub assembly according to claim 13, wherein
    the external-spline minor diameter is equal to or larger than 27 mm.

15. The bicycle hub assembly according to claim 1, wherein
    the plurality of external spline teeth has a first external pitch angle and a second external pitch angle different from the first external pitch angle.

16. The bicycle hub assembly according to claim 1, wherein
    at least two external spline teeth of the plurality of external spline teeth are circumferentially arranged at a first external pitch angle with respect to the rotational center axis of the bicycle hub assembly, and the first external pitch angle ranges from 10 degrees to 20 degrees.

17. The bicycle hub assembly according to claim 16, wherein the first external pitch angle ranges from 12 degrees to 15 degrees.

* * * * *